United States Patent
Yoshioka et al.

(10) Patent No.: US 6,805,147 B2
(45) Date of Patent: Oct. 19, 2004

(54) AUTOMATIC WATER SUPPLY SYSTEM

(75) Inventors: Takaharu Yoshioka, Sagamihara (JP); Minoru Yoshida, Yamato (JP)

(73) Assignee: Kyodo Ky-Tec Corp., Tokyo (JP)

( * ) Notice: Subject to any disclaimer, the term of this patent is extended or adjusted under 35 U.S.C. 154(b) by 159 days.

(21) Appl. No.: 10/169,761

(22) PCT Filed: Jan. 25, 2001

(86) PCT No.: PCT/JP01/00478

§ 371 (c)(1),
(2), (4) Date: Jul. 19, 2002

(87) PCT Pub. No.: WO01/56367

PCT Pub. Date: Aug. 9, 2001

(65) Prior Publication Data

US 2003/0000573 A1 Jan. 2, 2003

(30) Foreign Application Priority Data

Feb. 2, 2000 (JP) ........................................ 2000-025155
Aug. 23, 2000 (JP) ........................................ 2000-252225

(51) Int. Cl.⁷ .............................................. F16K 31/12
(52) U.S. Cl. ........................... 137/78.3; 239/69; 239/70
(58) Field of Search ......................... 137/78.3; 239/69, 239/70

(56) References Cited

U.S. PATENT DOCUMENTS 4,755,942 A * 7/1988 Gardner et al. ............. 700/284
5,696,671 A * 12/1997 Oliver ........................ 700/284
6,145,755 A * 11/2000 Feltz .............................. 239/1
6,402,048 B1 * 6/2002 Collins ......................... 239/63

FOREIGN PATENT DOCUMENTS

| JP | 59-27630 | 7/1984 |
| JP | 61-82216 | 4/1986 |
| JP | 5-3731 | 1/1993 |
| JP | 9-65776 | 3/1997 |
| JP | 11-32600 | 2/1999 |

* cited by examiner

Primary Examiner—A. Michael Chambers
(74) Attorney, Agent, or Firm—Armstrong, Kratz, Quintos, Hanson & Brooks, LLP

(57) ABSTRACT

An automatic water supply system capable of cultivating a plant in a state as proximate to be natural as possible and robustly and capable of eliminating waste of water, which is an automatic water supply system in which at least deficiency of water of an object of water supply is detected by a water content sensor, a first predetermined time period is measured by a first timer portion in accordance with the detection, when sufficiency of water is not detected by the water content sensor within the first predetermined time period, water is supplied by water supply means and when sufficiency of water is detected within the first predetermined time period, the first timer portion is initialized. According to the automatic water supply system, it is preferable that water is stopped from being supplied after elapse of a second predetermined time period measured separately or water is stopped from being supplied when a measured value of a flow rate meter installed at a water path reaches a previously determined flow rate value after starting to supply water.

18 Claims, 38 Drawing Sheets

Fig. 10

Document of Automatic Water Supply System Control Yearly Content (1998)

1998/01/14  09:05  Starting operation of first timer portion.
1998/01/18  20:34  Initializing.

1998/02/12  01:00  Starting operation of first timer portion.
1998/02/27  01:00  Finishing operation of first timer portion.
                   Output of water supply start signal.
                   Starting operation of second timer portion.
1998/02/27  02:00  Finishing operation of second timer portion.
                   Output of water supply stop signal.
1998/02/27  02:00  Initializing.

1998/03/14  09:05  Starting operation of first timer portion.
1998/03/20  11:34  Initializing.

1998/05/01  00:00  Automatic switching of first time period(8days(192hours))

1998/08/25  10:00  Starting operation of first timer portion.
1998/09/02  10:00  Finishing operation of first timer portion.
                   Output of water supply start signal.
                   Starting operation of second timer portion.
1998/09/02  11:00  Finishing operation of second timer portion.
                   Output of water supply stop signal.
1998/09/02  11:00  Initializing.

1998/10/02  12:01  Starting operation of first timer portion.
1998/10/02  22:53  Initializing.

1998/11/01  00:00  Automatic switching of first time period(15days(360hours))

1998/12/01  15:15  Starting operation of first timer portion.
1998/12/16  15:15  Finishing operation of first timer portion.
                   Output of water supply start signal.
                   Starting operation of second timer portion.
1998/12/16  15:15  Finishing operation of second timer portion.
                   Output of water supply stop signal.
1998/12/16  15:15  Initializing.

Fig. 11

|  | Set Content Confirmation | |
|---|---|---|
| First time period | | |
| First time period | ① 8days(192hours) | ② 15days(360hours) |
| Automatic switching of First time period | O N | |
| Switching time of First time period | 05/01 (②→①) | 11/01 (①→②) |
| | | |
| Second time period | | |
| Second time period | 1hour(60minitues) | |
| Automatic switching of Second time period | O F F | |
| Switching time of Second time period | ＊＊＊＊＊ | |
| | | |
| Set resistance value | | |
| resistance value | 6 0 0 K Ω | |
| | | |
| Method of supplying water | | |
| Method of supplying water | Automatic | |

Fig. 16

Document of Automatic Water Supply System Control Monthly Content
(1998/12/01 ~ 12/31)

| | | |
|---|---|---|
| 1998/12/01 | 03:05 | ON of third sensor. |
| 1998/12/01 | 12:13 | ON of fourth sensor. |
| 1998/12/01 | 12:13 | Starting operation of first timer portion. |
| 1998/12/05 | 18:01 | ON of second sensor. |
| 1998/12/18 | 20:34 | ON of first sensor. |
| 1998/12/16 | 03:05 | Finishing operation of first timer portion. Output of water supply start signal. Starting operation of second timer portion. |
| 1998/12/16 | 04:05 | Finishing operation of second timer portion. Output of water supply finish signal. |
| 1998/12/16 | 04:05 | Initializing. |
| 1998/12/25 | 00:16 | ON of first sensor. |
| 1998/12/25 | 00:17 | ON of second sensor. |
| 1998/12/25 | 00:17 | Starting operation of first timer portion. |
| 1998/12/28 | 15:00 | Initializing. |

Fig. 17

```
                    Set Content Confirmation Table

First time period
  First time period              ① 8days(192hours)   ② 15days(360hours)
  Automatic switching            O N
    of First time period
  Switching time                 05/01 (②→①)        11/01 (①→②)
    of First time period Second time period
  Second time period             1hour(60minitues)
  Automatic switching            O F F
    of Second time period
  Switching time                 ＊＊＊＊＊＊
    of Second time period Set resistance value
  resistance value               6 0 0 K Ω

Method of supplying water
  Method of supplying water      Automatic

Number of detected water content sensors
  Nunmber of provided water content sensors        4
  Number of detected water content sensors         2  (2/4)
```

AUTOMATIC WATER SUPPLY SYSTEM

TECHNICAL FIELD

The present invention relates to an automatic water supply system for automatically supplying water to an object of water supply such as soil in a planting facility of, for example, pots or planting mats, mainly relates to an automatic water supply system for detecting presence or absence of water of an object of water supply and automatically supplying water based on a result thereof.

BACKGROUND OF THE INVENTION

Conventionally, in a planting facility by, for example, pots or planting mats, as a technology with regard to supplying water to an object of water supply such as soil, for example, in Japanese Utility Model Laid-Open No. 17054/1990, there are pots for detecting a content of water in soil by electric resistance between opposed electrodes and provided with a lamp or a buzzer for informing start of water supply.

However, when a person for supplying water is absent for a long period of time, the informing by a lamp or a buzzer cannot contribute to water supply at all and therefore, there is brought about a drawback that even when the pots are used, the plant is killed. Further, according to the pots, there is not disclosed with regard to a special water supply method or the like at all, water is supplied artificially in accordance with informing by the informing means and therefore, there is also brought about a drawback that in the case of a wide planting area, there is needed enormously laborious water supply operation.

Further, in order to resolve the above-described drawbacks, there have been proposed an automatic water supply system for automatically supplying water at previously determined intervals of time as shown by, for example, Japanese Utility Model Laid-Open No. 16257/1987, an apparatus of detecting an amount of water in soil and supplying water automatically in accordance with a result of detection as shown by, for example, Japanese Utility Model Laid-Open No. 4862/1993, and an automatic water supply system of mounting a pot in a water supply tank, detecting an upper limit and a lower limit state of water in the water supply tank and starting to supply water after elapse of a constant time period after water reaches a lower limit value as shown in, for example, Japanese Utility Model Laid-Open No. 74359/1986 and so on.

However, also in the above-described automatic water supply systems, no consideration is given at all to a state of a plant which is to constitute a basis of determination of necessity and unnecessity of water supply and water is supplied by the same processing for all of plants having time which needs much water and time which hardly needs water. Therefore, when the water supply processing is set to adapt to, for example, time which needs much water, a large amount of water is supplied at time which hardly needs water, such a large amount of water causes root rot and therefore, there is brought about a drawback that the plant is finally killed. Further, since extra water is supplied, there is also brought about a drawback that water cost becomes enormous. Conversely, when the water supply processing is set to adapt to time which hardly needs water, water is hardly supplied at time which needs much water, as a result, there is brought about a drawback that the plant is killed as a result.

As the above-described time which needs much water, for example, there is time immediately after mounting cut turf or the like on soil in a planting facility of mounting the cut turf on the soil. Immediately after mounting cut turf on soil, there is brought about a state in which the root of lawn does not adapt to soil and does not take root deep into the soil, an air layer is formed between the root of the cut turf and the soil, which is a state in which the turf is the weakest. Therefore, this is time having high possibility of killing plant since water is deficient and much water is needed for making the lawn take root deep into the soil fastly.

Conversely, as time which hardly needs water, for example, there is time in which the cut turf takes root deep into the soil in the planting facility of mounting the cut turf on the soil. After the cut turf takes root deep into the soil in the planting facility of mounting the cut turf on the soil. After the cut turf takes root deep into the soil, there is brought about a state of strong water absorption power and therefore, it is preferable to grow plant in a state as near to the nature as possible, which is time having high possibility of causing root rot or growing poor turf by excessive water supply. Further, in order to grow a robust plant, it is significant to give constant water stress and it is not necessary to supply so much water in such a time.

Further, in order to resolve the above-described drawback in consideration of a state of a plant, there is a technology disclosed in, for example, Japanese Patent Laid-Open No. 313675/1998. According thereto, seeds of lawn or lawn at an initial stage of growing is planted in artificial soil, a water level at inside of the artificial soil is maintained to a high water level and successively the water level is lowered in accordance with growth of root of the lawn.

Meanwhile, according to the technology of Japanese Patent Laid-Open No. 313675/1998, the water level is not controlled automatically in accordance with a state of the plant but a state of growing root of lawn is confirmed by optical observation and therefore, it is necessary to monitor the state of the turf from time to time, further, the water level is adjusted artificially and there is brought about a drawback that water supply administration becomes troublesome. Further, the artificial soil is maintained in a state of always being immersed in water and therefore, grown turf can also absorb water from time to time, as a result, poor turf is constituted. Further, according to the constitution of adjusting the water level such that the artificial soil is immersed always in water, it is necessary to supply water even at time which does not need water so much and there is brought about a drawback that the water cost becomes expensive.

DISCLOSURE OF THE INVENTION

The invention has been carried out by paying attention to the above-described problem and it is an object thereof to provide an automatic water supply system capable of carrying out water supply administration efficiently and by constituting a state of being as proximate to be natural as possible in accordance with a state of a plant by detecting a water content amount of an object of water supply as accurate as possible and as a result, capable of cultivating a robust plant.

Further, it is an object thereof to provide an automatic water supply system capable of firmly cultivating a plant by minimum water supply and capable of eliminating waste of water as less as possible.

An automatic water supply system according to the invention is characterized in that at least deficiency of water of an object of water supply is detected by a water content sensor, a first predetermined time period is measured by a first timer portion in accordance with the detection, when sufficiency of water is not detected by the water content sensor within the first predetermined time period, water is supplied by water supply means and when sufficiency of water is detected within the first predetermined time period, the first timer portion is initialized. For example, the automatic water supply system includes the water content sensor for detecting presence or absence of water of the object of water supply, and control means for controlling operation of the water supply means in accordance with a measured value of the water content sensor, and the control means includes the first timer portion for measuring the first predetermined time period in accordance with input of a result of detection of absence of water by the water content sensor to the control means, when a predetermined amount of water is not detected by the water content sensor during a time period until finishing to measure the first predetermined time period by the first timer portion, a water supply start signal is outputted to the water supply means and the predetermined amount of water is detected by the water content sensor during the time period until finishing to measure the first predetermined time period by the first timer portion, at least the first timer portion of the control means is initialized.

Further, an automatic water supply system according to the invention is characterized in an automatic water supply system comprising water supply means capable of supplying water to an object of water supply and control means set with a plurality of kinds of modes at least having different conditions of starting to supply water for controlling to carry out to supply water and stop to supply water by the water supply means in accordance with the modes, wherein the modes are switched in accordance with a predetermined switching condition. Further, the object of water supply is constituted by inside of a plant cultivating article of, for example, inside of a plant, soil, a water storage tray or the like, further, a portion of detecting a water content state, mentioned later, is constituted by inside of a plant cultivating article of, for example, inside of a plant, soil, a water storage tray or the like, further, a water supply portion and a water content detecting portion can be made to be the same as each other or different from each other as necessary.

Further, the automatic water supply system is characterized in that simultaneously with detecting sufficiency of water by the water content sensor simultaneously with starting to supply water or after starting to supply water, a second predetermined time period is measured by a second timer portion and after elapse of the second predetermined time period, water supply is stopped. For example, the second timer portion is provided at the control means, the second timer portion measures the second predetermined time period simultaneously with outputting a water supply start signal and outputting a water supply stop signal to the water supply means after measuring the second predetermined time period of the second timer portion, or the second timer portion detects water content by the water content sensor after outputting the water supply start signal and measures the second predetermined time period and outputs the water supply stop signal to the water supply means after measuring the second predetermined time period of the second timer portion.

Further, the automatic water supply system is characterized in that a flow rate meter is installed at a water path of the water supply means and water is stopped from being supplied when a measured value of the flow rate meter reaches a previously determined flow rate value after starting to supply water. For example, there is constructed a constitution in which the flow rate meter is provided at the water path between the water supply means and the water supply object and the control means outputs the water supply stop signal to the water supply means when the measured value by the flow rate meter reaches the previously determined flow rate value after outputting the water supply start signal. It is preferable to construct a constitution in which a condition of setting the flow rate value can be changed manually or automatically.

Further, when the water supply object is constituted by a single or a plurality thereof, the automatic water supply system is characterized in that a plurality of the water content sensors are installed at necessary portions for detecting a predetermined number of pieces of the water content sensors each constituting a result of detecting deficiency of water content of the water supply object and the first timer portion measures the first predetermined time period. For example, when there are a plurality of the water supply objects, by installing an arbitrary number of pieces of the water content sensors at arbitrary portions of the plurality of water supply objects and detecting presence or absence of water content based on a previously determined number of pieces of the water content sensors in the arbitrary number of pieces of the installed water content sensors, presence or absence or water content is determined. There may be constructed a constitution in which the previously determined number of pieces of the arbitrary number of pieces of the installed water content sensors, can freely be set. Further preferably, at least two pieces or more of the installed water content sensors are installed at portions having different conditions in the plurality of water supply objects.

Further, the automatic water supply system is characterized in that the water supply object is divided into a plurality of blocks, detection of deficiency of water content by the water content sensor is carried out for the respective block and water is supplied to the block in which deficiency of water content is detected.

Further, the automatic water supply system is characterized in that the water supply object is divided into a plurality of blocks, detection of deficiency of water content by the water content sensor is carried out for the respective block and water is supplied to the respective blocks in a previously determined order for a total of the water supply object by detecting deficiency of water content, that is, water is supplied by a relay system. For example, there is constructed a constitution in which a single or a plurality of the water supply objects are constituted by a plurality of water supply units, and previously divided into a plurality of blocks including one or more of the water supply units and in accordance with a result of detection by the water content sensors of the respective blocks, water supply means can start to supply water and stop to supply water to the blocks in which deficiency of water content is detected, or in accordance with a result of detecting deficiency of water content by the water content sensors from a single or a plurality of blocks, the water supply means starts and stops supplying water to the respective blocks in a previously determined order for a total of the water supply object and further, these are repeatedly carried out.

Further, in the automatic water supply system there can be constructed a constitution of capable of setting manually or setting automatically at least either or both of the first predetermined time period and the second predetermined time period by a condition, or there can be constructed a constitution in which time is measured by constituting a single timer portion by the first timer portion and the second timer portion or the water content sensor can be constructed by a constitution of detecting presence or absence of water content by electric resistance between at least two conductive members, further, there can be constructed a constitution of capable of manually setting or automatically setting by constituting a condition of an electric resistance value constituting a detection system of the water content sensor in the control means.

Further, the automatic water supply system is characterized in further comprising switching means for switching to a test mode, wherein a cycle of the test mode from starting to supply water to stopping to supply water is set to be shorter than a normal cycle. That is, there is constructed a constitution in which the control means is provided with the switching means for switching to the test mode and the switching means is capable of switching to the test mode when the water content sensor detects deficiency of water content and there is constructed a constitution in which in test mode time, a time period of one cycle from starting to supply water to stopping to supply water is set to be shorter than the normal cycle. For example, as the above-described constitution, in the test mode time, the first timer portion measures a third predetermined time period shorter than the first predetermined time period, water is supplied by outputting the water supply start signal to the water supply means after finishing to measure the third predetermined time period, simultaneously with detecting sufficiency of water content by the water content sensor simultaneously with outputting the water supply start signal or after outputting the water supply start signal, the second timer portion measures a fourth predetermined time period shorter than the second predetermined time period, the water supply stop signal is outputted to the water supply means after finishing to measure the fourth predetermined timer period and water is stopped from being supplied.

Further, according to the automatic water supply system, there can be constructed a constitution of capable of setting manually or setting automatically at least either of both the third predetermined time period and the fourth predetermined time period by a condition, there can be constructed a constitution in which the control means is provided with informing means or can be connected to information means provided separately from the control means, or there can be constructed a constitution in which the control means is provided with a storing portion for storing at least control content of the control means and the storing portion can hold stored content in electricity breakdown, further, there can be constructed a constitution in which the control means is provided with out putting means or can be connected to outputting means provided separately from the control means and the content stored in the storing portion can be outputted to print, or there can be constructed a constitution in which the control means is provided with water supply method setting means capable of setting automatic water supply for automatically supplying water or manual water supply for manually supplying water.

Further, the automatic water supply system is characterized in that the water supply object is, for example, a space at inside of a water storage tray provided on the lower side of a plant cultivating container an upper face of which is opened.

Further, the automatic water supply system is characterized in that a water content sensor mounting base is provided above a bottom face of the water storage tray and the water content sensor is mounted above the water content sensor mounting base.

Further, the automatic water supply system according to the invention is characterized in that the plurality of kinds of modes include a first mode of determining presence or absence of a necessary water amount based on a detected value at a portion of detecting a water content state by a sensor and carrying out to supply water when absence of the necessary water amount is determined and a second mode of determining presence or absence of the necessary water amount based on the detected value of the portion of detecting the water content state by the sensor, starting to measure a predetermined stress time period by a timer portion when absence of the necessary water amount is determined and carrying out to supply water after measurement of the stress time period is finished, in the above-described automatic water supply system.

Further, the automatic water supply system according to the invention is characterized in that the plurality of kinds of modes include a first mode of carrying out to supply water at predetermined water supply interval time periods and a second mode of determining presence or absence of the necessary water amount based on the detected value of the portion of detecting the water content state by the sensor, starting to measure a predetermined stress time period by the timer portion when absence of the necessary water amount is determined, carrying out to supply water after measurement of the second stress time period is finished, in the above-described automatic water supply system.

Further, the automatic water supply system according to the invention is characterized in that the plurality of kinds of modes include a first mode of carrying out to supply water at predetermined first water supply interval time periods and a second mode of carrying out to supply water at predetermined second water supply interval time periods longer than the first water supply interval time periods, in the above-described automatic water supply system.

Further, the automatic water supply system according to the invention is characterized in that the plurality of kinds of modes include a first mode of determining presence or absence of a necessary water amount based on a detected value of a portion of detecting a water content state by a sensor, starting measurement of a predetermined first stress time period by a timer portion when absence of the necessary water content amount is determined and carrying out to supply water after finishing measurement of the first stress time period and a second mode of determining presence or absence of the necessary water content amount based on the detected value of the water content state detecting portion by the sensor, starting measurement of a predetermined second stress time period longer than the first stress time period by the timer portion when absence of the necessary water content amount is determined and carrying out to supply water after finishing measurement of the second stress time period, in the above-described automatic water supply system.

Further, the automatic water supply system according to the invention is characterized in that the plurality of kinds of modes include a mode of not carrying out control for making the water supply means carry out to supply water, in the above-described automatic water supply system.

Further, the automatic water supply system according to the invention is characterized in that a predetermined switching time period is measured and at least one of the switching conditions is constituted by finishing to measure the switching time period, in the above-described automatic water supply system. For example, there is constructed a constitution in which a predetermined switching mode is selected manually or automatically, the predetermined switching time period is measured from selecting the predetermined switching mode and the mode is switched after finishing to measure the switching time period, in the above-described automatic water supply system.

Further, the automatic water supply system according to the invention is characterized in that a predetermined detected value indicating a state of growing a plant is detected and at least one of the switching conditions is based on the detected value, in the above-described automatic water supply system.

Further, the automatic water supply system according to the invention is characterized in that the control means includes a calendar portion for updating set time and at least one of the switching conditions is based on time updated by the calendar portion, in the above-described automatic water supply system. For example, the respective modes are set to store in correspondence with times of the calendar portion and the modes are switched in accordance with change of predetermined times.

Further, the automatic water supply system according to the invention is characterized in that a desired mode can arbitrarily be selected and carried out in the plurality of kinds of modes, in the above-described automatic water supply system.

By using the automatic water supply system according to the invention, the water content amount of the water supply object of soil or the like can be detected as accurately as possible and in accordance with a result of detecting the water content, or in accordance with a state of the plant, the water supply administration can be carried out efficiently and by constituting a state as proximate to be natural as possible. Therefore, there is achieved an effect of capable of cultivating a plant or the like in a state as proximate to the natural state as possible and capable of cultivating a robust and healthy plant.

Further, according to the automatic water supply system of the invention, there is achieved an effect of capable of firmly cultivating a plant by minimum water supply and capable of eliminating waste of water as less as possible.

Further, by providing the mounting base above the water storage tray and mounting the water content sensor above the mounting base, the water content sensor detects a state of absence of water and detection of absence of water can be maintained with regard to a small amount of rainfall at this occasion and therefore, the drawback of killing the plant can be resolved.

Further, by constructing a constitution in which the control means is provided with a storing portion for storing a count value when power breakdown is brought about even when the power breakdown is brought about in operating the timer and counting is restarted from the stored count value in recovering electricity, a state in which water is not supplied for a long period of time, or a state in which water is supplied for a long period of time can be prevented beforehand and the drawback of killing the plant can be resolved.

Further, by constructing the constitution of capable of switching to the test mode, at construction or after finishing construction, it can be confirmed in a short period of time whether a total of the automatic water supply system is operated normally and the automatic water supply system having higher quality can be provided to the user.

Further, according to the automatic water supply system of the invention, when water content of the water supply object is detected by the water content sensor and deficiency of water content such as absence of water content is detected, the first predetermined time period is measured by the first timer and when the first timer maintains the state of deficiency of water content such as absence of water content during a time period until finishing to measure the first predetermined time period, water is supplied by the water supply means by outputting the water supply start signal and therefore, stress can be given to the plant during the first predetermined time period and the plant can be cultivated in a state proximate to be natural.

Further, when sufficiency of water content such as presence of water content is detected in the first predetermined time period, the first timer which is being operated, is initialized and therefore, water is not supplied newly when water is supplied by rainfall or the like, which is not only useful for prevention of root rot but also in which water is not used wastefully.

Further, according to the automatic water supply system of the invention, simultaneously with supplying water by outputting the water supply start signal, or simultaneously with detecting a state of sufficiency of water content such as presence of water content by the water content sensor newly after water supply is started, by measuring the second predetermined time period by the second time and stopping to supply water by outputting the water supply stop signal to the water supply means after elapse of the second predetermined time period, only a predetermined amount of water can be supplied in supplying water and water is not used wastefully. Further, also by stopping to supply water when a measured value of a flow rate by a flow rate meter reaches a predetermined value, only a previously determined amount of water can be supplied and water is not used wastefully.

Further, according to the automatic water supply system of the invention, by installing a plurality of the water content sensors at necessary portions and constituting a predetermined number of pieces of the water content sensors each indicating a constant value of deficiency of water content in the water supply object, the first time portion measures the first predetermined time period, thereby, a result of detecting presence or absence of water content can further accurately be provided and a possibility of killing the plant is lowered.

Further, according to the automatic water supply system of the invention, by providing at least two pieces of the water content sensors, installing the water content sensors at locations having different conditions of, for example, a shady side and a sunny side, a location with a roof and a location without a roof, a location proximate to the water supply means and a location remote therefrom, presence or absence of water content can further accurately be detected. That is, at the location with a roof, the shady side is constituted in fair whether, an amount of reducing water content in the water supply object is small, a large amount of water is present, conversely, at the location without a roof, the sunny side is constituted, the amount of reducing water content in the water supply object is large and there is brought about a state in which only a small amount of water content is present. Further, there is a case in which water is difficult to store at the location with a roof at rainy time and the water amount in the water supply object becomes smaller than that in the location with a roof. Therefore, by installing the water content sensors at the locations having different conditions as described above, the accurate water content amount can be grasped.

Further, according to the automatic water supply system of the invention, by dividing the water supply object into a plurality of blocks and starting and stopping to supply water for the respective blocks, water can be supplied only to the block which needs water and water is not used wastefully. Further, by successively supplying water to the water supply object divided into the respective blocks, water pressure is not lowered than in the case of supplying water summarizingly to all the blocks and water can be supplied firmly.

Further, according to the automatic water supply system of the invention, by enabling at least one of the first predetermined time period and the second predetermined time period to set manually or automatically by a condition, the first predetermined time period can be set in accordance with season, a location of cultivating a plant, the latitude, the longitude or the like and the second predetermined time period can be set by an area of cultivating a plant or the like, a cultivating method more suitable for the plant can be selected, the plant can be cultivated at anywhere and water is not used wastefully. Further, by constituting the first timer and the second timer by a single timer portion, the control means can be downsized and there is not a difficulty in a location of installing the timer.

Further, according to the automatic water supply system of the invention, by constructing a constitution in which the water content amount is detected by a water content sensor based on the electric resistance value between the conductive members and the system can be set manually or automatically by constituting a condition by the electric resistance value, the humidity of the location of installing the water supply object can be taken into account and a plant fitted to desire of the user can be cultivated only by the system.

Further, according to the automatic water supply system of the invention, by providing the switching means for switching to the test mode, switching to the test mode in a state in which, for example, deficiency of water is detected by the water content sensor, measuring the third predetermined time period shorter than the first predetermined time period, outputting the water supply start signal to the water supply means simultaneously with finishing to measure the third predetermined time period, measuring the fourth predetermined time period shorter than the second predetermined time period simultaneously with outputting the supply water start signal or simultaneously with detecting presence of water content by the water content sensor after outputting the water supply start signal and outputting the water supply stop signal to the water supply means simultaneously with finishing to measure the fourth predetermined time period, in finishing construction or in construction, it can be confirmed whether the water supply system is operated normally in a short period of time.

Further, according to the water supply system of the invention, by manually setting or automatically setting at least one of the third predetermined time period and the fourth predetermined time period by a condition, in accordance with a number of construction personnels, the operation can easily be confirmed.

Further, according to the automatic water supply system of the invention, by providing informing means such as display portion or alarming portion at the control means, the operational situation of the automatic water supply system can easily be grasped and further, a result of operating the system can be grasped and erroneous operation of the system can be recognized at a glance.

Further, according to the automatic water supply system of the invention, by constructing a constitution in which control means is provided with the storing portion, the storing portion can hold stored content at abnormality of power breakdown or the like and the system is restarted from the held content in recovering electricity, there can be resolved a drawback that the first predetermined time period or the second predetermined time period is abnormally prolonged or shortened and there can be resolved a drawback of killing the plant by root rot or deficiency of water. Further, by constructing a constitution of capable of outputting content stored to the storing portion by a printed matter or the like, a result of operating the control means can be grasped, erroneous operation of the system can be recognized at a glance and the set content can also be recognized at a glance.

Further, according to the automatic water supply system of the invention, by constituting the water supply object by the space at inside of the water storage tray provided on the lower side of the plant cultivating container and mounting the water content sensor at the water content sensor mounting base provided at the bottom face of the water storage tray, more accurate water content amount can be detected and erroneous operation by dust and dirt having a possibility of being brought about from the plant cultivating container or the like can be prevented beforehand.

Further, according to the automatic water supply system of the invention, by constructing a constitution in which a plurality of kinds of modes having different water supply starting conditions can be switched in accordance with a previously determined switching condition, when presence or absence of the necessary water amount at the water amount state detecting portion is detected by a sensor or the like and deficiency of water content such as absence of the necessary water content amount is detected, there is set the first mode of starting to supply water to the water supply object, when presence or absence of the necessary water content amount is detected by a sensor or the like and deficiency of water content such as absence of the necessary water content amount is detected, there is set the second mode of measuring the predetermined stress time period by the timer portion and starting to supply water after the timer portion finishes to measure the stress time period and the first mode and the second mode are automatically switched in accordance with the previously determined switching condition, the first mode can be operated at time of needing much water and the second mode can be operated at time of not needing so much water, and the plant can be cultivated without killing the plant, firmly and in the state as proximate to be natural as possible.

Further, as other example, by constructing a constitution of setting the first mode of supplying water at previously determined water supply interval time periods such as water supply interval time periods by which the water supply object is not brought into a dried state and the second mode of determining presence or absence of the necessary water amount at the water content state detecting portion based on detection of a sensor, measuring a predetermined stress time period by the timer portion when the absence of the necessary water content amount is determined and staring to supply water after finishing to measure the stress time period by the timer portion and automatically switching the first mode and the second mode in accordance with a previously determined switching condition, the first mode can be operated at time of needing much water, the second mode can be operated at time of not needing water so much similar to the above-described and the plant can be cultivated without killing the plant, firmly and in the state as proximate to be natural as possible.

Further, as other example, by constructing a constitution of setting the first mode for supplying water at previously determined first water supply interval time periods such as at time intervals by which the water supply object is not brought into a dried state and the second mode of supplying water at previously determined second water supply interval time periods longer than the first time periods such as at time intervals by which, for example, the water supply object may be brought into the dried state and automatically switching the first mode and the second mode in accordance with a previously determined switching condition, the first mode can be operated at time of needing much water, the second mode can be operated at time of not needing much water similar to the above-described, and the plant can be cultivated without killing the plant, firmly and in the state as proximate to be natural as possible. Further, according to the example, sensors are not needed and therefore, the system can be constructed inexpensively.

Further, as other example, by constructing a constitution of setting the first mode of determining presence or absence of the necessary water content amount at the water content state detecting portion based on detection by a sensor, measuring the predetermined first stress time at the timer portion when deficiency of water content such as absence of the necessary water content amount is detected and staring to supply water by the water supply means after finishing to measure the first stress time period by the timer portion and the second mode of determining presence or absence of the necessary water content amount of the water content state detecting portion, measuring the predetermined second stress time period longer than the first stress time period by the timer portion when deficiency of water content such as absence of the necessary water amount is detected and starting to supply water by the water supply means after finishing to measure the second stress time period by the timer portion and switching the first mode and the second mode automatically in accordance with the previously determined switching condition, the first mode can be operated at time of needing much water, the second mode can be operated at time of not needing water content so much and the plant can be cultivated without killing the plant, firmly, and in the state as proximate to be natural as possible.

Further, according to the automatic water supply system of the invention, by constructing a constitution in which the plurality of kinds of modes include a mode of not carrying out control for making the water supply means carry out to supply water (no water supply mode of not supplying water at all), for example, in winter season corresponding to the period of dormancy of the turf laid outdoors, by carrying out the no supply water mode, a water service rate can further be saved.

Further, according to the automatic water supply system of the invention, the above-described different modes of the water supply system can be switched or selected, or the mode per se can be set, the mode can be selected or the mode per se can be set in accordance with various conditions of kind of the plant and location of installing the plant and the like and there can be constituted the automatic water supply system in line with desire of the user. For example, there can be constructed a constitution in which when the power source of the system is made ON, the switching mode stored as the initial state is carried out and switching and non-switching is selected by selecting the nonswitching mode only when the switching mode is not carried out, or a constitution in which the nonswitching mode stored as initial state is conversely carried out and switching and nonswitching is selected by selecting the switching mode only when the switching mode is carried out.

Further, by constituting the switching condition of switching the mode according to the invention by a predetermined time or time period after selecting a predetermined mode such as time or time period by which, for example, in the case of the turf, the turf takes root or elapse of the predetermined time period, the switching condition contributes to cultivating the excellent plant and further, the system per se can be simplified and a reduction in cost can be carried out. It is preferable to construct a constitution in which the predetermined time period of the switching condition can freely be set via the operating portion, the switching portion, the switching mode selecting portion, for example, there can be constructed a constitution of selecting the nonswitching mode by setting the predetermined time period to "0" when the switching mode is carried out automatically in the initial state.

Further, by constructing a constitution in which the mode is determined to carry out in accordance with time stored and updated by the calendar portion, pertinent water supply processing can be carried out further in accordance with the state of the plant.

Further, as the switching condition of the invention, there can also be set the switching condition based on detection of a state of growing the plant, thereby, the state of the plant can accurately be grasped and pertinent water supply processing can be determined by the control means and the water supply administration can be carried out further firmly. As detection of the state of the plant, it is preferable to detect the state of the turf in taking root in the case of the system of mounting and cultivating the cut turf on soil. In this case, pertinent detection can be carried out such that the state of taking root is grasped by providing the pressure sensor between the cut turf and the soil or detecting a content (weak acidity) in the soil.

BRIEF DESCRIPTION OF THE DRAWINGS

FIG. 10 shows a document with regard to an automatic water supply system control yearly content by outputting means of the automatic water supply system according to the third embodiment;

FIG. 11 shows a set content confirmation table by the outputting means of the automatic water supply system according to the third embodiment;

FIG. 16 shows a document with regard to an automatic water supply system control monthly content by outputting means of the automatic water supply system according to the fifth embodiment;

FIG. 17 shows a set content confirmation table by the outputting means of the automatic water supply system according to the fifth embodiment;

BEST MODE FOR CARRYING OUT THE INVENTION

An explanation will be given of specific embodiments of an automatic water supply system according to the invention in reference to the drawings. Further, although an explanation will be given of an automatic water supply system according to the embodiments, shown below, when an object of water supply is constituted by a space at inside of a water storage tray mounted with a plant cultivating container, the automatic water supply system according to the invention is not limited to the embodiments described below such that an object of water supply is constituted by soil in the plant cultivating container.

Figure 1:
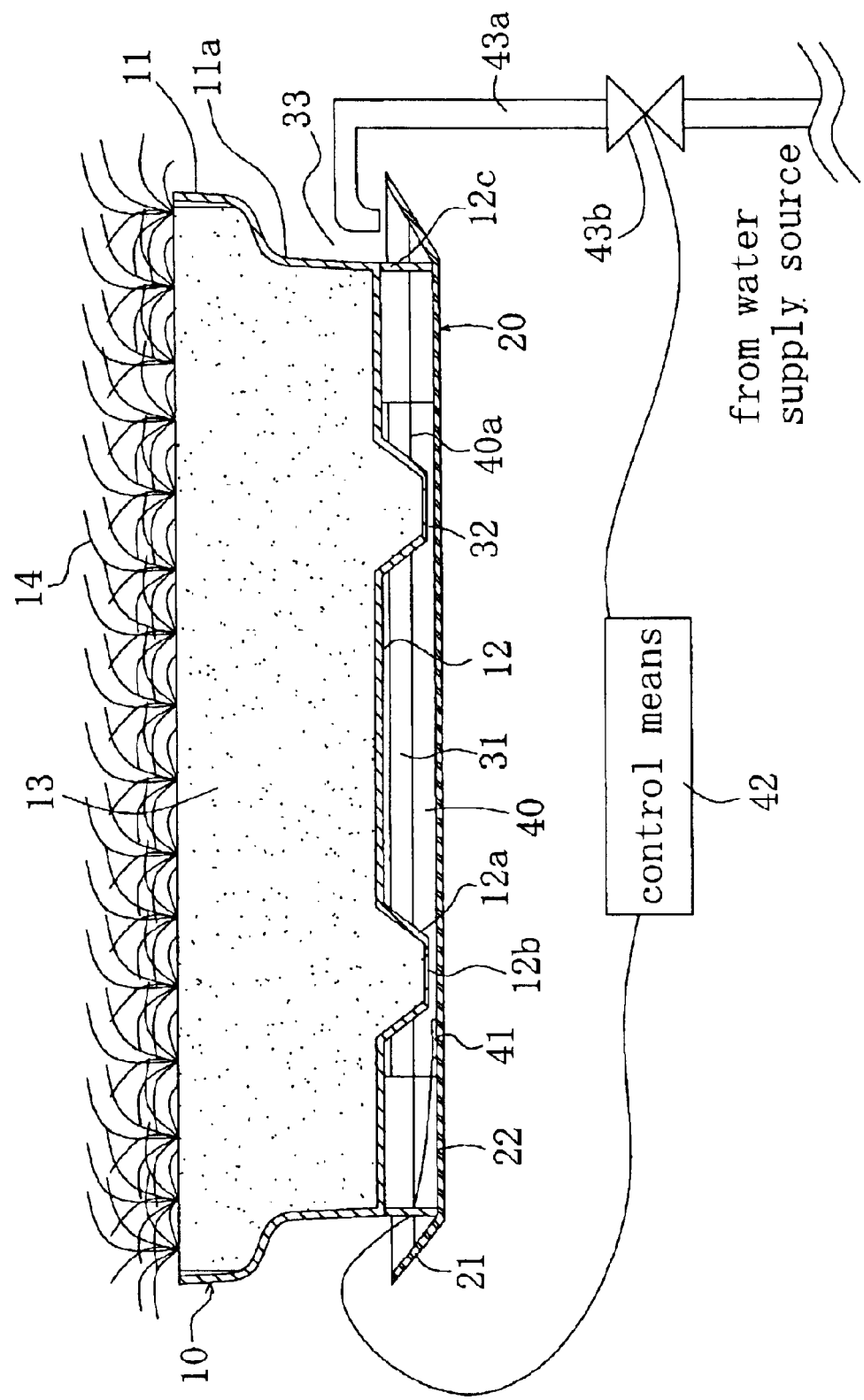
FIG. 1 is a total constitution view showing a first embodiment of an automatic water supply system according to the invention.
Figure 2:
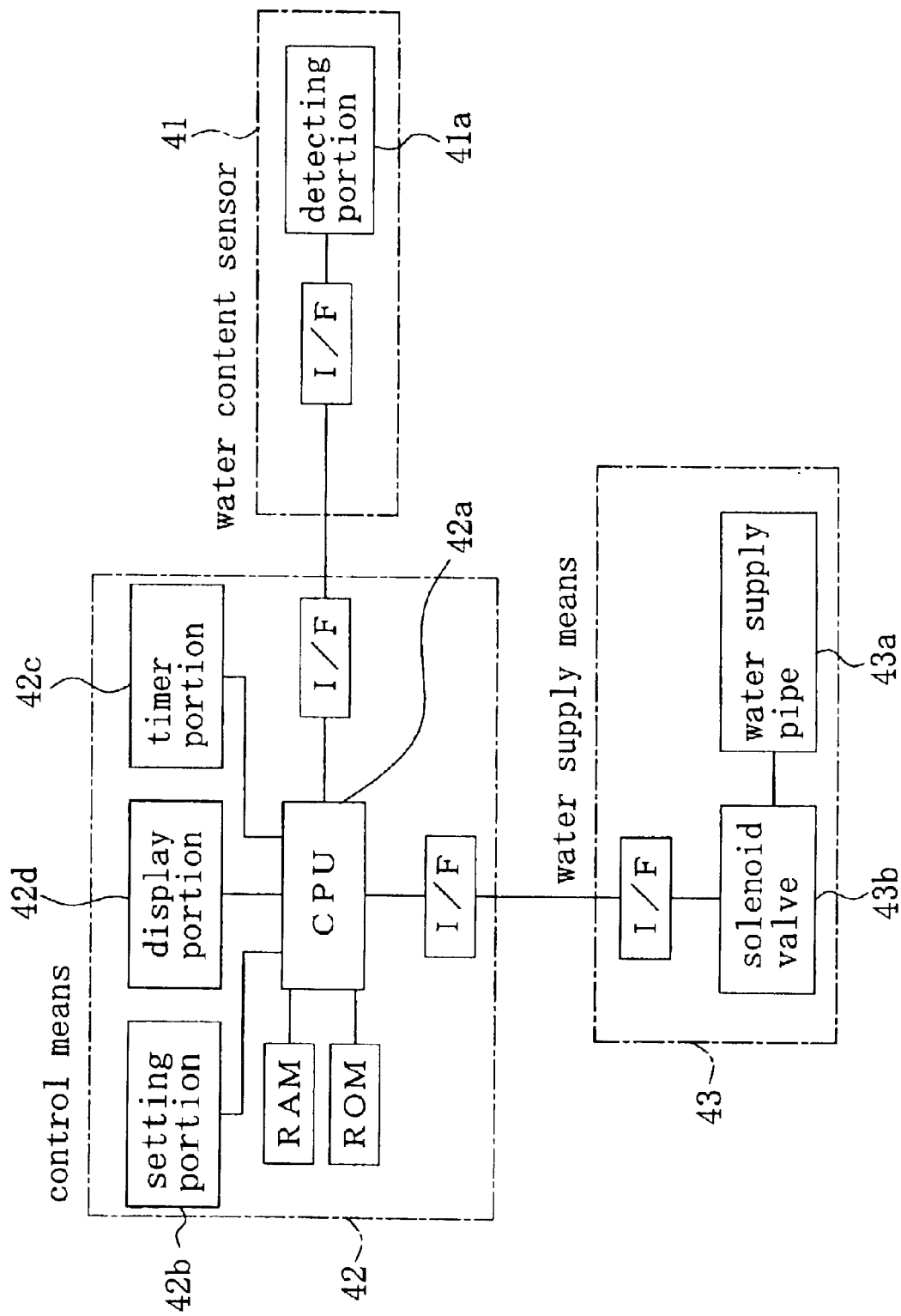
FIG. 2 is a system block diagram of the automatic water supply system according to the first embodiment.

FIG. 1 through FIG. 11 and FIG. 25 and FIG. 26 show embodiments when an object of water supply of the invention is single and FIG. 1 through FIG. 5 show a first embodiment. FIG. 1 is a total constitution view showing an automatic water supply system according to the first embodiment and FIG. 2 is a system block diagram of the automatic water supply system.

According to the automatic water supply system of the embodiment, water is supplied to a plant cultivating unit of a bottom face irrigation type in which a plant cultivating container 10 substantially in a box shape, an upper face of which is opened as shown by FIG. 1, is mounted on a water storage tray 20. By providing the water storage tray 20, a constant amount of water can be stored after water supply or in the case of natural rainfall and therefore, a number of times of water supply can be reduced.

The plant cultivating container 10 is a box member substantially in a square shape in plane view, an upper face of which is opened, a side face 11 thereof is formed with an inwardly recessed portion 11a and an opening portion thereof is widened toward an upper side. A bottom face 12 thereof is provided with a water absorption projected portion 12a a top portion of which is bored with a water absorption hole 12b and a leg portion 12c projected downward from the water absorption projected portion 12a and a plant 14 is planted in a soil 13 arranged at an inner portion thereof. The soil is constituted by a soil in which a plant of cut turf of the like is previously planted, or a soil separately filled in the cultivating container 10 and may be constituted by a cultivating material other than the soil. When a plurality of the plant cultivating containers 10 are laid as mentioned later, a space portion 33 is formed between the inwardly recessed portions 11a·11a and above the water storage tray 20, a wire connecting a water content sensor 41 and control means 42, a water supply pipe 43a or the like can be interposed in the space portion 33 and an outlook thereof excellent in a beautiful outlook can be maintained.

The water storage tray 20 the upper face of which is opened, is formed mainly in a taper shape and constituted by a side face 21 and a bottom face 22 having heights lower than that of the side face 11 of the front cultivating container 10, the water content sensor 41 is arranged above the bottom face 22 and water 40 having a water level of 40a is stored at an inner portion thereof. Further, the water content sensor 41 is provided at inside of the water storage tray 20 to constitute a water content state detecting portion, because a detected value of the water content state having high accuracy and stability can more preferably be provided as a reference for detecting the water content state of the plant cultivating unit or the like used in operating the automatic water supply system than in the case of providing the water content sensor 41 in, for example, the soil or the like, however, the water content state detecting portion can also be constituted by other portion such as soil and there can pertinently be adopted a constitution of providing the sensor in the soil in the case of, for example, a plant cultivating container which does not include the water storage tray or the like.

According to a state in which the plant cultivating container 10 is mounted on the bottom face 22 of the water storage tray 20, an upper end of the side face 21 of the water storage tray 20 is formed to be lower than the height of the leg portion 12c of the plant cultivating container 10 and therefore, an air layer 31 is necessarily formed between the bottom face 12 of the plant cultivating container 10 mounted thereon by the leg portion 12c and the water level 40a of water stored in the water storage tray 20 even when the water level 40a assumedly becomes an upper limit water level. By the air layer 31, ventilation can easily be carried out from a water passing and air passing hole, mentioned later, to inside of the plant cultivating container 10 to thereby enable to achieve a root rot preventive effect.

Further, by the leg portion 12c more projected than the water absorption projected portion 12a, the bottom face 12 of the plant cultivating container 10 is maintained at a position higher than the top portion of the side face 21 of the water storage tray 20 and a space portion 32 is formed between the top portion of the water absorption projected portion 12a and the bottom face 22 of the water storage tank tray 20. There is constructed a constitution in which water in the water storage tray 20 can be absorbed from the water absorption hole 12b formed at the top portion of the water absorption projected portion 12a into the plant cultivating container 10 by the capillary phenomenon to thereby constitute a plant cultivating unit of a so-to-speak bottom face irrigation type.

Further, there is constructed a constitution in which the water 40 stored in the water storage tray 20 is sucked up from the water absorption hole 12b of the plant cultivating container 10 and the water 40 is supplied to the soil 13 and the plant 14 in the plant cultivating container 10. Further, although omitted in FIG. 1, the bottom face 12 of the plant cultivating container 10 is bored with, for example, a plurality of holes for discharging water and ventilation, extra water in the plant cultivating container 10 can be delivered into the water storage tray 20 by the holes, air can be delivered from the air layer 31 to the soil 13 in the plant cultivating container 10 and root rot of the plant can be prevented.

Further, as shown by FIG. 1 and FIG. 2, the water content sensor 41 provided above the bottom face 22 of the water storage tray 20 is connected to control means 42 by a wire via interface I/F, further, the control means 42 is connected to an solenoid valve 43b for controlling to supply water of the water supply pipe 43a of water supply means 43 by a wire via interface I/F and opening/closing of the solenoid valve 43b is controlled by the control means 42. The water supply pipe 43a supplies the water 40 from a water supply source into the water storage tray 20 and a water supply port disposed at a front end thereof is directed to inside of the water storage tray 20. Further, connection between the control means 42 and the water content sensor 41 as well as the solenoid valve 43b in the automatic water supply system is not limited to connection by wires but can also be made wireless.

A detecting portion 41a of the water content sensor 41 is arranged with at least two of electrode members (conductive members) at a predetermined interval therebetween for detecting an amount of a water content by a resistance value when electricity is made to flow between the electrode members and when water is present to some degree, the resistance value between the electrode members is reduced. Meanwhile, when the water is reduced, the resistance value between the electrode members is increased since the electrode members are insulated by air. Further, when the resistance value between the electrode members reaches or exceeds a constant value, a state of being deficient in water is detected and when the resistance value reaches or does not exceed the constant value, a state of being sufficient in water is detected to thereby detect presence or absence of water. The determination of detection maybe carried out by the control means 42 by acquiring a measured value of the water content sensor 41 by the control means 42.

Further, it is possible to use a pertinent one of the water content sensor 41 capable of detecting a necessary amount of water. Further, in detecting presence or absence of the water content amount, there may be constructed a constitution in which absence of a predetermined amount of water is detected when the resistance value between the electrode members reaches a predetermined reference upper limit resistance value and presence of the predetermined water amount is detected when the resistance value reaches a predetermined reference lower limit resistance value, further, there may be constructed a constitution in which instead of using the same reference resistance values for the reference upper limit resistance value and the reference lower limit resistance value, for example, two of upper limit and lower limit reference resistance values are separately set and used for the reference upper limit resistance value and the reference lower limit reference value and water is supplied after detecting absence of the water content amount until the reference lower limit resistance value is reached. The reference upper limit resistance value and the reference lower limit resistance value can pertinently be changed to set to required values.

The constant value can be set to a required value by a setting portion 42b of the control means 42, mentioned later, for example, when the constant value is set to 600 k$\Omega$, deficiency of water is detected when the set 600 k$\Omega$ is reached or exceeded, when water is supplied by supplying water by the water supply means 43 or rainfall or the like, the resistance value between the electrode members is reduced and when the resistance value becomes smaller than 600 k$\Omega$, sufficiency of water is detected. With respect to the constant value, a constant value for detecting deficiency of water and a constant value for detecting sufficiency of water may be set to be different from each other, for example, may be set to 600 k$\Omega$ and 500 k$\Omega$. By such setting, when a predetermined amount of water is not supplied by water supply or rainfall from a water deficient state, a necessary amount of water can firmly be supplied.

As shown by FIG. 2, the control means 42 of the embodiment is constituted mainly by connecting the setting portion 42b, a timer portion 42c, a display portion 42d, RAM and ROM for storing required items to CPU 42a and is connected respectively to the water content sensor 41 and the water supply means 43 via interface I/F connected to CPU 42a.

The setting portion 42b is a portion for setting a necessary content in the control means 42 and is a portion for setting various values of the constant value comparing with the resistance value of the water content sensor 41, a first predetermined time period and a second predetermined time period, mentioned later, and the like. The time portion 42c is a portion for measuring a predetermined period of time under instruction of CPU 42a and includes at least a first timer portion for measuring the first predetermined time period and a second timer portion for measuring the second predetermined time period, mentioned later, according to the embodiment. The display portion 42d is a portion for displaying a required content of an operational situation of the timer portion 42c and is, for example, LED, a liquid crystal screen or the like and by displaying an operational content in the display portion 42d from time to time, it can be recognized at a glance whether the automatic water supply system is operated normally. Further, the control means 42 may be provided with informing means for informing an abnormality when detected.

The water supply means 43 supplies water by the water supply pipe 43a and controls to supply water by the solenoid valve 43b provided at the water supply pipe 43a. The solenoid vale 43b of the water supply means 43 is connected to CPU 42a of the control means 42 via interface I/F and opening/closing of the solenoid valve 43b and accordingly, start and stop of water supply by the water supply means 43 is controlled by the control means 42.

Figure 3:
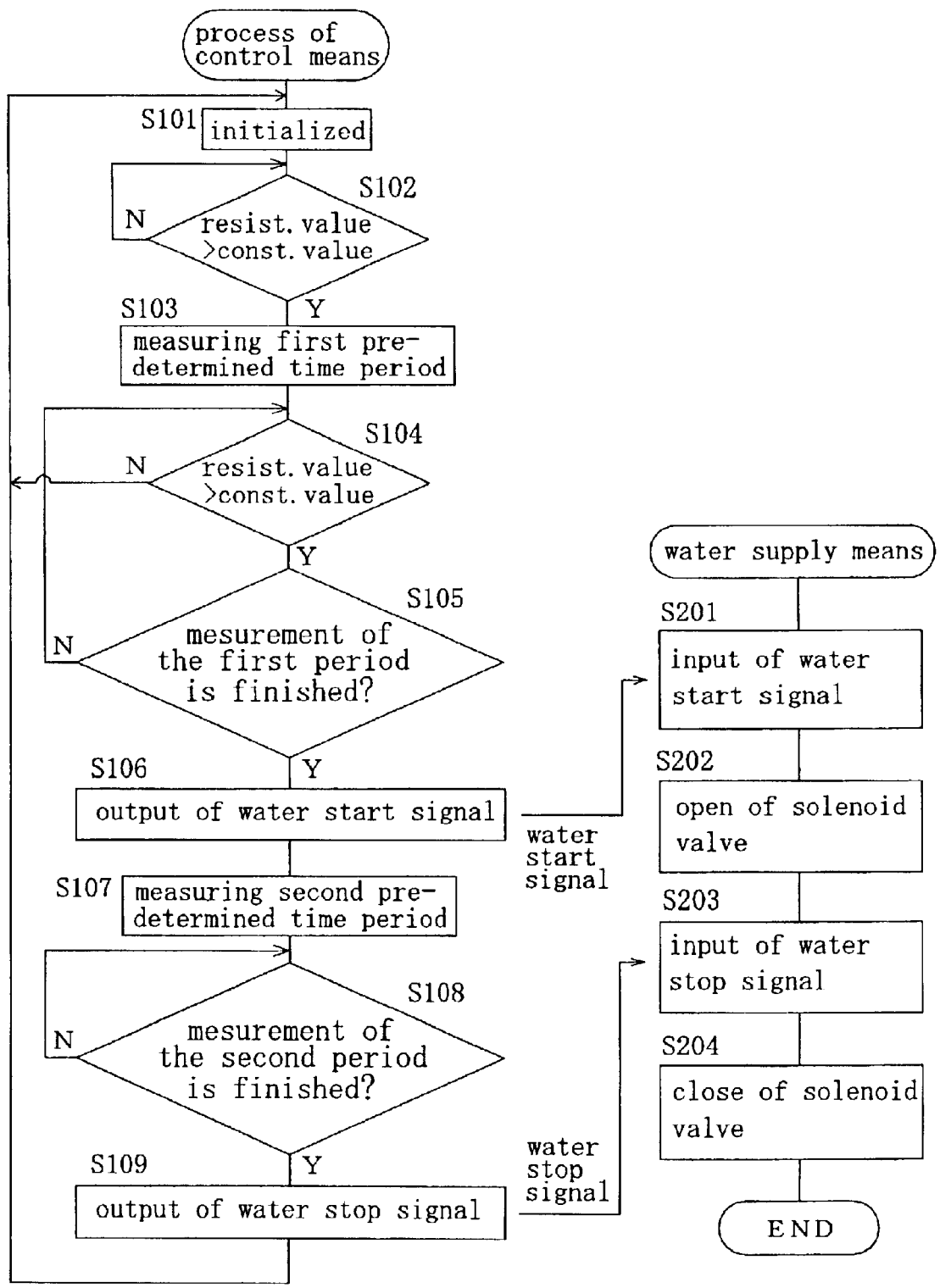
FIG. 3 is a flow chart showing processings of control means and water supply means according to the automatic water supply system of the first embodiment.
Figure 4:
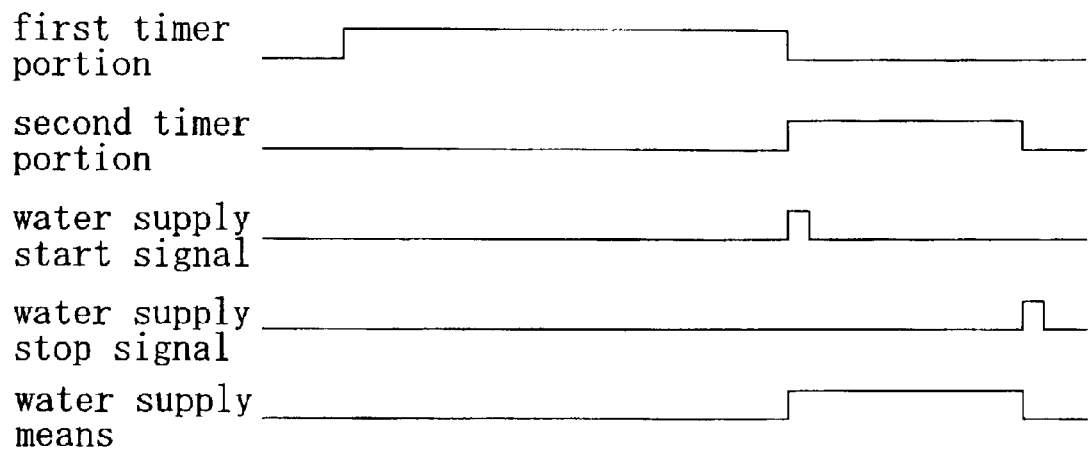
FIG. 4 is a time chart when water is supplied by the automatic water supply system according to the first embodiment.
Figure 5:
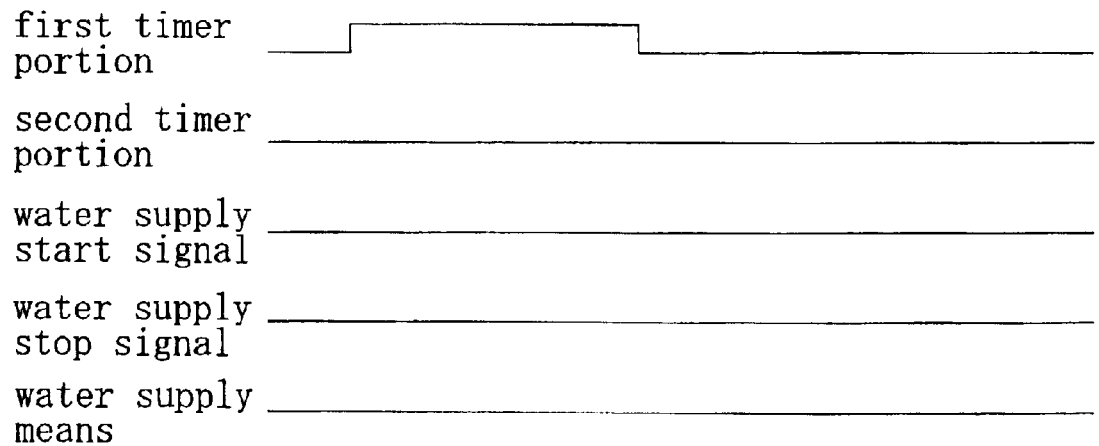
FIG. 5 is a time chart when water is not supplied by the automatic water supply system of the first embodiment.

Next, an explanation will be given of a procedure of carrying out an automatic water supply processing by the automatic water supply system having the above-described constitution. FIG. 3 is a flow chart showing processings of the control means and the water supply means in the automatic water supply system, FIG. 4 is a time chart when water is supplied by the above-described automatic water supply system and FIG. 5 is a time chart when water is not supplied by the above-described automatic water supply system.

First, as shown by FIG. 3, in a state in which CPU 42a of the control means 42 is initialized (S101), the detecting portion 41a of the water content sensor 41 measures the resistance value between the electrode members continuously or at respective predetermined time periods and the resistance value constituting a result of detection is inputted from the water content sensor 41 to initialized CPU 42a. CPU 42a determines whether the resistance value is inputted and when CPU 42a recognizes that the resistance value is inputted, CPU 42a compares the inputted resistance value and the predetermined constant value set by the setting portion 42b.

When the resistance value exceeds the constant value or the resistance value reaches the constant value as a result of comparing the resistance value and the constant value, the first timer portion of the timer portion 42c is operated to start measuring the first predetermined time period (S103), on the other hand, when the resistance value does not exceed or reach the constant value, comparison between a newly inputted resistance value and the constant value is repeated (S102).

Further, during a time period until the first timer portion finishes measuring the first predetermined time period, a newly measured resistance value is inputted from the water content sensor 41 and a comparison thereof with the constant value is continuously carried out, so far as the respective resistance value exceeds the constant value or the respective resistance value reaches the constant value as a result of comparison between the resistance value inputted in the first predetermined time period and the constant value, measurement of the first predetermined time period and the comparison between a new resistance value and the constant value is continued, when the inputted resistance value does not exceed the constant value or the resistance value doe not reach the constant value, there is carried out a processing in which the control means 42 returns to the initialized state such as stopping the measurement of the first predetermined time period by the first timer portion and the processing is carried out until the measurement of the first predetermined time period is finished (S104).

Next, when all of the resistance values continuously inputted during the first predetermined time period exceed the constant value or all of the resistance values reach the constant value and measurement of the first predetermined time period is finished (S105), a water supply start signal for bringing the solenoid valve 43b of the water supply means 43 into an opened state, is outputted from CPU 42a (S106), and the second timer portion of the timer portion 42c starts measuring the second predetermined time period by control of CPU 42a (S107) According to the water supply means 43, by input of the water supply start signal (S201), the solenoid value 43b is opened and water is started to supply to inside of the water storage tray 20 by the water supply pipe 43a (S202).

When operation of the second timer portion is finished by finishing measurement of the second predetermined time period (S108), CPU 42a returns to the initialized state by outputting a water supply stop signal for bringing the solenoid valve 43b into a closed state (S109). By input of the water supply stop signal (S203), the solenoid valve 43b is brought into the closed state and water is stopped to supply into the water storage tray 10 by the water supply pipe (S204). The above-described processings are repeatedly carried out automatically and water supply to the water storage tray 20 is automatically controlled.

According to the time chart of the case of supplying water in the above-described processings, as shown by FIG. 4, when the inputted resistance value is brought into a state of exceeding the constant value, the first timer portion starts operating to be brought into an ON state, measurement of the first predetermined time period is started and after elapse of the first predetermined time period, the first timer portion is brought into an OFF state. Further, simultaneously with bringing the first timer portion into the OFF state, the water supply start signal is instantaneously brought into an ON state to output to thereby bring the water supply means 43 into an ON state and start to supply water and the second timer portion is brought into an ON state to start to measure the second predetermined time. During measurement of the second predetermined time period, the resistance value measured by the water content sensor 41 does not exceed the constant value by supplied water. Next, simultaneously with finishing measurement of the second predetermined time period and bringing the second timer portion into an OFF state, the water supply stop signal is instantaneously brought into an ON state to output and the water supply means 43 is brought into an OFF state to stop supplying water.

Further, according to the time chart in the case of not supplying water, as shown by FIG. 5, when the inputted resistance value is brought into a state of exceeding the constant value, the first timer portion starts operating to be brought into the ON state and starts to measure the first predetermined time period. Further, during the time period until finishing to measure the first predetermined time period, the resistance value does not exceed the constant value, the first timer portion is brought into the OFF state and measurement is finished. This is a case in which although deficiency of water is temporarily detected, in measuring the first predetermined time period, rainfall or artificial water supply or the like is carried out.

By using the automatic water supply system according to the first embodiment, when the state in which water is deficient is detected by the water content sensor 41, the first predetermined time period is measured and stress of the first predetermined time period of being deficient in water, can be given to the plant and a robust plant can be cultivated in a state of being as natural as possible. Further, when the state of being deficient in water is resolved by rainfall or the like in measuring the first predetermined time period, water supply can be stopped and root rot can be prevented. Further, stop of water supply and setting and control of the water supply time period by measuring the second predetermined time period by the second timer portion, can be carried out and therefore, it is not necessary to supply extra water and plant cultivating and maintaining cost can be reduced.

Further, by the constitution of setting both or at least one of the first predetermined time period and the second predetermined time period by the setting portion 42b, a better environment for the plant can be created in accordance with a kind and a location of installing the plant and the environment and desire of the user can be adopted. For example, the first predetermined time period can be set to be long such as one weak or the like and the second predetermined time period can be set to be short such as an hour or the like although depending on a size of the object of water supply.

Further, although according to the embodiment, there is constructed the constitution of measuring the second predetermined time period and water supply is stopped after elapse of the second predetermined time period, for example, even when there is constructed a constitution in which, for example, a flow rate meter is installed at a water path comprising the water supply pipe 43a, and water supply is stopped when a measured value of the flow rate meter reaches or exceeds a previously determined flow rate value after starting to supply water, the constitution is excellent since the predetermined amount of water supply is firmly carried out. Specifically, a flow rate in the water supply pipe 43a is summed up based on the measured value of the flow rate meter and water supply is stopped by bringing the solenoid valve 43b into the closed state based on a predetermined summed-up flow rate.

Figure 6:
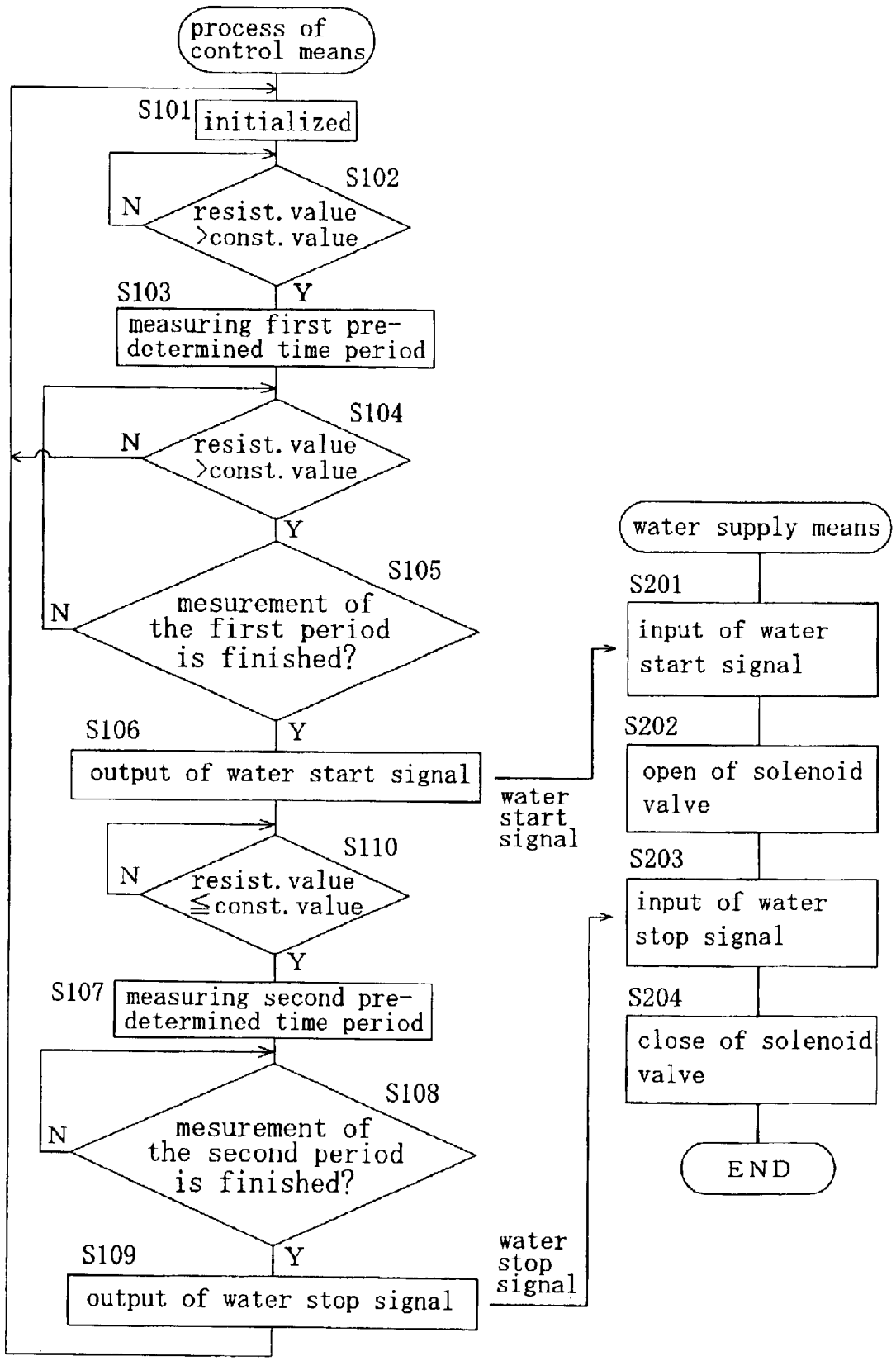
FIG. 6 is a flow chart showing processings of control means and water supply means according to an automatic water supply system of a second embodiment.
Figure 7:
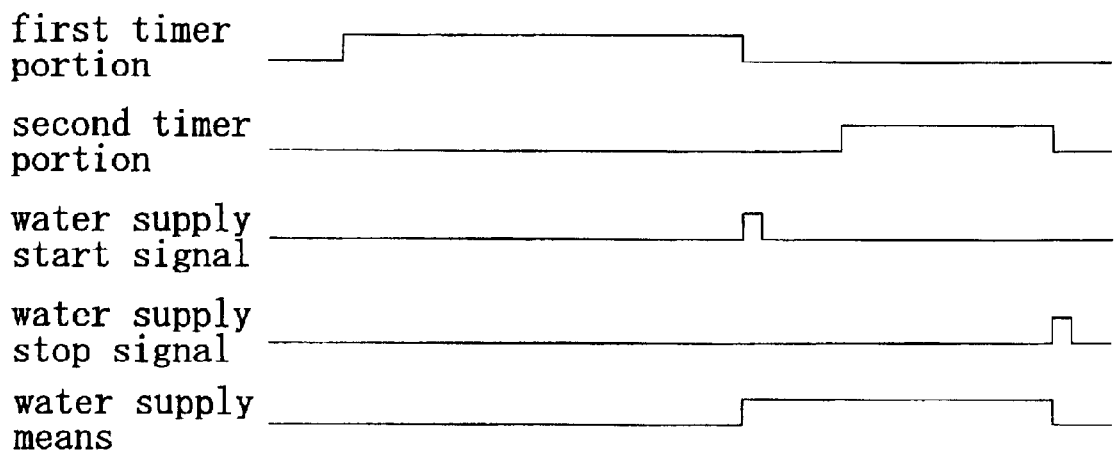
FIG. 7 is a time chart when water is supplied by the automatic water supply system according to the second embodiment.
Figure 8:
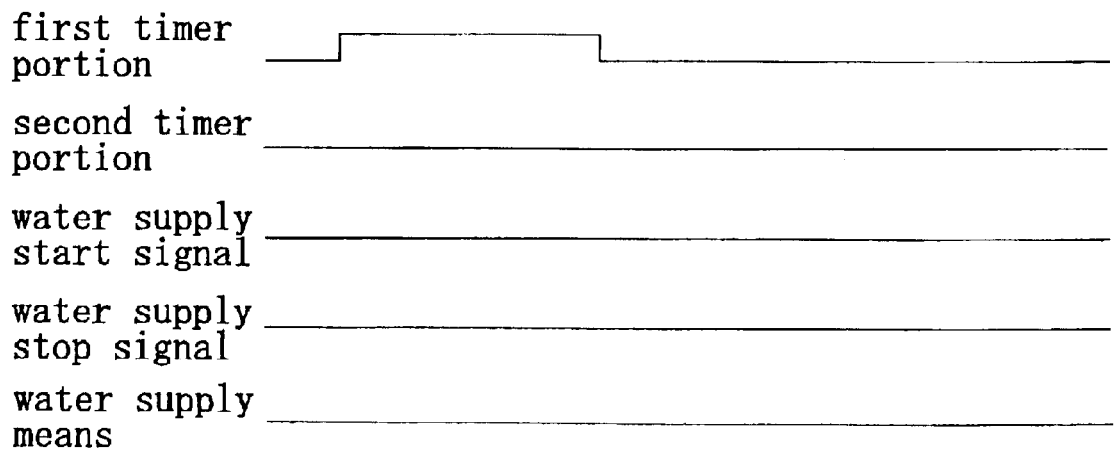
FIG. 8 is a time chart when water is not supplied by the automatic water supply system according to the second embodiment.

Next, an explanation will be given of a second embodiment of an automatic water supply system according to the invention by centering on a portion thereof different from the first embodiment. FIG. 6 through FIG. 8 show the second embodiment, FIG. 6 is a flow chart showing processings of control means and water supply means in the automatic water supply system according to the second embodiment, FIG. 7 is a time chart when water is supplied by the automatic water supply system and FIG. 8 is a time chart when water is not supplied by the automatic water supply system.

Although the automatic water supply system of the embodiment is basically similar to the first embodiment, the automatic water supply system of the embodiment is an embodiment in which time of starting to operate the second timer operation of the timer portion 42c is made to differ. That is, the water supply start signal is outputted by control means 42 (S106), thereafter, the respective resistance value inputted from the water content sensor 41 is successively compared with the constant value and when the necessary amount of water is ensured by supplying water and the inputted resistance value does not exceed or does not reach the constant value (S110), that is, it is confirmed that water is supplied firmly and thereafter, the second timer portion starts operating to start measuring the second predetermined time period (S107).

Therefore, in the time chart, when water is supplied as shown by FIG. 7, even after the first timer portion is stopped to finish to measure the first predetermined time period, the second timer is not operated, when inputted resistance value does not exceed the constant value, the second timer portion is operated to start measuring the second predetermined time period and there is produced a time lag between time of finishing measurement by the first timer portion and time of starting measurement by the second timer portion. Further, other characteristic of the time charts of FIG. 7 and FIG. 8 are similar to those in the first embodiment.

By using the second embodiment, it is possible to prevent beforehand that an amount of supplying water differs by a case in which water remains at inside of the water supply pipe 43a and a case in which water does not remain therein and a necessary amount of water can be supplied firmly into the water storage tray 20. That is, when water does not remain in the water supply pipe 43a, there is taken a time period until water reaches the object of water supply, conversely, when water remains at inside of the water supply pipe 43a, although a time period is not taken for water to reach the object of water supply, an error of the water supply amount caused thereby can be eliminated and the water supply amount can be maintained constant.

Figure 9:
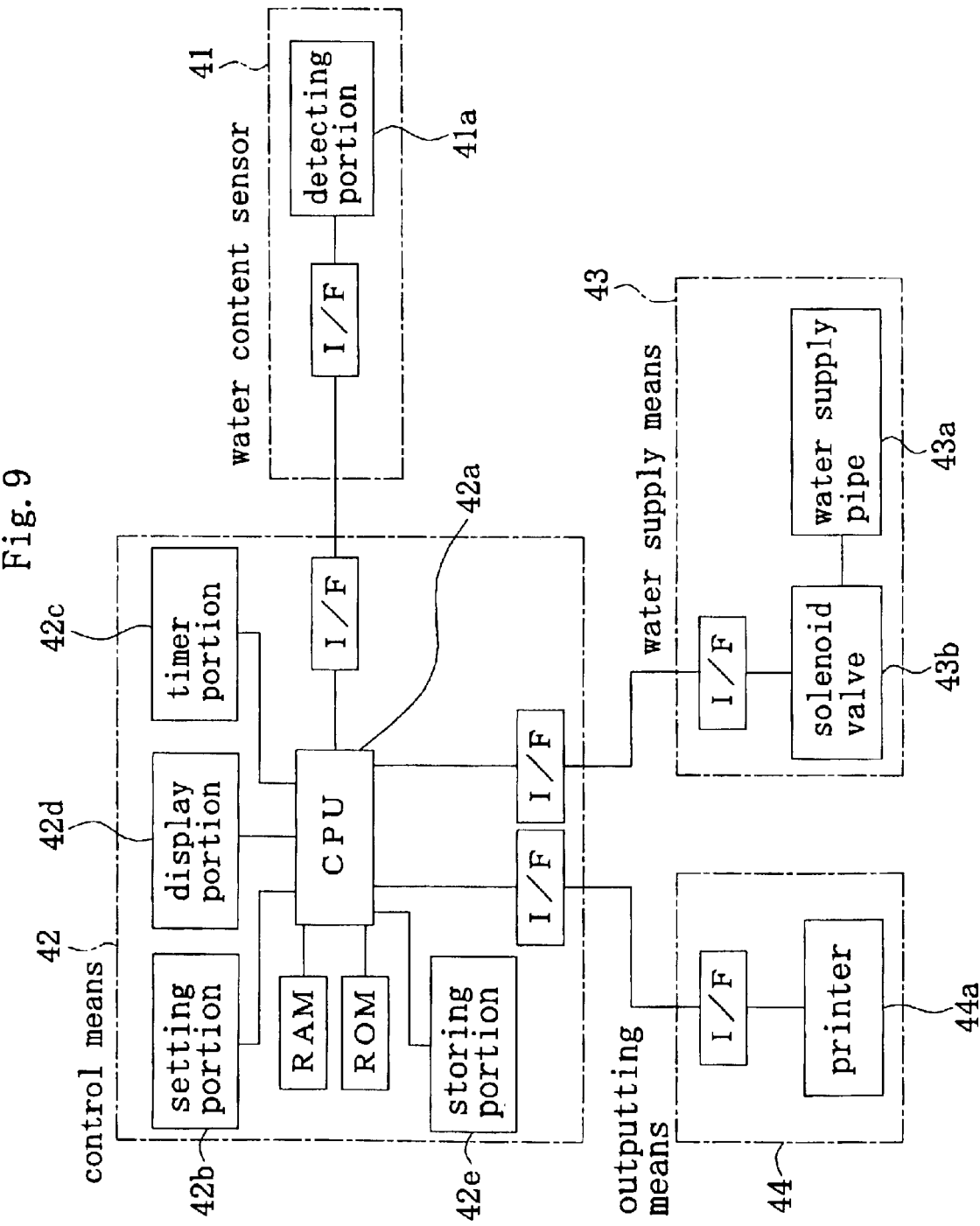
FIG. 9 is a system block diagram of an automatic water supply system according to a third embodiment.

Next, an explanation will be given of a third embodiment of an automatic water supply system according to the invention. FIG. 9 through FIG. 11 show the third embodiment, FIG. 9 is a system block diagram of the automatic water supply system according to the third embodiment, FIG. 10 shows a document with regard to an automatic water supply system control yearly content by outputting means of the automatic water supply system and FIG. 11 shows a set content confirmation table by the outputting means of the automatic water supply system.

According to the automatic water supply system of the embodiment, as shown by FIG. 9, in addition to the constitution of the automatic water supply system of FIG. 2, in the control means 42, a storing portion 42e is connected to CPU 42a and CPU 42a is further connected to a printer 44a of outputting means 44 via interface I/F. Further, although the control means 42 is connected to the separate outputting means 44, the control means 42 and the outputting means 44 can also be integrated.

The storing portion 42e is a portion for storing a control content by the control means 42 from time to time and is constituted such that for example, when power breakdown is brought about in measuring at the timer portion 42c, a measuring situation at the time point is stored and counting can be carried out again from the measuring situation in the power breakdown after recovering power. That is, when power breakdown is brought about in measuring the first predetermined time period, the measuring situation of the first predetermined time period is stored and after recovering power, from the measuring situation, measurement of the first predetermined time period is started and therefore, it can be prevented beforehand that counting of the first predetermined time period is initialized in power breakdown and a time period of not supplying water is prolonged. Further, also with regard to the second predetermined time period, by the above-described constitution, it can be prevented beforehand that a time period of supplying water is prolonged.

The printer 44a of the outputting means 44 is a portion capable of outputting a content stored to the storing portion 42e, a content set by the setting portion 42b and the like and can output, for example, a document with regard to details of a control content over a year by the control means 42 as shown by FIG. 10, and a set content confirmation table for printing out a set content of the automatic water supply system as shown by FIG. 11.

The yearly control content document of FIG. 10 is described with date, time and control content, operation until the control means 42 is initialized is classified as a single operation and is printed, further, when a set content is automatically or manually changed, date and time of change and content of change thereof are printed and outputted and therefore, it can be recognized over a year whether the automatic water supply system is operated normally. According to the document, for example, the first timer portion starts operating at a.m. 9 o'clock 5 minute of Jan. 14, 1998 and is initialized at p.m. 8 o'clock 34 minute of Jan. 18, 1998 and it is recognized whether rainfalls or water is supplied artificially from around p.m. 8'clock 30 minute of Jan. 18, 1998.

Further, as shown by the set content confirmation table of FIG. 11, two kinds of the first predetermined time period are set, it is set that the first predetermined time period is automatically switched on May 1 and November 1 and the interval of giving stress to the plant is changed by winter and summer. One kind of the second predetermined time period is set. Further, 600 kΩ is set as the resistance value constituting a constant value for comparing with a resistance value acquired by the water content sensor 41 and when the acquired resistant value is equal to or larger than 600 kΩ, measurement of the first predetermined time period is started. Further, the method of supplying water can be set automatically or manually and when water is intended to supply artificially, by manually setting the method, plant cultivation can be enjoyed.

By printing and outputting the set content or the like as described above, even when the set content or the like is forgotten, the set content or the like can instantly be grasped at a glance. Further, by comparing the yearly control content document and the set content confirmation table, it can be grasped whether the control means 42 is operated normally.

Further, the control content, the set content or the like may be displayed on the display portion 42d. Further, layout of the yearly control content document and the set content confirmation table is not limited to those in the above-described embodiment. Further, the print content is not limited thereto but date and time of bringing about abnormality, content of the abnormality or the like may be printed. Further, after all, also the set content is an embodiment and can be set variously.

Figure 13:
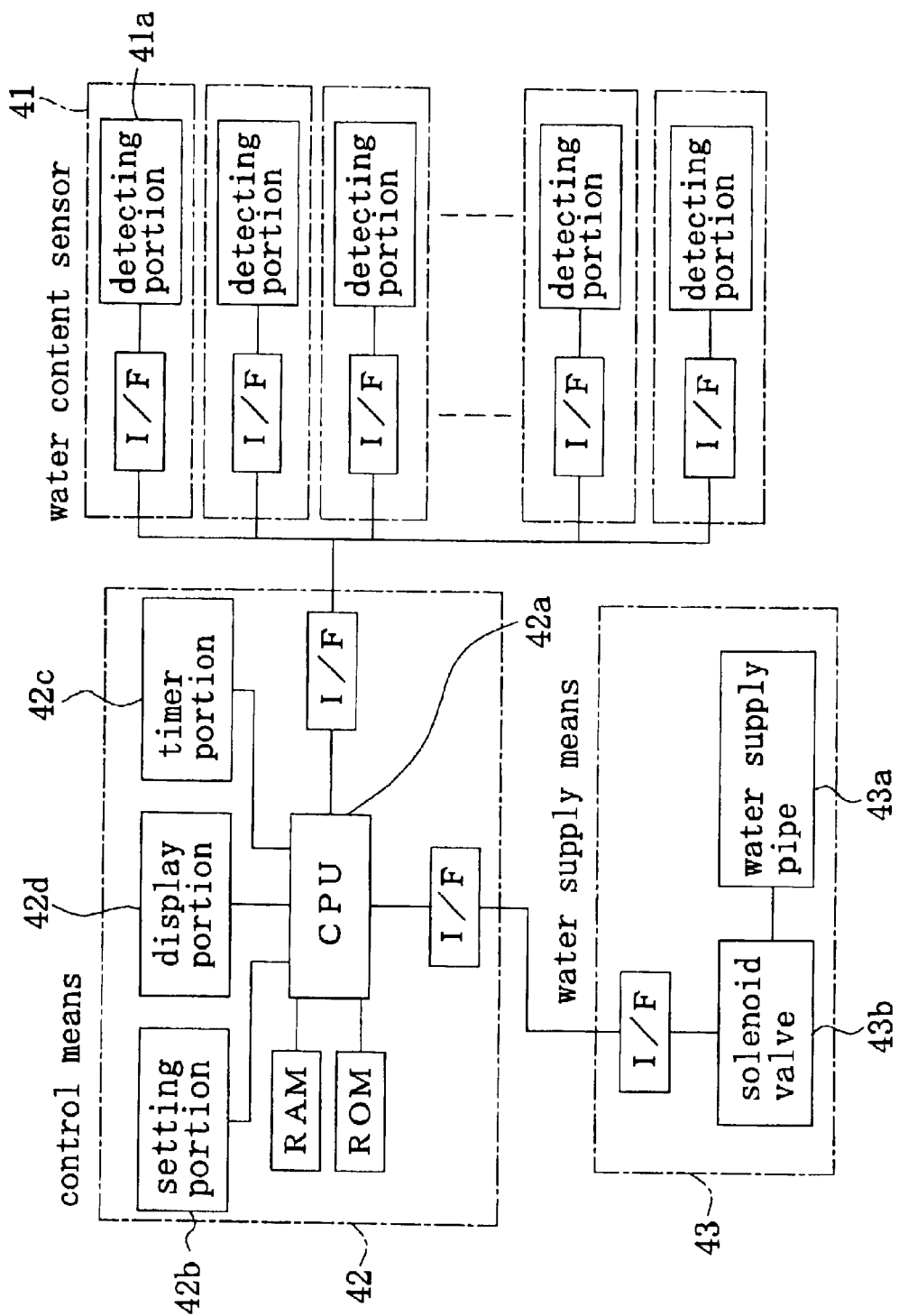
FIG. 13 is a system block diagram of the automatic water supply system according to the fourth embodiment.
Figure 14:
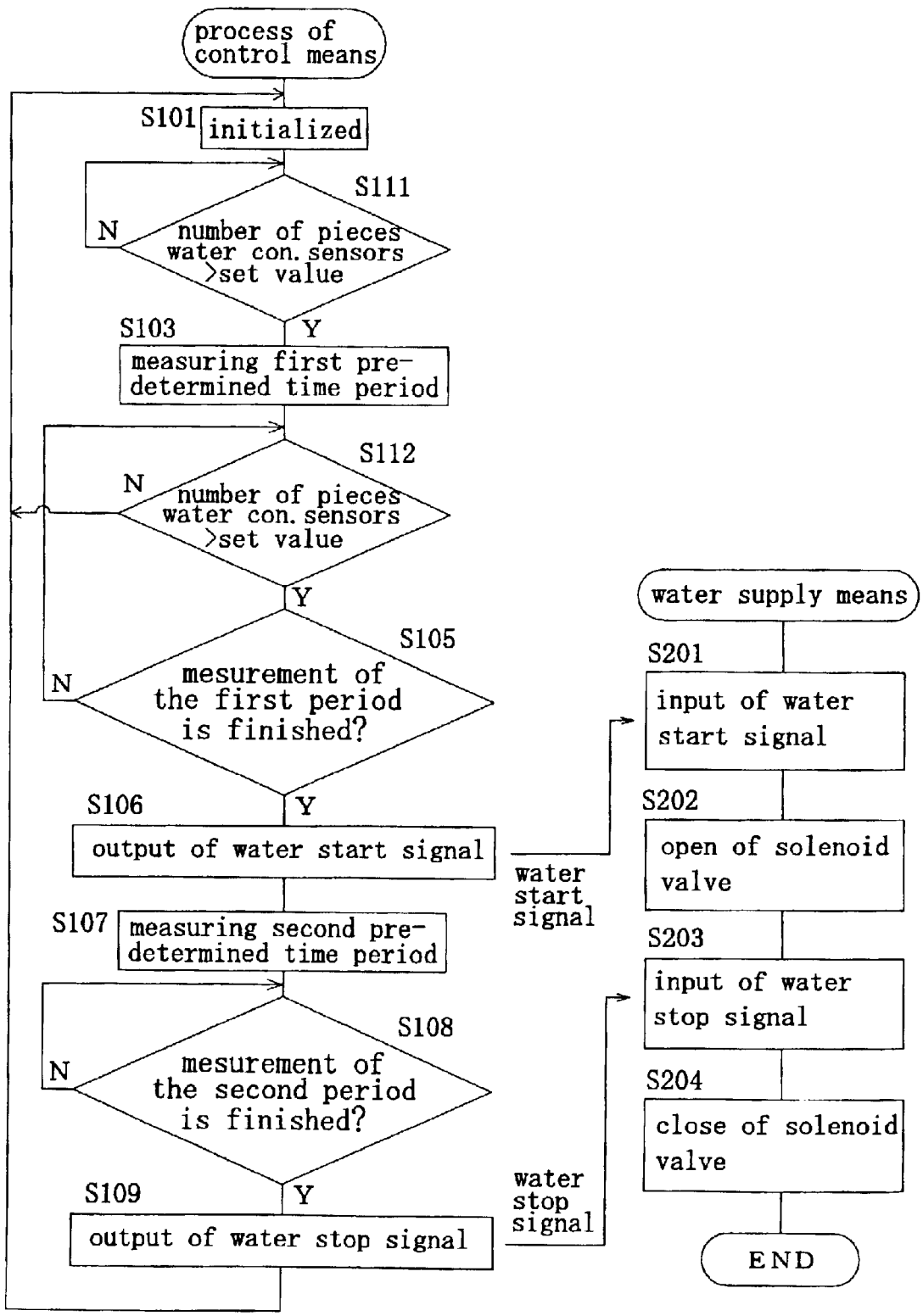
FIG. 14 is a flow chart showing processings of control means and water supply means in the automatic water supply system according to the fourth embodiment.

Next, an explanation will be given of a fourth embodiment of an automatic water supply system according to the invention. The automatic water supply system according to the fourth embodiment shown in FIG. 12 through FIG. 14, supplies water to a plurality of the laid water storage trays 20, FIG. 12 is a total constitution view showing the automatic water supply system, FIG. 13 is a system block diagram of the automatic water supply system and FIG. 14 is a flow chart showing processings of control means and water supply means in the automatic water supply system.

The water storage tray 20 according to the embodiment is a box member having a substantially square shape in plane view, an upper portion of which is opened and is constructed by a constitution in which an upper end portion of the side face 21 is provided with respective two pieces of narrow width connecting and engaging portions 23a and a wide width connecting and engaging portions 23b having sections substantially in a hook shape and when a plurality of the water storage trays 20 are laid to align, the water storage trays 20 can be laid in a state in which an upper portion of the narrow width connecting and engaging portion 23a of one of the water storage strays 20, is covered with and connected with the wide width connecting and engaging portion 23b of other of the water storage strays 20. Further, there is constructed a constitution in which recessed portions 23c for flowing of water are provided at least at a pair of the connecting portions 23a and 23b opposed to each other substantially at centers of upper ends of the narrow width connecting and engaging portion 23a and the wide width connecting and engaging portion 23b, a water flow path is formed from an upper side to a lower side by the recessed portions 23c when the plurality of water storage trays 20 are connected and water can flow in a constant direction.

Figure 12:
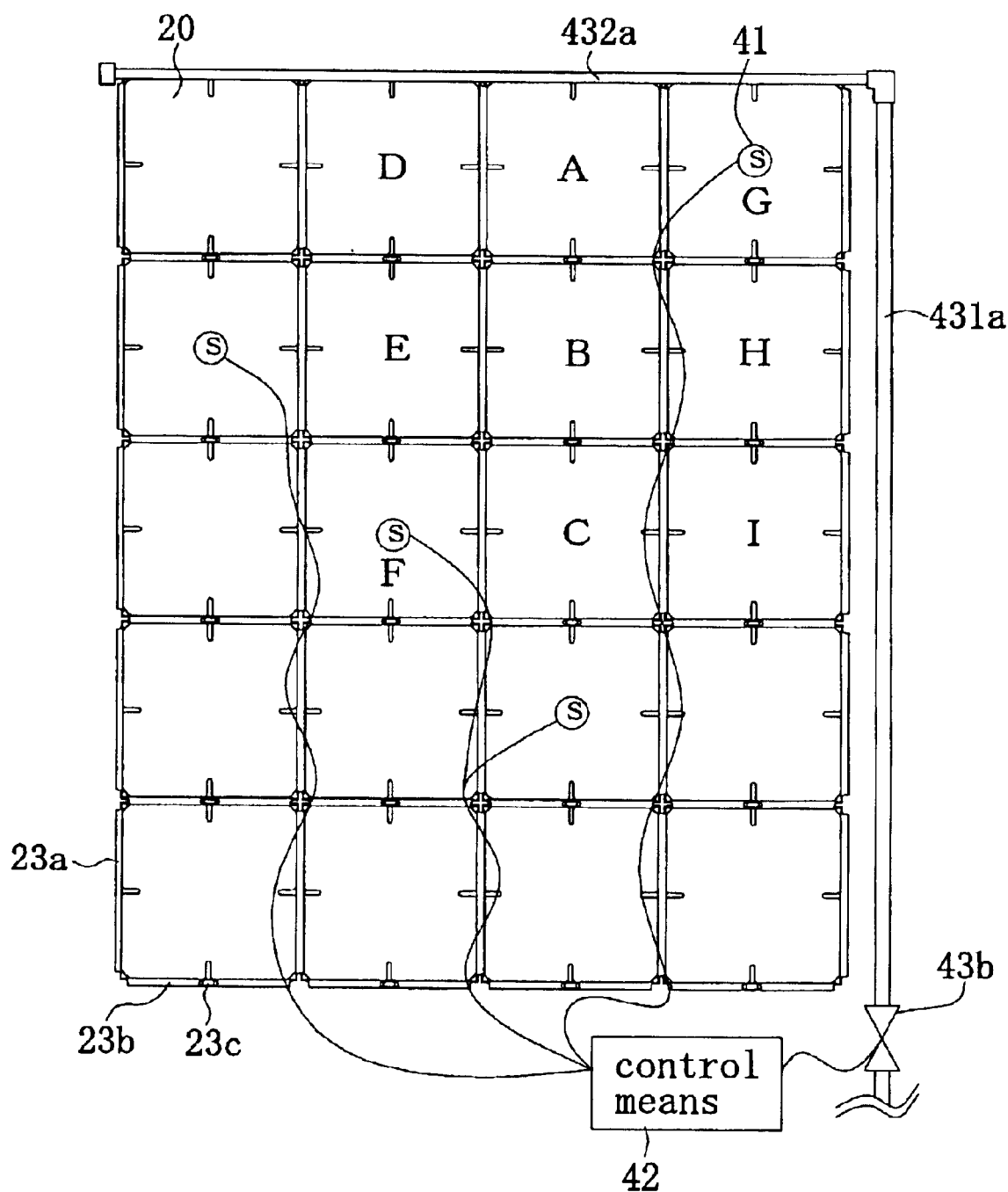
FIG. 12 is a total constitution view showing an automatic water supply system according to a fourth embodiment.

Further, in FIG. 12, there is arranged a water supply main pipe 431a connected to a water source of water service, a water storage tank or the like and provided with the solenoid valve 43b at a midway thereof in a longitudinal direction, and there is arranged a water supply branch pipe 432a constituting a porous pipe connected to the water supply main pipe 431a above the water storage trays 20 and at an upper position orthogonal to the water flow path. Further, a location of installing the solenoid valve 43b may be disposed on the side of the water supply branch pipe 432a connected to the water supply main pipe 431a or may be provided at a vicinity of a portion connecting the both pipes.

By the above-described constitution, water flowing out from the porous portion of the water supply branch pipe 432a is supplied to an uppermost one of the water storage trays 20, and when water is stored in the water storage tray 20 and goes over the recess portion 23c for flowing of water disposed on the lower side, water is supplied successively to the water storage trays 20 on the lower side and therefore, the water storage trays 20 which are not supplied with water can be eliminated. That is, even when there is present a projected portion at a face of laying B, since the water flow path from A is not present in D or G, water from A is firmly supplied to B without detouring D or G and thereafter supplied to C. Therefore, all of the water storage trays 20 can firmly be supplied with water. In other words, it is possible to regulate a water flow direction to one direction by the recessed portion 23c and supply water by the porous pipe evenly to all of the water storage trays 20.

Further, when an arbitrary number of four or the like of pieces of the water content sensors 41 are provided at arbitrary portions of the plurality of laid water storage trays 20, the water content sensors 41 are connected to the control means 42 via wires and the control means 42 is connected to the solenoid valve 43b. When a predetermined number of pieces of the water content sensors 41 is set as a set value, according to the control means 42, as shown by FIG. 14, when a number of pieces of the water content sensors 41 in each of which an acquired resistance value exceeds a constant value, exceeds the set value or equal to or larger than the set value (S111), the first timer portion is operated to measure the first predetermined time period (S103), when there is maintained a state in which a number of pieces of the water content sensors 41 in each of which the acquired resistance value exceeds the constant value, exceeds the set value or equal to or larger than the set value during a time period until finishing to measure the first predetermined time period (S112), the water supply start signal is outputted (S106), and the second timer portion is operated to measure the second predetermined time period (S107). The other constitution is the same as that in the first embodiment. By the above-described constitution, presence or absence of water can accurately be detected and the plant can be cultivated further firmly.

Further, the time of operating the second timer portion according to the fourth embodiment may be started simultaneously with when a number of pieces of the water content sensors 41 in each of which the resistance value acquired after outputting the water supply start signal does not exceed the constant value, reaches a predetermined number of pieces thereof similar to the second embodiment, or there may be constructed also a constitution in which the previously determined number of pieces thereof can be set arbitrarily. Thereby, regardless of presence or absence of water in the water supply pipe 43a, a necessary amount of water can be supplied to the plant.

Figure 15:
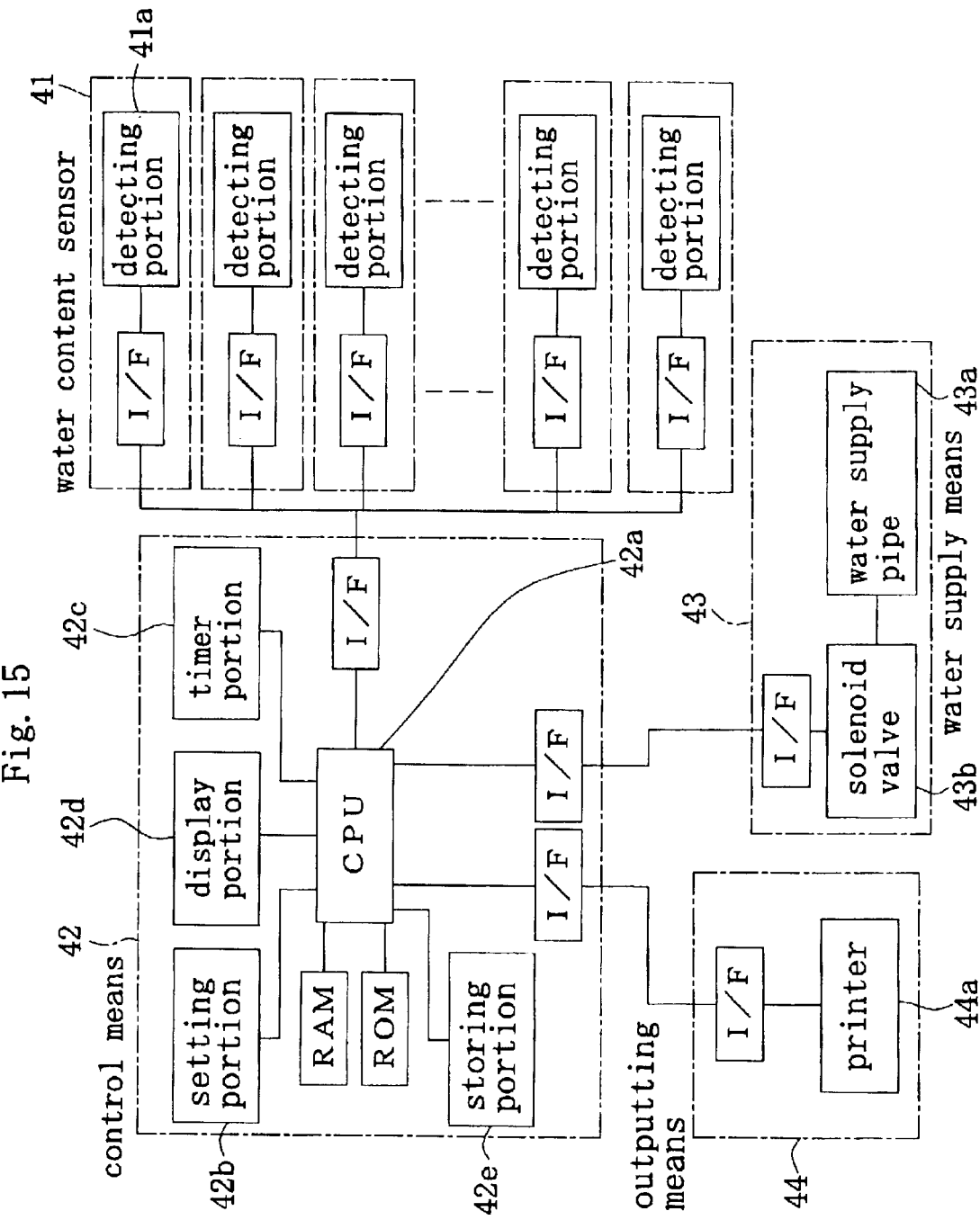
FIG. 15 is a system block diagram of an automatic water supply system according to a fifth embodiment.

An explanation will be given of an automatic water supply system according to a fifth embodiment as a modified example of the above-described fourth embodiment. FIG. 15 is a system block diagram of the automatic water supply system according to the fifth embodiment, FIG. 16 shows a document with regard to an automatic water supply system control monthly content by the outputting means of the automatic water supply system and FIG. 17 shows a set content confirmation table by the outputting means of the automatic water supply system.

As shown by FIG. 15, similar to the third embodiment, the automatic water supply system of the embodiment is provided with the storing portion 42e connected to CPU 42a in the control means 42 and CPU 42a is connected to the printer 44a of the outputting means 44 via interface I/F. Although the output content by the printer 44a may be constituted by the control content yearly document similar to the third embodiment and the set content confirmation table of FIG. 17, a monthly document of the control content maybe outputted as shown by, for example, FIG. 16.

Figure 18:
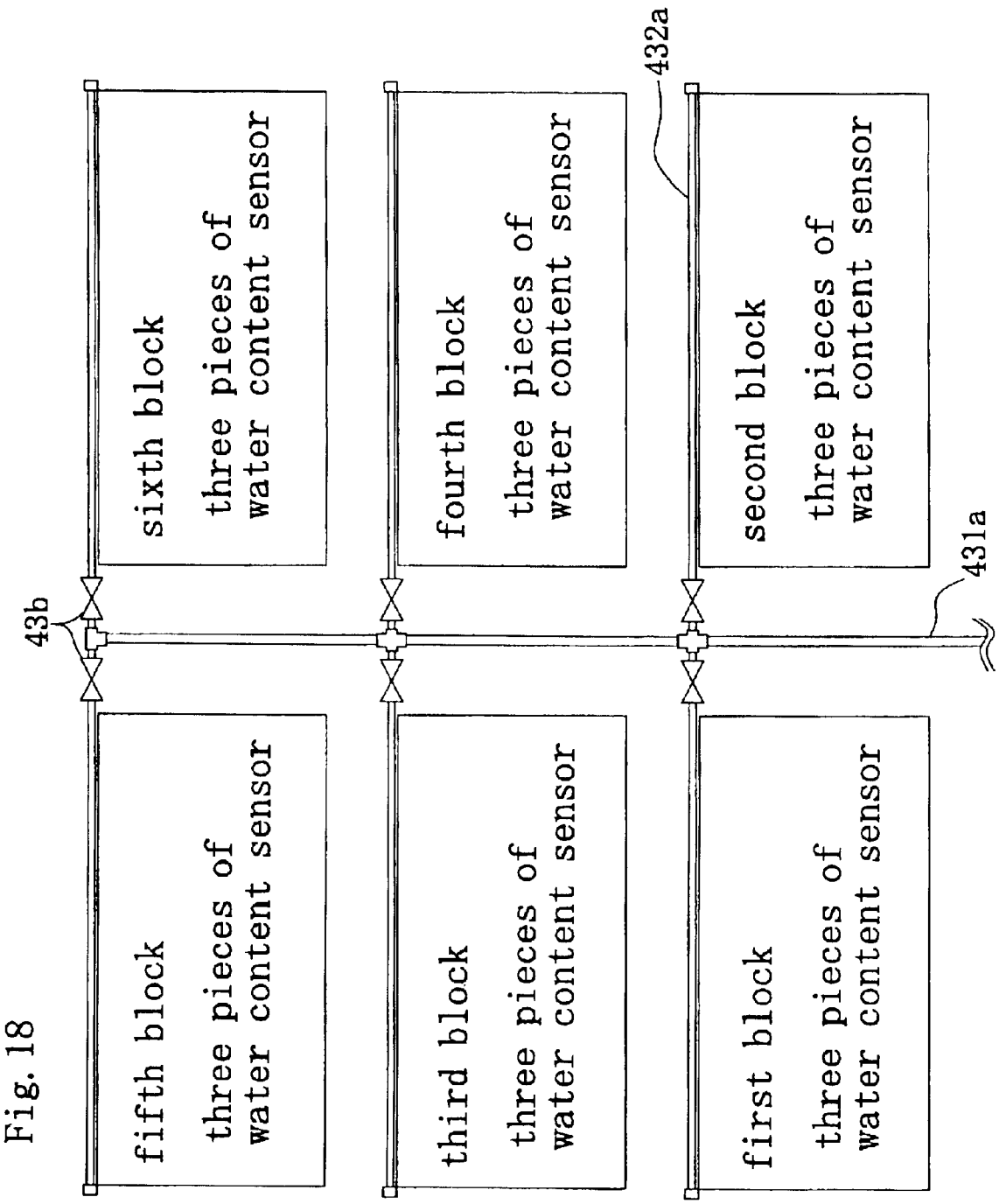
FIG. 18 is an explanatory view of a constitution of an automatic water supply system according to a sixth embodiment.
Figure 19:
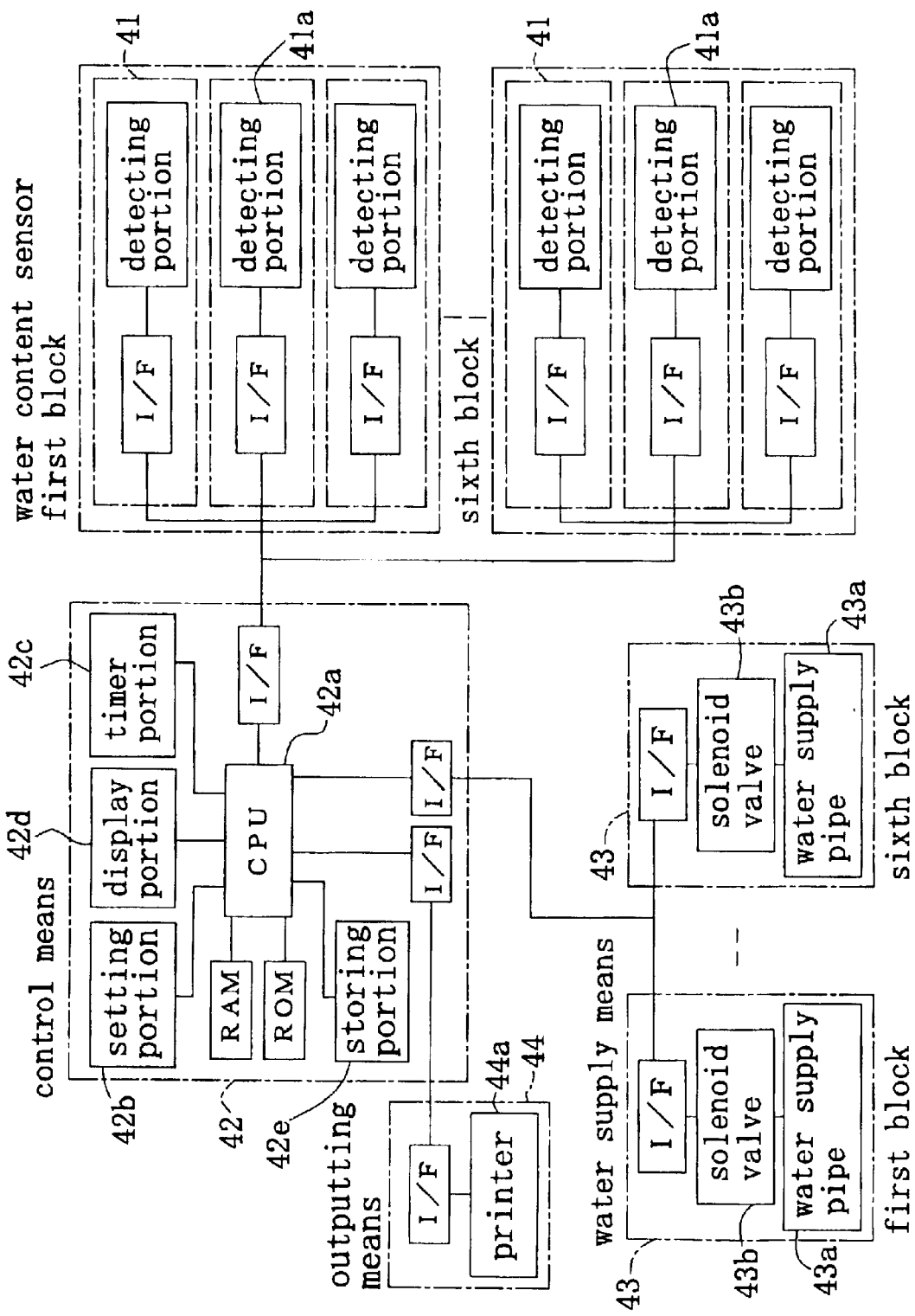
FIG. 19 is a system block diagram of the automatic water supply system according to the sixth embodiment.
Figure 20:
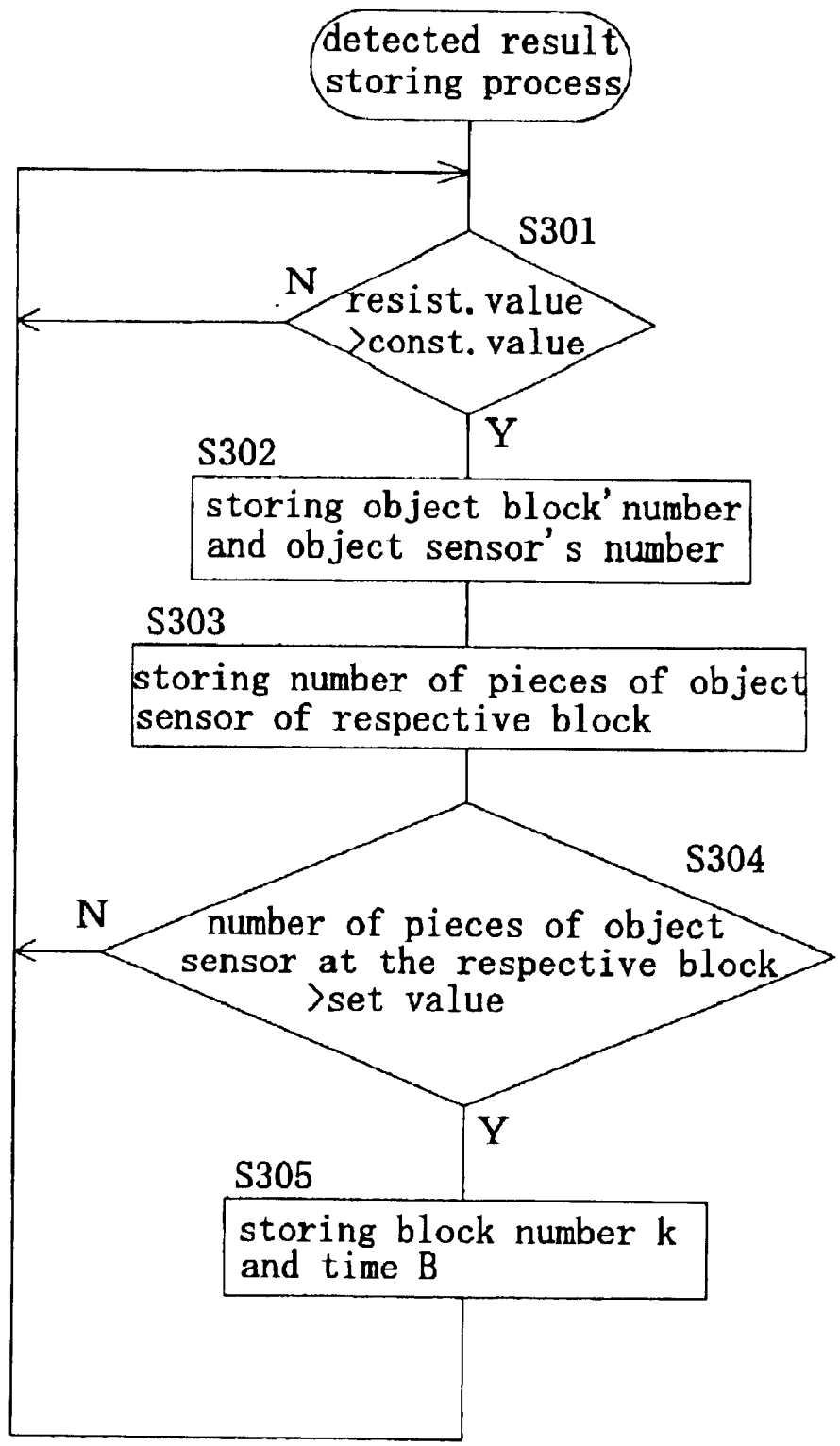
FIG. 20 is a flow chart of a detected address and detected time storing processing processed from time to time in control means of the automatic water supply system according to the sixth embodiment.
Figure 21:
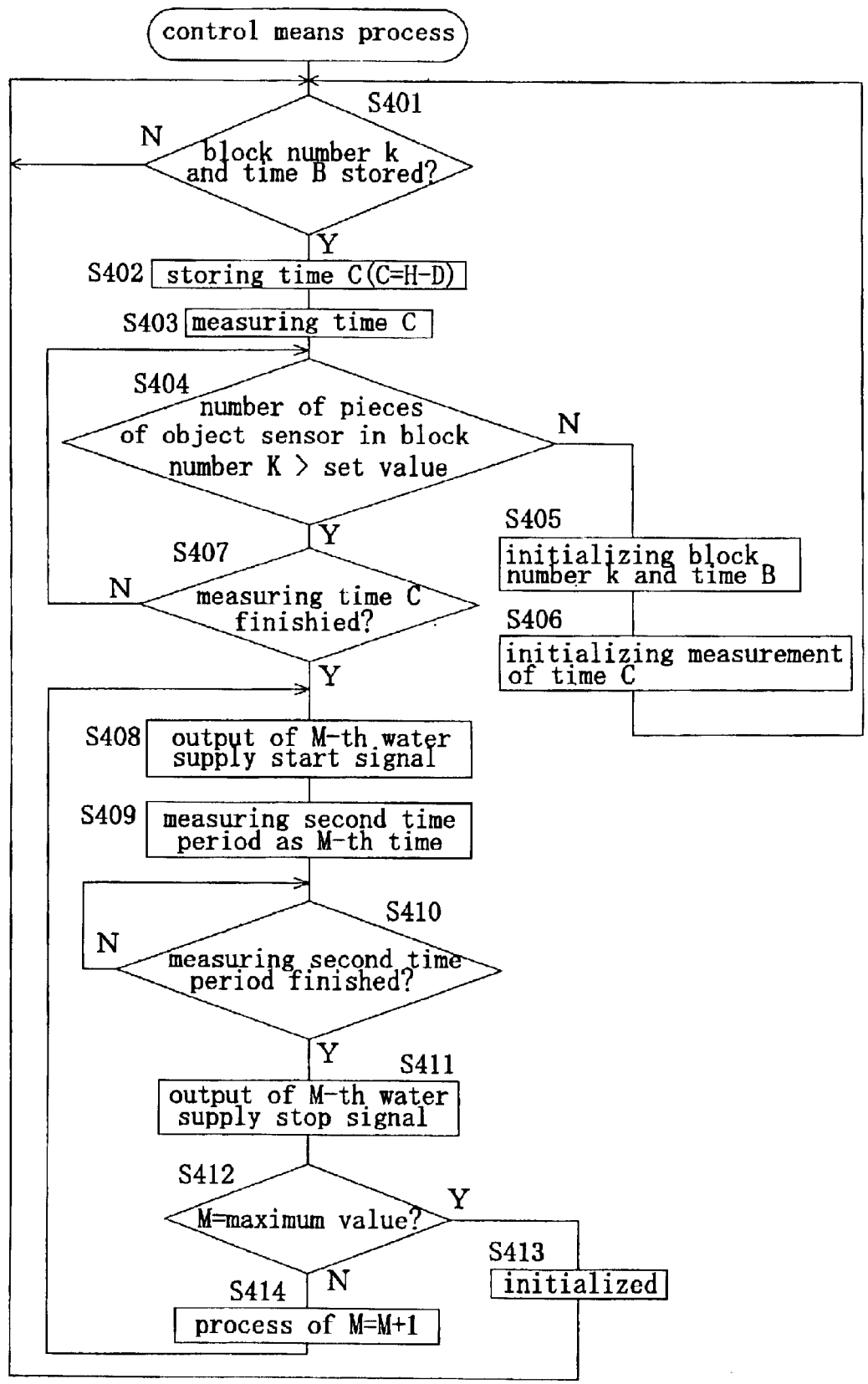
FIG. 21 is a flow chart showing processings of the control means in the automatic water supply system of the sixth embodiment.
Figure 22:
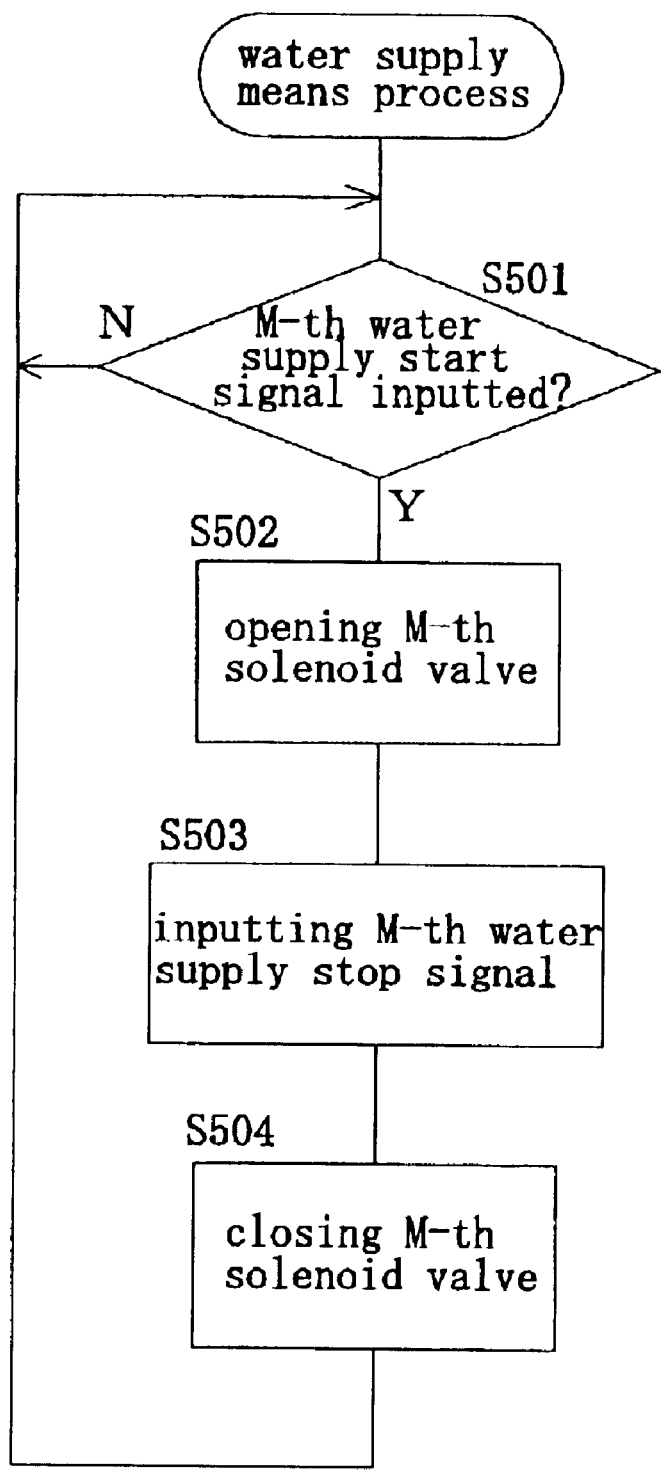
FIG. 22 is a flow chart showing processings of water supply means in the automatic water supply system according to the sixth embodiment.

Next, an explanation will be given of a sixth embodiment of an automatic water supply system according to the invention. FIG. 18 through FIG. 22 show the sixth embodiment of the invention, FIG. 18 is an explanatory view of a constitution of the automatic water supply system, FIG. 19 is a system block diagram of the automatic water supply system, FIG. 20 is a flow chart of a processing of storing a detected address and detected time which is processed from time to time in the control means of the automatic water supply system, FIG. 21 is a flow chart showing a processing of the control means in the automatic water supply system and FIG. 22 is a flow chart showing a processing of the water supply means in the automatic water supply system.

The automatic water supply system according to the embodiment is for a case in which a plurality of the water storage trays 20 are laid similar to the above-described fourth and fifth embodiments, as shown by FIG. 18, there is constructed a constitution in which a plurality of the water storage trays 20 are laid in a state of being divided into a plurality of a first through a sixth block, and the respective blocks are constituted by a single or a plurality of the laid water storage trays 20 and are respectively provided with three pieces of the water content sensors 41. Further, the water supply main pipe 431a is arranged to be sandwiched by odd number blocks and even number blocks, the water supply branch pipes 432a branched from the water supply main pipe 431a are arranged above the respective blocks, the water supply branch pipe 432a for respectively supplying water to the respective block, is respectively provided with the exclusive solenoid valve 43b and water is guided from the supply water main pipe 431a to the water supply branch pipe 432a via the solenoid valve 43b and can be supplied to the respective block.

As shown by FIG. 19, the solenoid valve 43b of the water supply means 43 is connected to CPU 42a of the control means 42 via interface I/F and also the detecting portions 41a of an arbitrary number of pieces of the previously provided water content sensors 41 at the water storage trays 20 of the respective block, are respectively connected to CPU 42a. Other constitutions of the water content sensor 41, the control means 42, the water supply means 43 and the outputting means 44 are similar to those of the third embodiment.

Further, according to the control means 42, as shown by FIG. 20, the resistance value acquired from the respective water content sensor 41 from time to time is compared with a constant value constituting a reference of deficiency and sufficiency of water (S301), a number of the object water content sensor 41 is stored to the storing portion 42e as an address in order to recognize the object block number and which position of the water content sensor 41 in the block when the resistance value exceeds the constant value or the resistance value reaches the constant value (S302), a number of pieces of the object water content sensors 41 of the detecting portion 41a in which the resistance value exceeds the constant value or reaches the constant value, is recognized and stored to the storing portion 42e of the respective block (S303).

When the number of pieces of the water content sensors 41 in which the resistance value exceeds the constant value or reaches the constant value, stored at the respective block, exceeds a previously determined set value or reaches the set value (S304), a block number k and time B reaching the set value is stored to the storing portion 42e (S305). Even when the block number k is stored, it is determined from time to time whether the set value is reached by other block number and when the set value is reached, the number of the block and time of reaching the set value are further stored.

Successively, when the block number k and the time B of reaching the set value are stored to the storing portion 42e (S401), a difference between first predetermined time H and time D produced by subtracting time B at which the block of the block number k reaches the set value, from current time G, is defined as time C to be calculated and is stored to the storing portion 42e (S402) and time C=H−(G−B)=H−D is measured by the first timer portion (S403).

When the number of pieces of the water content sensors 41 in each of which the resistance value reaches the constant value within the block number k during a time period until finishing to measure the time C, becomes equal to or smaller than a previously determined set value or smaller than the set value (S404), the stored block number k, the time B and measurement of the time C by operating the first timer are initialized (S405, S406), and the operation returns to determination of whether the block number and time reaching the set value are newly stored to the storing portion 42e. The confirmation at S404 is carried out after finishing to measure time C (S407).

Further, when in the block number k, the number of pieces of the water content sensors 41 in each of which the resistance value exceeds the constant value or reaches the constant value, does not become equal to or smaller than the previously determined set value or smaller than the set value during a time period until finishing to measure the time C, in order to supply water successively from the first block to the sixth block a first water supply start signal is outputted as an M-th water supply start signal (S408). Here, notation M designates a signal content in correspondence with the block number for successively starting to supply water from the first block, the M-th water supply start signal is a signal for opening the solenoid valve 43b of an M-th block and an initial value of M is 1 representing the first block.

Simultaneously with outputting the first water supply start signal as the M-th water supply start signal, as M-th time, the second timer portion starts to measure the second predetermined time period at a first time (S409), when measurement of the second predetermined time period by the second timer portion is finished (S410), a first water supply stop signal is outputted as an M-th water supply stop signal to thereby close the solenoid valve 43b of the M-th block (S411).

In order to carry out the above-described processing successively from the first block to the sixth block it is determined whether M reaches a maximum value (6 according to the embodiment) (S412), when M reaches the maximum value, the processing is initialized (S413) and the operation returns to determination of whether a block and time in which a number of pieces of the water content sensors 41 in which the resistance value reaches the constant value, reaches the set value, is newly stored in the storing position 42e. Further, when M does not reach the maximum value, there is carried out a processing of M=M+1 (S414), the operation returns to the processing of outputting the M-th water supply start signal again and the processing of outputting the water supply start signal and the water supply stop signal are repeated until a number of times reaching M=maximum value.

The water supply means 43 inputted with the M-th water supply start signal outputted from the control means 42 (S501), supplies water by opening the M-th solenoid valve 43b (S502), by inputting the M-th water supply stop signal (S503), closes the opened M-th solenoid valve 43b to thereby stop supply water (S504). The processings are repeated until M reaches the maximum value.

The embodiment is an embodiment for carrying out a water supply processing by a so-to-speak relay system, when the resistance value acquired by the water content sensor 41 becomes the constant value at least in one block of the plurality of blocks, or when the number of pieces of the water content sensors 41 in each of which the acquired resistance value becomes the constant value, reaches the set value, water is supplied successively to all of the blocks. Therefore, even when a laid area is wide, the water supply processing can firmly be carried out of the respective blocks with no need of so much water pressure from the water source.

Further, although according to water supply to a block constituting an object of water supply according to the embodiment, there is constructed a constitution in which even when a single block is recognized as being deficient in water, water is supplied successively to all the blocks constituting all the objects of water supply, by utilizing the constitution of the fifth embodiment or the sixth embodiment, there can be constructed a constitution in which when the resistance value acquired by the water content sensor 41 in the block becomes the constant value, or when the number of pieces of the water content sensors 41 in each of which the acquired resistance value becomes the constant value in the block, reaches the set value, the water supply start and stop signals are outputted only to the object block reaching the set value. In this case, the water supply start and water supply stop are carried out for the respective individual block by storing the block number and the time of occurrence of reaching the set value in due order from the block precedingly constituting the object block and calculating the time C=H–(G–B) in accordance with a priority order.

Further, not only in the sixth embodiment but also in other embodiments, similar to the second embodiment, time of starting to measure the second predetermined time period can be set to time at which it is recognized that water is brought into a sufficient state by finding that the resistance value by the water content sensor 41 does not reach the constant value.

By carrying out control and an administration of water supply by a unit of the block, the water supply administration can easily be carried out even at a location having a wide laying area.

Figure 23:
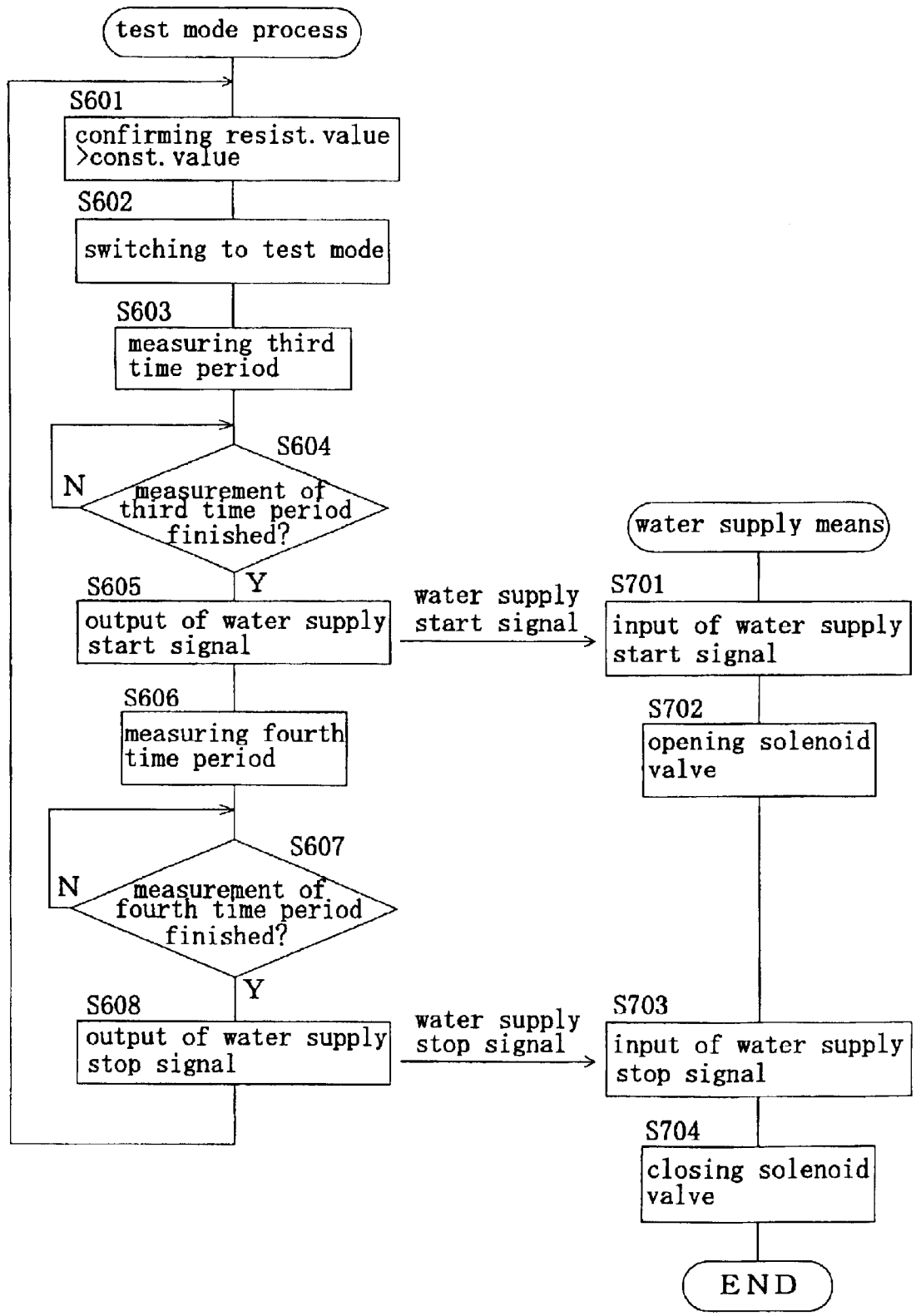
FIG. 23 is a flow chart of a first example of a test mode according to the invention.
Figure 24:
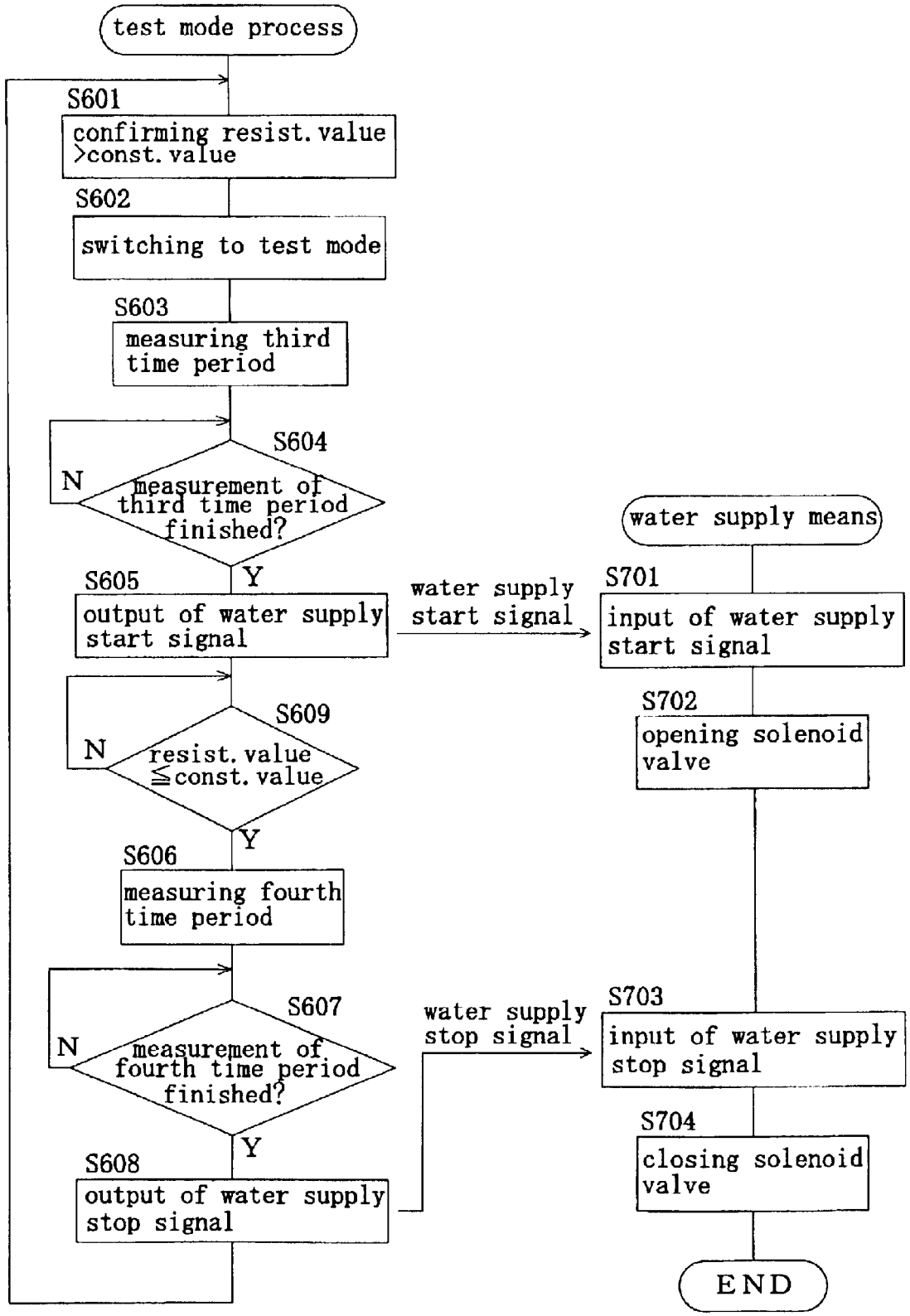
FIG. 24 is a flow chart of a second example of the test mode of the invention.

Next, an explanation will be given of a case of means for switching to a test mode in the automatic water supply system of the invention. FIG. 23 is a flow chart of a first example of the test mode and FIG. 24 is a flow chart of a second example of the test mode.

According to the automatic water supply system having the test mode, there is constructed a constitution capable of switching to the test mode by, for example, the setting portion 42b of the control means 42 and by the test mode, it can be confirmed whether the automatic water supply system is normally operated in construction or in finishing construction.

For example, in the test mode of FIG. 23, first, there is a water content sensor 41 in which the acquired resistance value exceeds the constant value or reaches the constant value and it is confirmed that the state of being deficient in water is detected (S601) and the system is switched to the test mode by the setting portion 42b (S602). Simultaneously with the switching, the first timer portion starts measuring a third predetermined time period shorter than the first predetermined time period, for example, 10 minutes (S603), it is confirmed whether measurement of the third predetermined time period is finished (S604) and when the measurement is finished, the water supply start signal is inputted by the water supply means 43 (S605). In the water supply means 43, the water supply start signal is inputted (S701) and water supply is started by opening the solenoid valve 43b (S702).

Further, in the control means 42, simultaneously with outputting the water supply start signal, the second timer portion starts measuring a fourth predetermined time period shorter than the second predetermined time period, for example, 5 minutes (S606), it is confirmed whether measurement of the fourth predetermined time period is finished (S607) and when the measurement is finished, the water supply stop signal is outputted to the water supply means 43 (S608). In the water supply means 43, the water supply stop signal is inputted (S703) and water supply is stopped by closing the solenoid valve 43b (S704).

Further, in the test mode of FIG. 24, first, there is the water content sensor 41 in which the acquired resistance value exceeds the constant value or reaches the constant value and it is confirmed that the state of being deficient in water is detected (S601) and the system is switched to the test mode by the setting portion 42b (S602). Simultaneously with the switching, the first timer portion starts measuring the third predetermined time period shorter than the first predetermined time period, for example, 10 minutes (S603), and it is confirmed whether measurement of the third predetermined time period is finished (S604) and when the measurement is finished, the water supply start signal is outputted to the water supply means 43 (S605). In the water supply means 43, the water supply start signal is inputted (S701) and water supply is started by opening the solenoid valve 43b (S702).

Further, in the control means 42, when after outputting the water supply start signal, there is the water content sensor 41 in which a newly acquired resistance value exceeds the constant value or reaches the constant value and a state of being sufficient in water or a state of resolving deficiency in water is detected (S609), the second timer portion starts measuring the fourth predetermined time period shorter than the second predetermined time period, for example, 5 minutes (S606), it is confirmed whether measurement of the fourth predetermined time period is finished (S607) and when the measurement is finished, the water supply stop signal is outputted to the water supply means 43 (S608). In the water supply means 43, the water supply stop signal is inputted (S703) and water supply is stopped by closing the solenoid valve 43b (S704).

The third predetermined time period and the fourth predetermined time period can also be set by the setting portion 42b and in the case of the time periods of the embodiment, it can be confirmed whether the automatic water supply system is operated normally in 15 minutes and the highly reliable automatic water supply system can be provided to the user.

Figure 25:
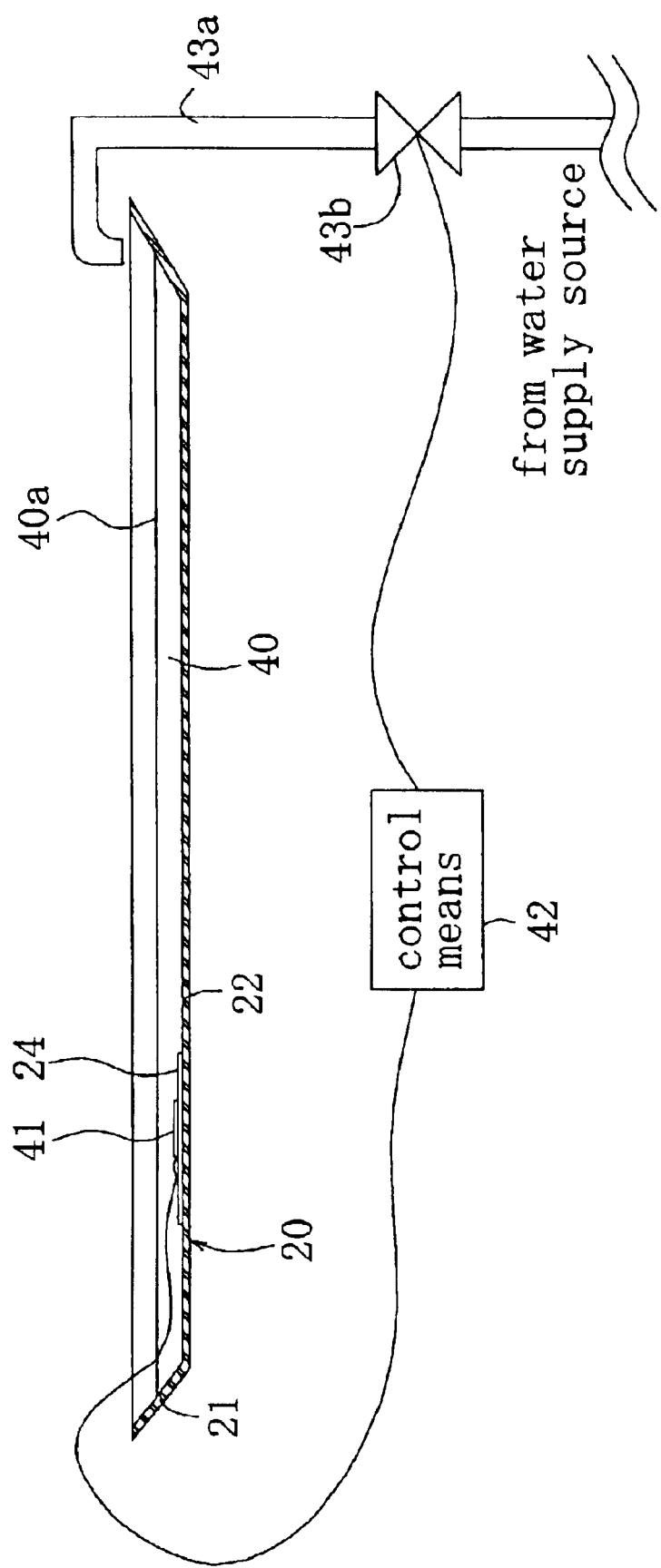
FIG. 25 is a constitution view of a case of providing a water content sensor mounting base at a water storage tray.
Figure 26:
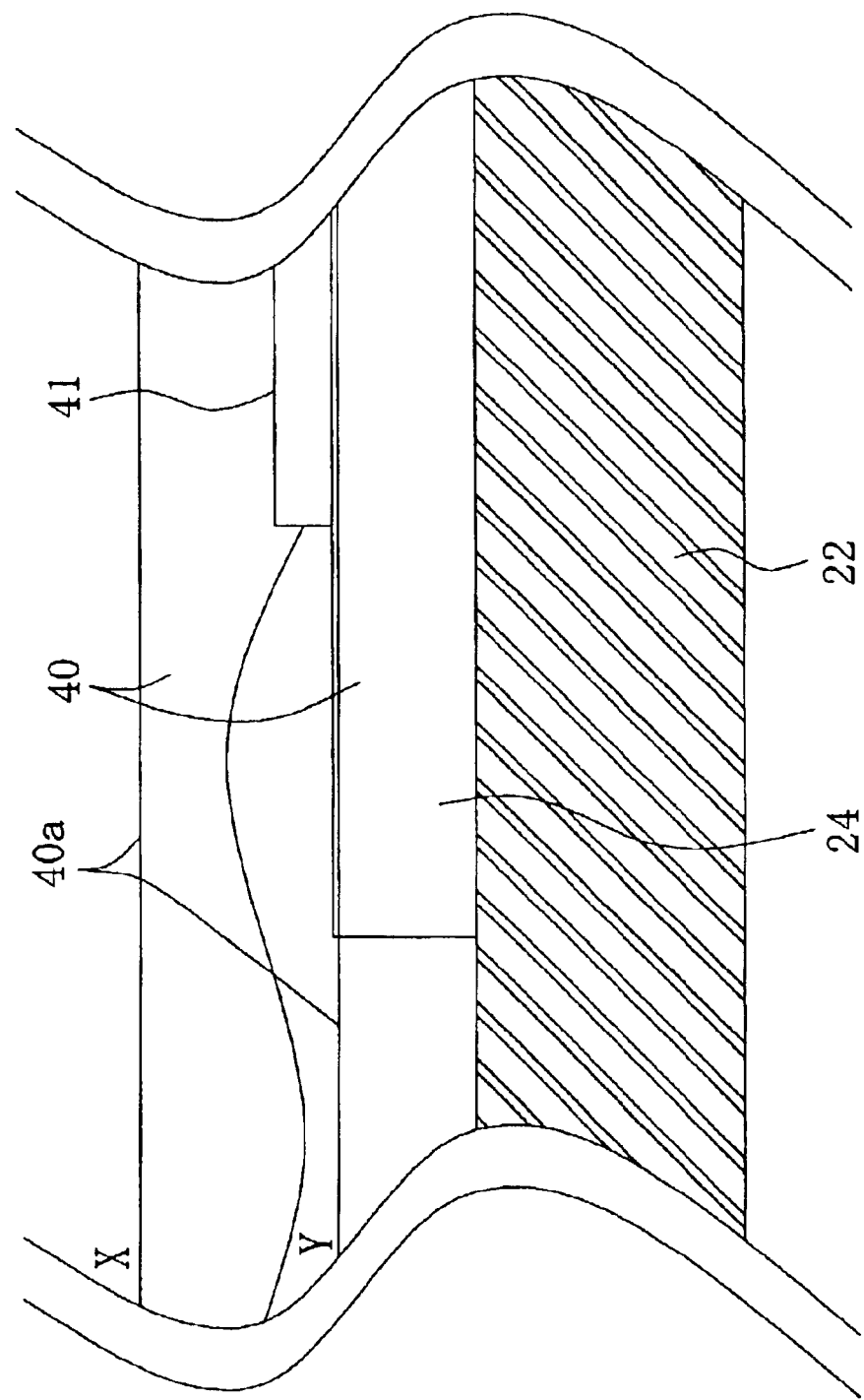
FIG. 26 is a sectional view enlarging a vicinity of the water content sensor of FIG. 25.

Next, an explanation will be given of an example of applying the automatic water supply system. A constitution of FIG. 25 and FIG. 26 is applicable to all of the above-described embodiments, FIG. 25 is a constitution view when a water content sensor mounting base is provided at the water storage tray and FIG. 26 is a sectional view enlarging a vicinity of the water content sensor of FIG. 25.

According to the example, a water content sensor mounting base 24 is provided above the bottom face 22 of the water storage tray 20 and the water content sensor 41 is installed above the water content sensor mounting base 24 at inside of the water storage tray 20. The constitution in which the control means 42 is connected to the water content sensor 41 and the solenoid valve 43b installed at the water supply pipe 43a, is similar to the above-described and notation 40a designates the water level in the water storage tray 20.

By mounting the water content sensor 41 above the mounting base 24, erroneous operation of the water content sensor 41 by influence of dust or dirt brought into the water storage tray 20 can be prevented beforehand. Further, even when the water storage tray 20 is deformed by recesses and projections of a laying face or when the water content sensor 41 is accidentally provided at a recessed portion of the recesses and projections of the bottom face 22 of the water storage tray, presence or absence of water can be determined firmly and easily. That is, by providing the mounting base 24, as shown by FIG. 26, when the water level 40a is lowered and the water level 40a reaches the mounting base 24 mounted with the water content sensor 41, the state of being deficient in water can be recognized and therefore, before completely evacuating water, the automatic water supply system can be started to operate.

Further, by providing the mounting base 24, even in the case of a small amount of rainfall, the state of being deficient in water can be recognized. For example, when the water supply object is constituted by the water storage tray 20, the plant cultivating containers 10 is mounted above the water storage tray 20 and pluralities of these are laid on the laying face, even in the case of the small amount of rain fall, water is brought into the water storage tray 20 from a gap between the plant cultivating containers 10, however, with regard to such a small amount of water, the state of being deficient in water can be maintained to recognize, as a result, the plant is not killed.

Further, although a shape and a constitution of the water content sensor mounting base 24 are pertinent, it is preferable that the water content sensor mounting base 24 can be adhered to the bottom face 22 of the water storage tray easily by an adhering agent or the like and it is preferable that the height can be adjusted. Further, it is preferable to constitute the water content sensor mounting base 24 by a small-sized water storage tray having a shape similar to that of the water storage tray 20 and by mounting the water content sensor 41 in the small-sized water storage tray and detecting presence or absence of water in the small-sized water storage tray, a possibility that dust or dirt invades from a side wall of the wall-sized water storage tray is lowered and erroneous operation can be prevented beforehand.

Figure 27:
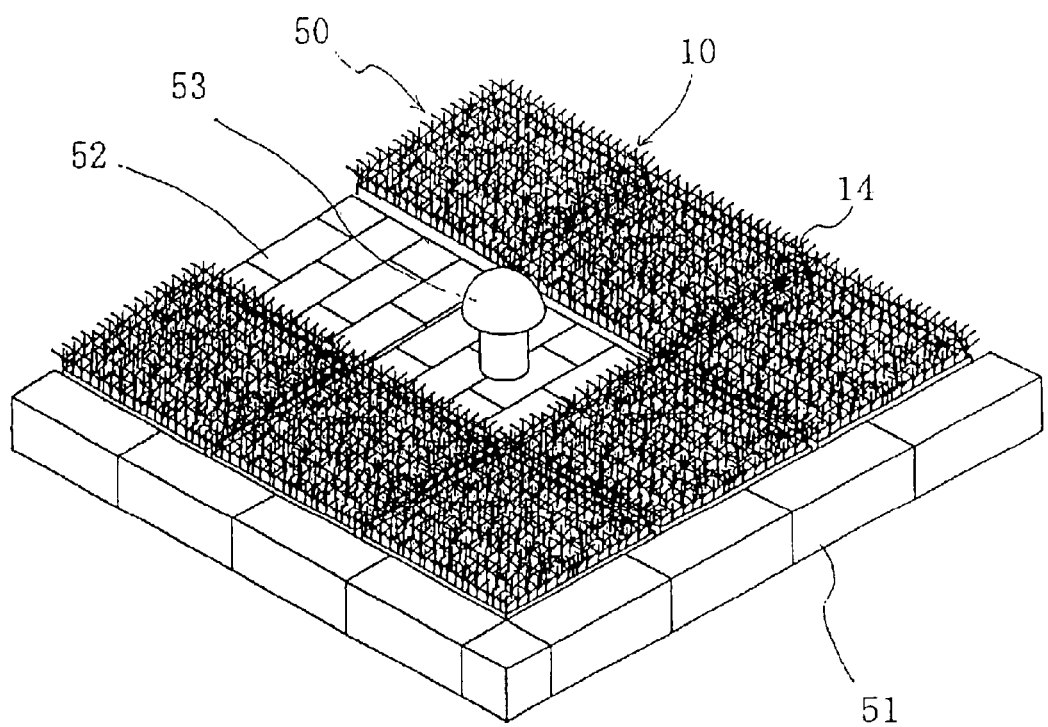
FIG. 27 is a partially enlarged perspective view showing time of finishing to construct an automatic water supply system of the invention.

A planting area 50 as shown by FIG. 27 can be formed by using the automatic water supply system according to the invention, laying a plurality of the water storage trays 20, laying the plant cultivating containers 20 planted with the plant 14 above the respective water storage trays 20 and installing curbstones 51 or the like on the outermost side while making the water supply administration easy and pertinent. Further, by mounting a wood deck 52, a light 53 and the like at a location at which the plant 14 is planted normally by the desired plant cultivating container 10, the planting area 50 further excellent in the beautiful outlook can be formed. In this case, all of wires connecting the light 53 and the control means 42 and the water content sensor 41 or wires of the water supply pipe 43a and the like are contained above the water storage trays 20 and between the inwardly recessed portions 11a of the side faces 11 of the plant cultivating containers or above the water storage trays and between the curved stones 51 and the inwardly recessed portions 11a of the side faces 11 of the plant cultivating containers and therefore, the further excellent beautiful outlook is maintained.

The automatic water supply system according to the invention is not limited to the respective embodiments but can be expanded or modified as follows. For example, although in the respective embodiments an explanation has been given of the case in which the water supply object is constituted by the water storage tray 20, the water supply object is not limited thereto but may be the soil 13 in the plant cultivating container 10 or may be a dish or the like for feeding drinking water to an animal or the like.

Further, although according to the respective embodiments, the water content sensor 41 and the control means 42 and the control means 42 and the solenoid valve 43b are connected by wires, the connection may be constituted by wireless.

Further, shapes, constitutions, numbers of pieces, functions and the like of the plant cultivating container 10 and the water storage tray 20, or the water supply means 43, the control means 42, the water content sensor 41 and the like of the respective embodiments are not limited to those in the respective embodiments but all of them are included so far as falling in the range of the gist of the invention.

Further, although according to the respective embodiments, an explanation has been given of the automatic water supply system only with regard to water, a liquid fertilizer or a mixture solution of these will do and all the liquids are included.

Further, the control means 42 (particularly, the setting portion 42*b*) of the automatic water supply system in the respective embodiments, may be constituted to be locked such that at least only an administrator and a maintenance personnel can use the control means 42 and an unlocking method is variously conceivable such as a key, a card, input of a pass number, determination by a fingerprint, determination by voice or the like.

Further, by constructing a constitution in which information or the like outputted by the outputting means 44 can be received by a computer or the like by way of a telephone line, a wireless or the like, even at a remote location, an operational situation of the control means 42 can be grasped. Further, also with regard to a set content, by constructing a constitution in which the set content can be set by transmitting the set content by a computer or the like, the set content can be changed at a remote location.

Figure 28:
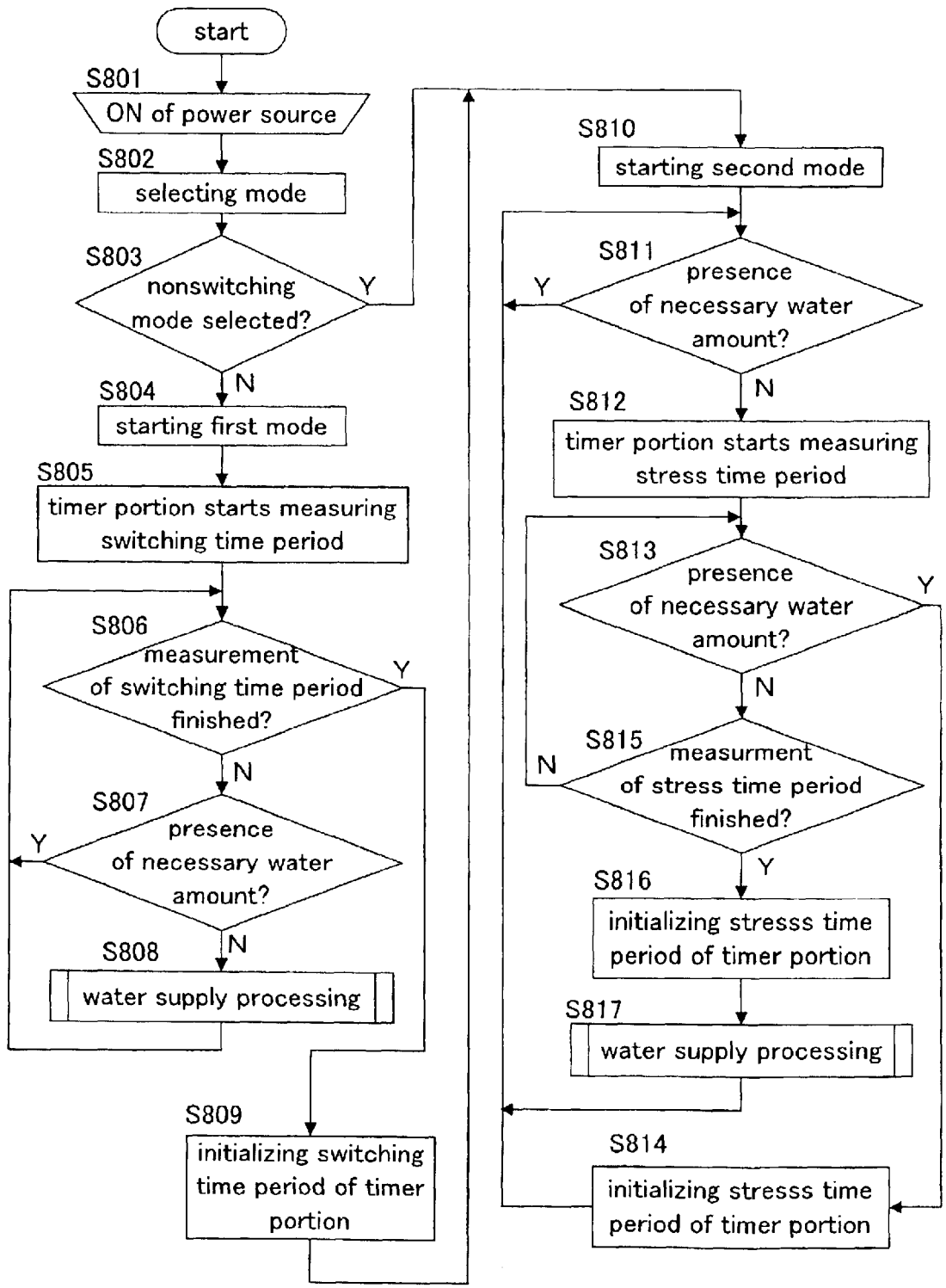
FIG. 28 is a flow chart showing a total flow of a water supply control processing according to a seventh embodiment.
Figure 29:
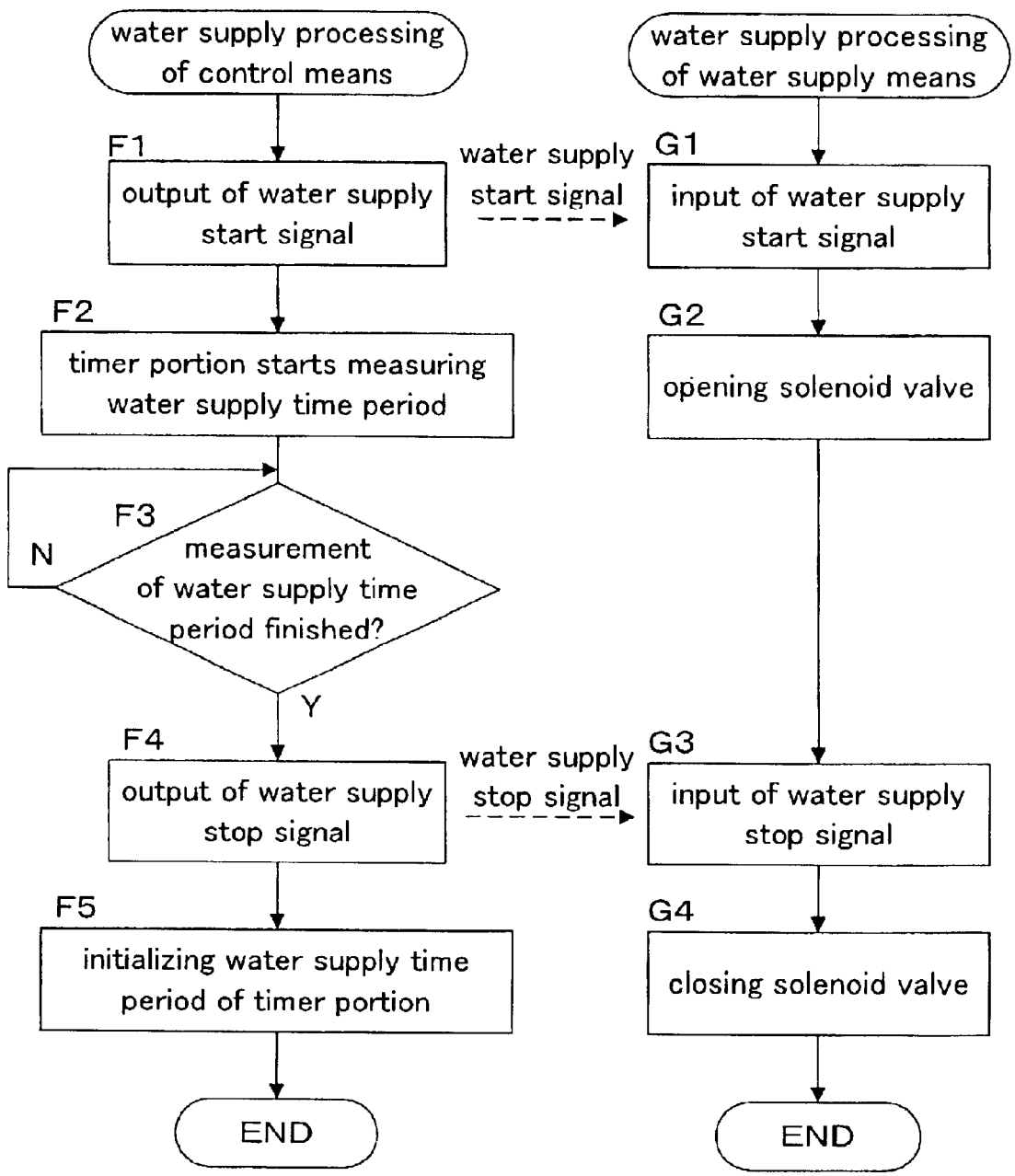
FIG. 29 is a flow chart showing water supply processings of control means and water supply means when water supply control is carried out by a timer portion according to the invention.
Figure 30:
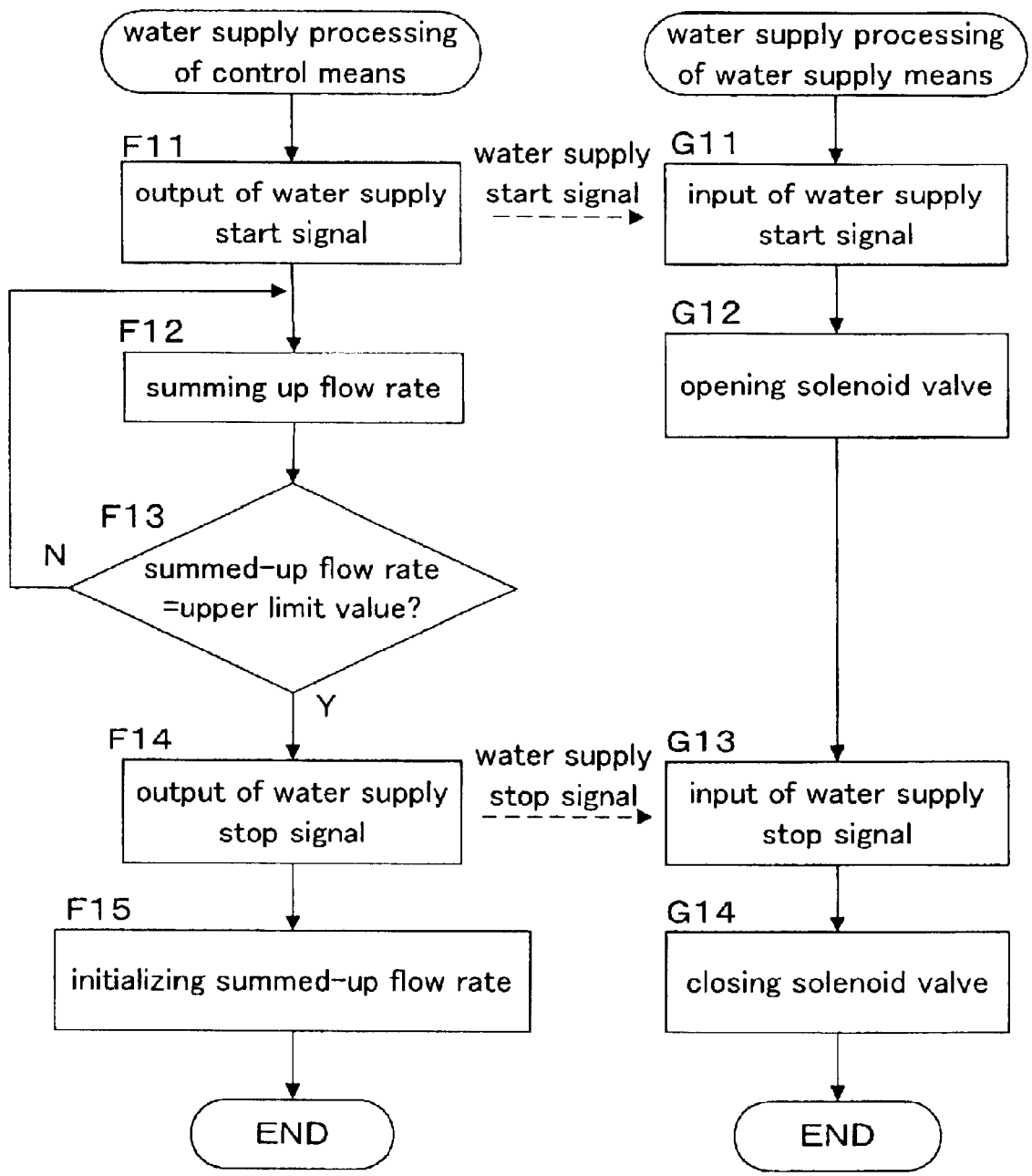
FIG. 30 is a flow chart of water supply processings of control means and water supply means when water supply control is carried out by a flow rate meter according to the invention.
Figure 31:
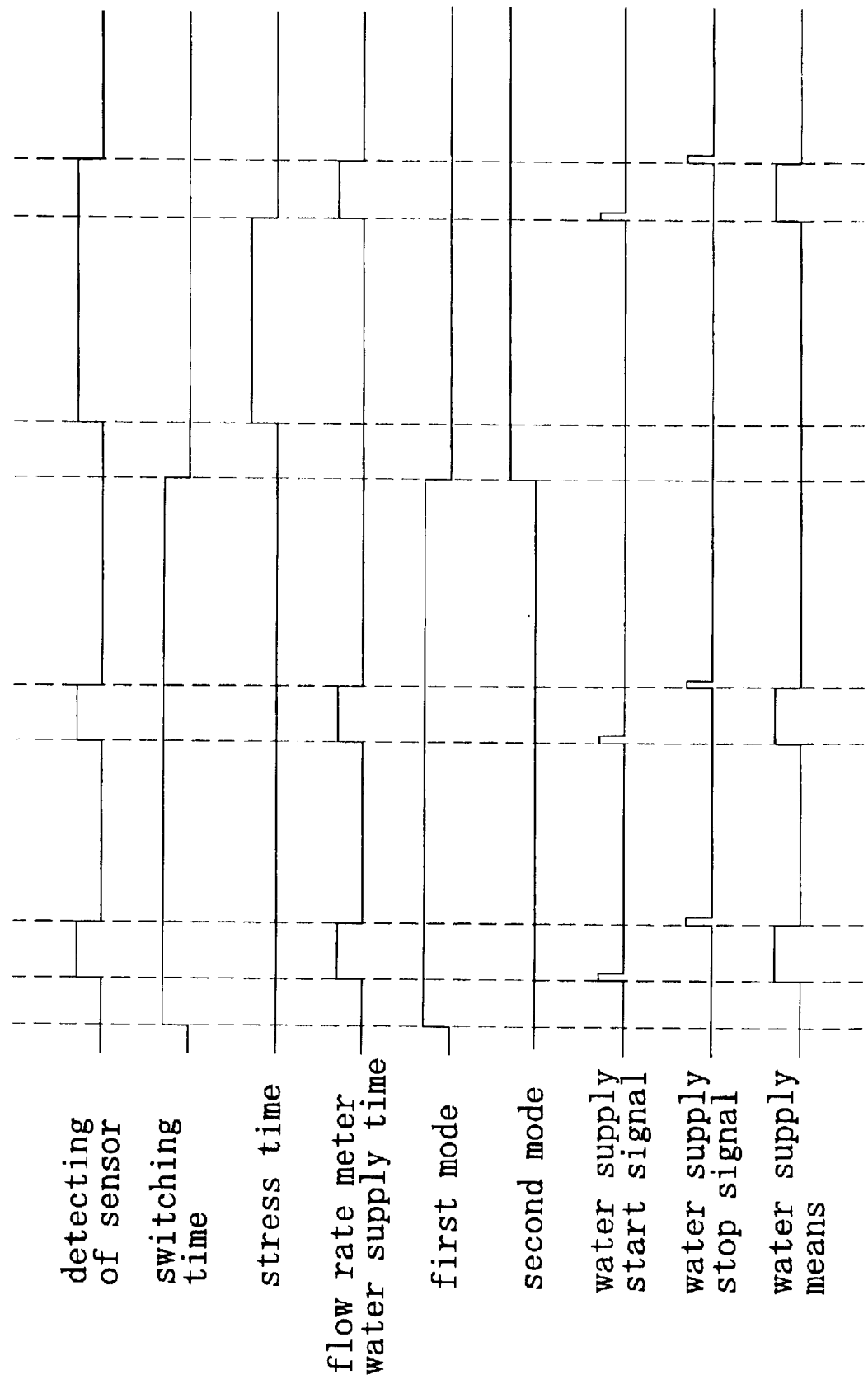
FIG. 31 is a time chart showing a total flow of an automatic water supply system according to a seventh embodiment.

Next, an explanation will be given of a seventh embodiment of an automatic water supply system according to the invention and a total constitution thereof is similar to that of the first embodiment. FIG. 28 is a flow chart showing a total flow of a water supply control processing according to the seventh embodiment, FIG. 29 and FIG. 30 are flow charts showing water supply processings of control means and water supply means when water supply control is carried out by the timer portion or the flow rate meter and FIG. 31 is a time chart showing the total flow of the automatic water supply system according to the seventh embodiment.

The control means 42 according to the seventh embodiment is provided with an operating portion for carrying out, for example, necessary operation, a switching mode selecting portion for selecting a switching mode or a nonswitching mode and a switching portion for switching a set item as necessary in connection with CPU 42*a* other than the system constitution of the above-described embodiment.

Further, according to a water supply control processing shown in FIG. 28, first, a power source of the automatic water supply system such as the control means 42, the water content sensor 41, the water supply means 43 and the like, is made ON (S801), and the switching mode or the nonswitching mode is selected by the switching mode selecting portion (S802) Selection of the switching mode or the nonswitching mode is pertinently constituted, for example, the selection can be carried out by a switch for selecting the switching mode or the nonswitching mode, or the nonswitching mode can be selected when a predetermined time period for carrying out the switching mode is set to 0. By selecting the mode, it is determined which of the switching mode or the nonswitching mode is selected (S803) Further, although a system of selecting the mode differs by setting an initial state or the like, there may be constructed also a constitution in which when the nonswitching mode is not selected, the switching mode is carried out automatically and only when the nonswitching mode is selected, the nonswitching mode is carried out.

When the switching mode is selected, a first mode is started (S804) and the timer portion 42*c* starts measuring a predetermined switching time period (S805). The switching time period is a time period set as, for example, a predetermined time period for carrying out the switching mode. Further, it is determined whether the switching time period is finished (S806) and during the switching time period, a comparison between the resistance value acquired by the water content sensor 41 and a reference resistance value set to the storing portion of RAM, ROM or the like, is carried out continuously or at predetermined time intervals and when the resistance value of the water content sensor 41 reaches the reference resistance value or when the resistance value exceeds the reference resistance value, absence of a necessary water amount is detected, and when the resistance value of the water content sensor 41 does not reach the reference resistance value or when the resistance value does not exceed the reference resistance value, presence of the necessary water amount is detected (S807).

When presence of the necessary water amount is detected, it is determined again whether the switching time period is finished (S806), the processing of detecting presence or absence of the necessary water amount is carried out (S807) and the processing of detecting presence or absence of the necessary water amount is carried out until the switching time period is finished. On the other hand, when absence of the necessary water amount is detected, the water supply processing is carried out (S808). The water supply processing is carried out until elapse of, for example, a predetermined water supply time period or until a summed-up flow rate summed up by the control means 42 based on, for example, a measured value of the flow rate meter, reaches a predetermined upper limit value.

When the predetermined switching time period measured by the timer portion 42*c* is finished (S806), the switching time period is initialized (S809), a second mode set to the storing portion is started by control of CPU 42*a* (S810). According to the embodiment, when absence of the necessary water amount is detected, after finishing the water supply processing, it is determined again whether measurement of the predetermined switching time period is finished (S806), during the water supply processing, finish of the predetermined switching time period is determined (S806) and the processing of detecting presence or absence of the necessary water amount (S807) is stopped. Further, even when the nonswitching mode is selected by selecting the mode, and it is determined that the nonswitching mode is selected (S802, S803), the second mode is started (S810).

That is, the first mode is carried out during the predetermined switching time period or during a time period produced by adding a time period of the predetermined switching time period until water supply start time and the water supply time period, when absence of the necessary water amount is detected, the predetermined water supply processing is carried out and in the first mode, the above-described determination, water supply processing and the like are repeatedly carried out. Further, in the first mode, there can be constructed a constitution in which even in supplying water, presence or absence of the necessary water amount is detected by the water content sensor 41 and water supply is stopped at a time point at which presence of the necessary water amount is detected, or there can be constructed a constitution in which water supply is stopped at midway by giving a priority to the switching time period.

When the second mode is started, determination of presence or absence of the necessary water amount is carried out continuously or at predetermined intervals by the resistance value acquired by the water content sensor 41 (S811) and when absence of the necessary water amount is detected, measurement of a predetermined stress time period is started by the timer portion 42c (S812). Further, the reference resistance value may be set by constituting the necessary water amount in the second mode by a water amount different from the necessary water amount in the first mode.

During measurement of the stress time period, determination of presence or absence of the necessary water amount is carried out continuously or at predetermined intervals based on the resistance value by the control means 42 (S813), when presence of the necessary water amount is determined, the stress time period which is being measured by the timer portion 42c is initialized (S814) and the operation returns to again to determination of presence or absence of the necessary water amount (S811). This is because when the plant cultivating unit is provided outdoors, the water content absent state is switched to the water content present state by rainfall during the stress time period and it is waste of water and is not preferable to supply water after the switching.

Further, when absence of the necessary water amount is detected during the stress time period, it is determined whether measurement of the stress time period is finished (S815), when measurement of the stress time period is not finished, the operation returns again to determination of presence or absence of the necessary water amount (S813) and when measurement of the stress time period is finished and a state of absence of the necessary water amount is maintained during the stress time period, the stress time period measured by the timer portion 42c is initialized (S816) and the water supply processing is carried out (S817). The water supply processing is carried out until, for example, elapse of the predetermined water supply time period or until the summed-up flow rate reaches the predetermined upper limit value. When the water supply processing is finished, the operation returns again to determination of presence or absence of the necessary water amount (S811). That is, in the second mode, when absence of the necessary water amount is determined by using the water content sensor 41, measurement of the stress time period is started and the water supply processing is carried out only when the state of absence of the necessary water amount is maintained during the stress time period.

When the water supply processing is carried out until elapse of the predetermined water supply time period, for example, as shown by FIG. 29, control is carried out based on measurement of the predetermined water supply time period by the timer portion 42c. In the case of FIG. 29, the water supply start signal is outputted from the control means 42 to the water supply means 43 (F1), the water supply start signal is inputted to the solenoid valve 43b of the water supply means 43 (G1), and water supply is started by opening the solenoid valve 43b (G2). Meanwhile, the control means 42 starts measuring the water supply time period by the timer portion 42c after outputting the water supply start signal (F2), determines whether measurement of the water supply time period is finished until the predetermined water supply time period is finished (F3), outputs the water supply stop signal to the water supply means 43 when the predetermined water supply time period is finished (F4) and initializes the water supply time period measured by the timer portion 42c (F5). At the water supply means 43, the water supply stop signal is inputted to the solenoid valve 43b (G3) and water supply is finished by closing the solenoid valve 43b (G4).

Further, when the water supply processing is carried out until the summed-up water supply amount reaches the predetermined upper limit flow rate value, for example, as shown by FIG. 30, control is carried out based on the predetermined summed-up flow rate by the flow rate meter. In the case of FIG. 30, the water supply start signal is outputted from the control means 42 to the water supply means 43 (F11), the water supply start signal is inputted to the solenoid valve 43b of the water supply means 43 (G11), water supply is started by opening the solenoid valve 43b (G12). On the other hand, the control means 42 measures and sums up the flow rate of water flowing in the water supply pipe 43a after outputting the water supply start signal by the flow rate meter (F12), determines whether the summed-up flow rate reaches the predetermined upper limit value (F13), outputs the water supply stop signal to the water supply means 43 when the predetermined upper limit value is reached (F14) and initializes the summed-up flow rate value (F15). Further, in the water supply means 43, the water supply stop signal is inputted to the solenoid valve 43b (G13) and the water supply processing is finished by closing the solenoid valve 43b (G14).

By providing the flow rate meter, the water supply amount can be controlled as a value firmer than that in the case of controlling by the timer portion 42c. That is, a pertinent flow rate of water supply can be carried out without error even when the flow rate from a faucet of water service differs by a situation of a building, time or the like.

An explanation will be given here of the time chart of the embodiment in reference to FIG. 31. As shown by FIG. 31, in the total of the system, when the power source of the control means 42 is made ON and the switching mode is selected, the first mode is started and measurement of the switching time period is started. When absence of the necessary water amount is detected based on the water content sensor 41 during the first mode, by outputting the water supply start signal, the water supply means 43 starts supplying water and measurement of the summed-up flow rate or the water supply time period is started. Further, although the water content sensor 41 and the control means 42 can detect the state of presence of the necessary water amount by arrival of water to the water content sensor 41 after starting to supply water, according to the embodiment, the processing of determining presence or absence of the necessary water amount by the water content sensor 41 and the control means 42 is stopped. Further, when the summed-up flow rate value reaches the upper limit value or when measurement of the water supply time period is finished, the water supply stop signal is outputted and water supply is finished. The above-described is repeatedly carried out during the first mode.

Further, when measurement of the switching time period is finished, the first mode is switched to the second mode. When absence of the necessary water amount is detected based on the resistance value of the water content sensor 41 during the second mode, the predetermined stress time period is measured. When absence of the necessary water amount is not maintained during measurement of the stress time period, the stress time period is initialized (illustration is omitted), and when absence of the necessary water amount by the water content sensor 41 is maintained, the water supply start signal is outputted, the water supply means 43 starts supplying water and measurement of the flow rate by the flow rate meter or measurement of the water supply time period is started. Further, although the state of presence of the necessary water content can be detected by the water content sensor 41 and the control means 42 by arrival of water to the water content sensor 41 after starting to supply water, according to the embodiment, the processing of determining presence or absence of the necessary water amount by the control means 42 is stopped. Further, when the summed-up flow rate value reaches the upper limit value or when measurement of the water supply time period is finished, the water supply stop signal is outputted and water supply is finished. The above-described is repeatedly carried out during the second mode.

By using the automatic water supply system according to the seventh embodiment, the effectiveness can be achieved in a case described below. For example, when cut turf is used as the plant immediately after constructing the plant cultivating unit at the laying face, the cut turf does not take root deep in the soil, an air layer is formed between the root of the cut turf and the soil and the turf is brought into the weakest state (state easy to be killed). The time period under the state is a time period which needs much water and it is necessary to take root as fast as possible to thereby prevent the turf from being killed. By carrying out the water supply processing at the time period by the first mode of the seventh embodiment, rooting of the turf can be accelerated. Further, according to the turf after having been rooted, by constructing a constitution of automatically switching to the second mode, the turf can be cultivated in a state more proximate to be natural and the robust turf can be cultivated. That is, immediately after constructing the plant cultivating unit, the nonswitching mode is not selected by the switching mode selecting portion and by setting the switching time period to be the second mode after, for example, two weeks by which the turf is likely to take root, the above-described control can be carried out.

Figure 32:
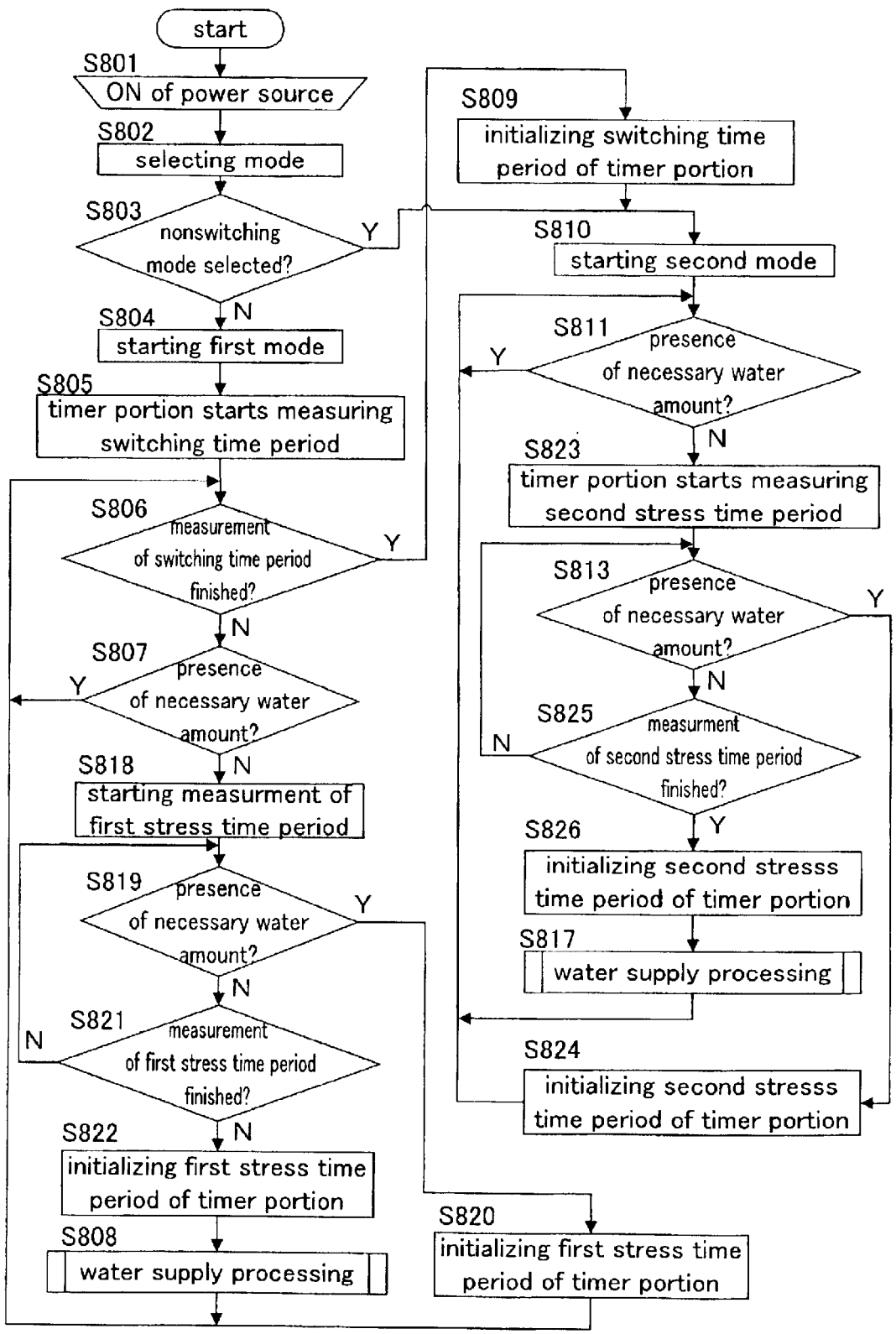
FIG. 32 is a flow chart showing a total flow of a water supply control processing according to an eighth embodiment.
Figure 33:
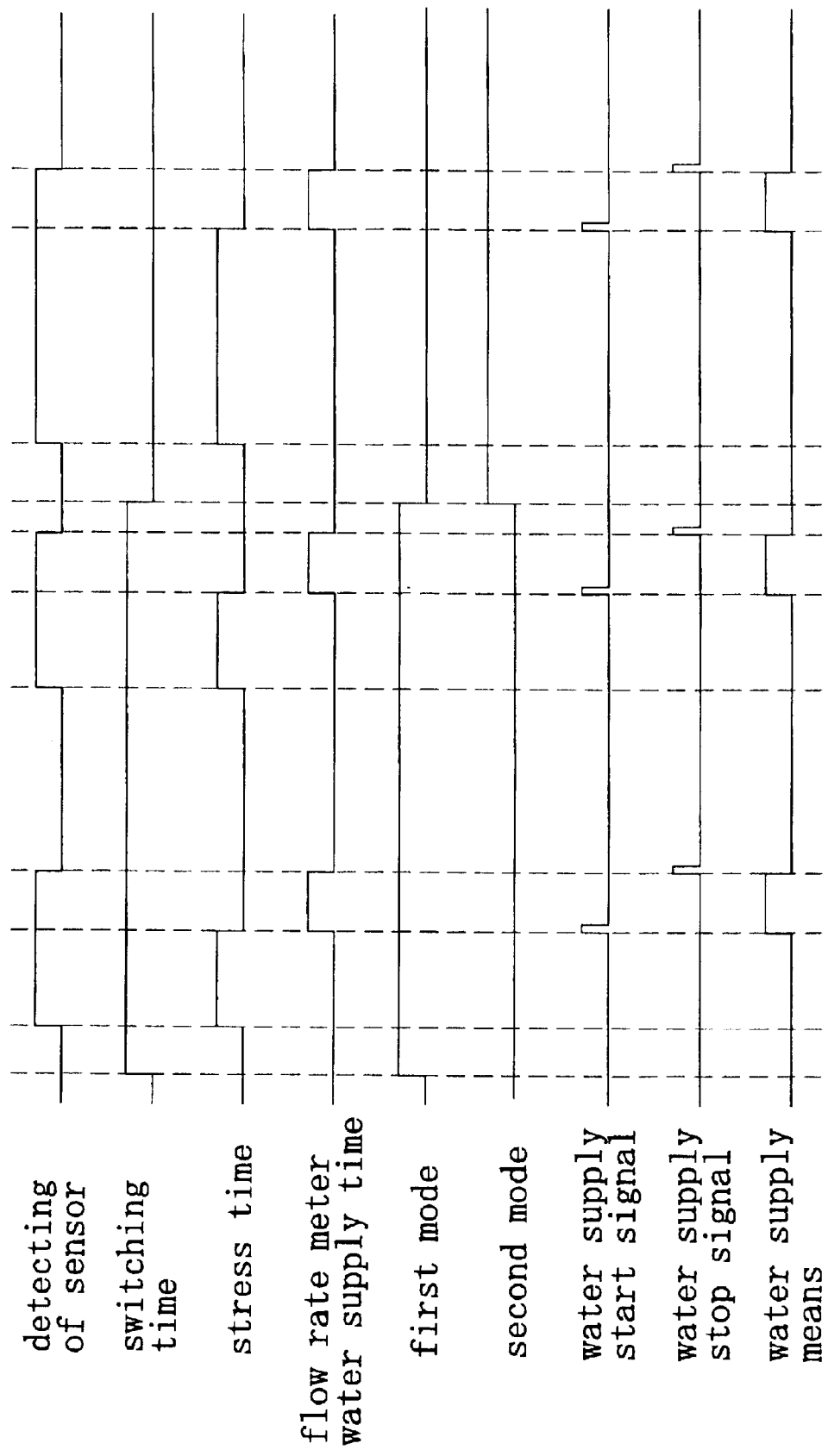
FIG. 33 is a time chart of an automatic water supply system according to the eighth embodiment.

Next, an explanation will be given of an eighth embodiment of an automatic water supply system of the plant cultivating unit centering on a portion different from those in the above-described embodiments. FIG. 32 and FIG. 33 show the eighth embodiment of the invention, FIG. 32 is a flow chart showing a total flow of the water supply control processing and FIG. 33 is a time chart of the automatic water supply system according to the eighth embodiment. Further, the constitution of the plant cultivating unit, the constitution of supplying water into the water storage tray 20 and the like are similar to those in the above-described embodiments.

According to the embodiment, there is constructed a constitution in which both during the first mode and during the second mode, presence or absence of the necessary water amount is determined based on the resistance value acquired by the water content sensor 41 at a location of detecting the water content state, when absence of the necessary water amount is detected, measurement of the predetermined first stress time period and the second stress time period is started by the timer portion 42c and water is supplied when a state of absence of the necessary water amount is maintained during a time period of the predetermined stress time period until finishing the measurement. The first stress time period constituting the stress time period in the first mode, is set with a comparatively short time period of, for example, 3 days and the second stress time period constituting the stress time period in the second mode, is set with a comparatively long time period of, for example, 7 days and by making a condition of starting to supply water differ, it is effective to cultivate healthy turf, for example, by making the turf take root fastly in the soil.

That is, as shown by FIG. 32, the power source of the control means 42 is made ON and the switching mode or the nonswitching mode is selected (S801, S802) and it is determined which of the switching mode or the nonswitching mode is selected (S803). When the nonswitching mode is selected, the second mode is started (S810) and when the switching mode is selected, the first mode is started (S804). By starting the first mode, measurement of the switching time period is started (S805), during a time period until finishing the switching time period, based on detection by the water content sensor 41, presence or absence of the necessary water amount is determined (S806, S807) and only when absence of the necessary water amount is determined, measurement of the first stress time period is started by the timer portion 42c (S818).

In measuring the first stress time period, again based on detection of the water content sensor 41, presence or absence of the necessary water amount is determined continuously or at predetermined time intervals (S819), when presence of the necessary water amount is determined, the first stress time period which is being measured by the timer portion 42c is initialized (S820), and the operation returns again to determination of whether measurement of the switching time period is finished (S806) Further, when the state of absence of the necessary water amount is maintained during the first stress time period (S821), the first stress time period of the timer portion 42c is initialized (S822), the water supply processing is carried out (S808) and after finishing the water supply processing, the operation returns again to determination of whether measurement of the switching time period is finished (S806). The above-described processing is carried out repeatedly during a time period until finishing the switching time period and when measurement of the predetermined switching time period is finished, the switching time period of the timer portion 42c is initialized and the operation proceeds to the second mode (S806, S809, S810).

When the second mode is started (S810), presence or absence of the necessary water amount is determined continuously or at predetermined time intervals based on detection of the water content sensor 41 (S811), only when absence of the necessary water amount is determined, measurement of the second stress time period longer than the first stress time period is started by the timer portion 42c (S823). In measuring the second stress time period, presence or absence of the necessary water amount is determined again continuously or at predetermined time intervals (S813), when presence of the necessary water amount is determined, the second stress time period which is being measured by the timer portion 42c is initialized (S824) and the operation returns again to determination of presence or absence of the necessary water amount (S811). Further, when the state of absence of the necessary water amount is maintained during the second stress time period (S825), the second stress time period of the timer portion 42c is initialized (S826), the water supply processing is carried out (S817), and the operation returns again to determination of presence or absence of the necessary water amount (S811). Further, the content of the water supply processing is similar to those in the above-described embodiments.

According to operation of the total of the automatic water supply system of the embodiment, as shown by the time chart of FIG. 33, by making the power source of the control means 42 ON and selecting the switching mode, the first mode is started. When absence of the necessary water amount is determined based on detection of the water content sensor 41 in the first mode, measurement of the predetermined first stress time period is started and when the state of absence of the necessary water amount is not maintained during the first stress time period, the first stress time period is initialized (illustration is omitted). Further, when the state of absence of the predetermined water amount is maintained during the first stress time period, the water supply start signal is outputted, the water supply means 43 starts supplying water and measurement of the flow rate by the flow rate meter or measurement of the water supply time period is started. When the summed-up flow rate value by the flow rate meter reaches the upper limit value or measurement of the water supply time period is finished, the water supply stop signal is outputted and water supply by the water supply means 43 is finished.

Further, when measurement of the switching time period is finished, the switching time period is initialized and the mode is switched to the second mode. When a result of determining absence of the necessary water amount is provided based on detection by the water content sensor 41 in the second mode, measurement of the predetermined second stress time period is started. When absence of the necessary water amount is not maintained during the second stress time period, the second stress time period is initialized (illustration is omitted) Further, when absence of the necessary water amount is maintained during the second stress time period, the water supply start signal is outputted, the water supply means 43 starts supplying water and measurement of the flow rate by the flow rate meter or measurement of the water supply time period is started. When the summed-up flow rate value by the flow rate meter reaches the upper limit value or measurement of the water supply time period is finished, the water supply stop signal is outputted and water supply by the water supply means 43 is finished. The above-described is repeatedly carried out in the second mode.

Further, according to the embodiment, the stress time period such as first or the second stress time period can be set to be different or the respective stress time period can pertinently be set to change, various stress time period can be given in accordance with installing location, environment, or a kind of the plant and there can be provided the automatic water supply system more in line with desire of the user.

Figure 34:
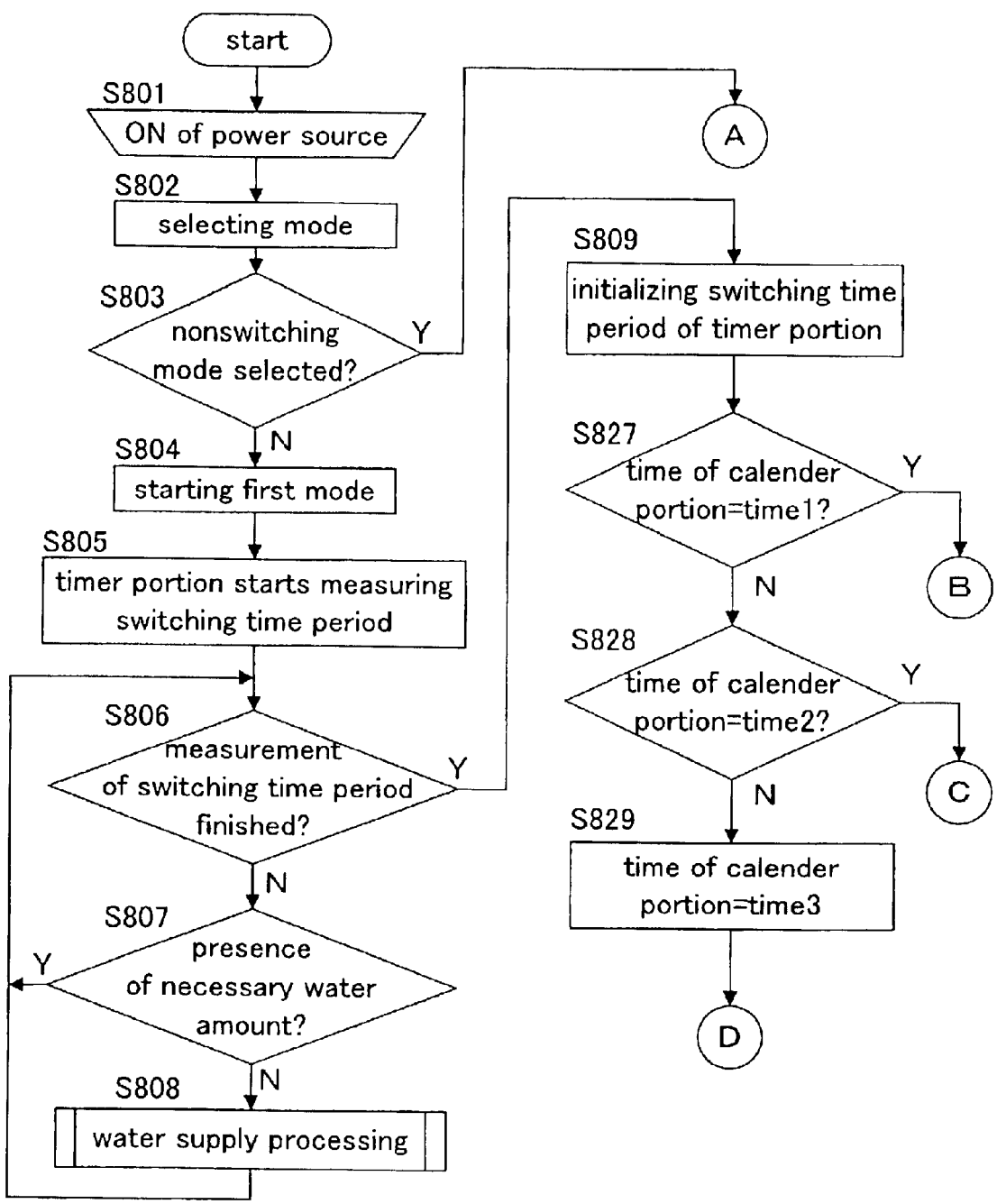
FIG. 34 is a flow chart showing a total flow of a water supply control processing according to a ninth embodiment.
Figure 35:
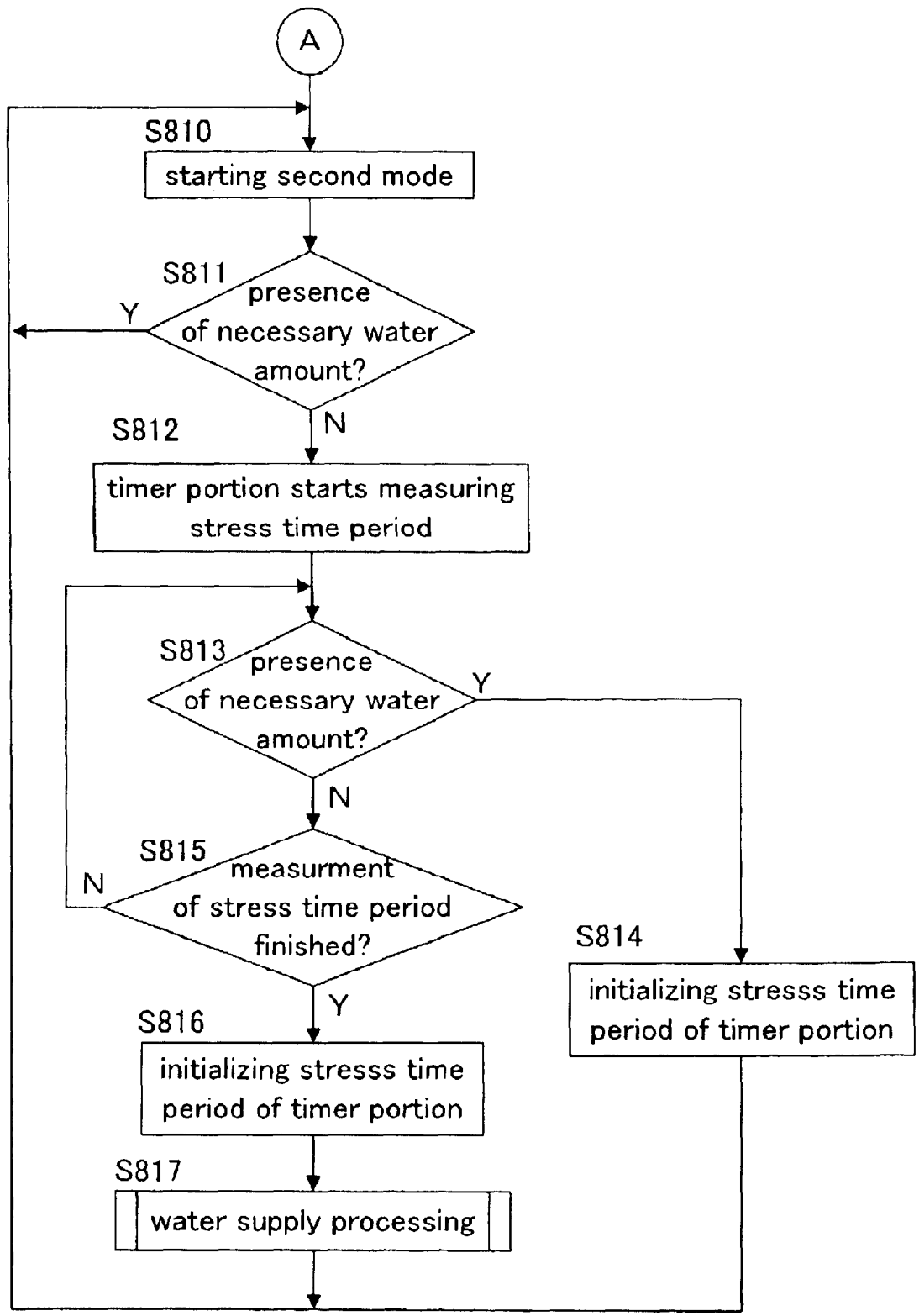
FIG. 35 is a flow chart showing processings when a switching mode in control means of the ninth embodiment is not selected.
Figure 36:
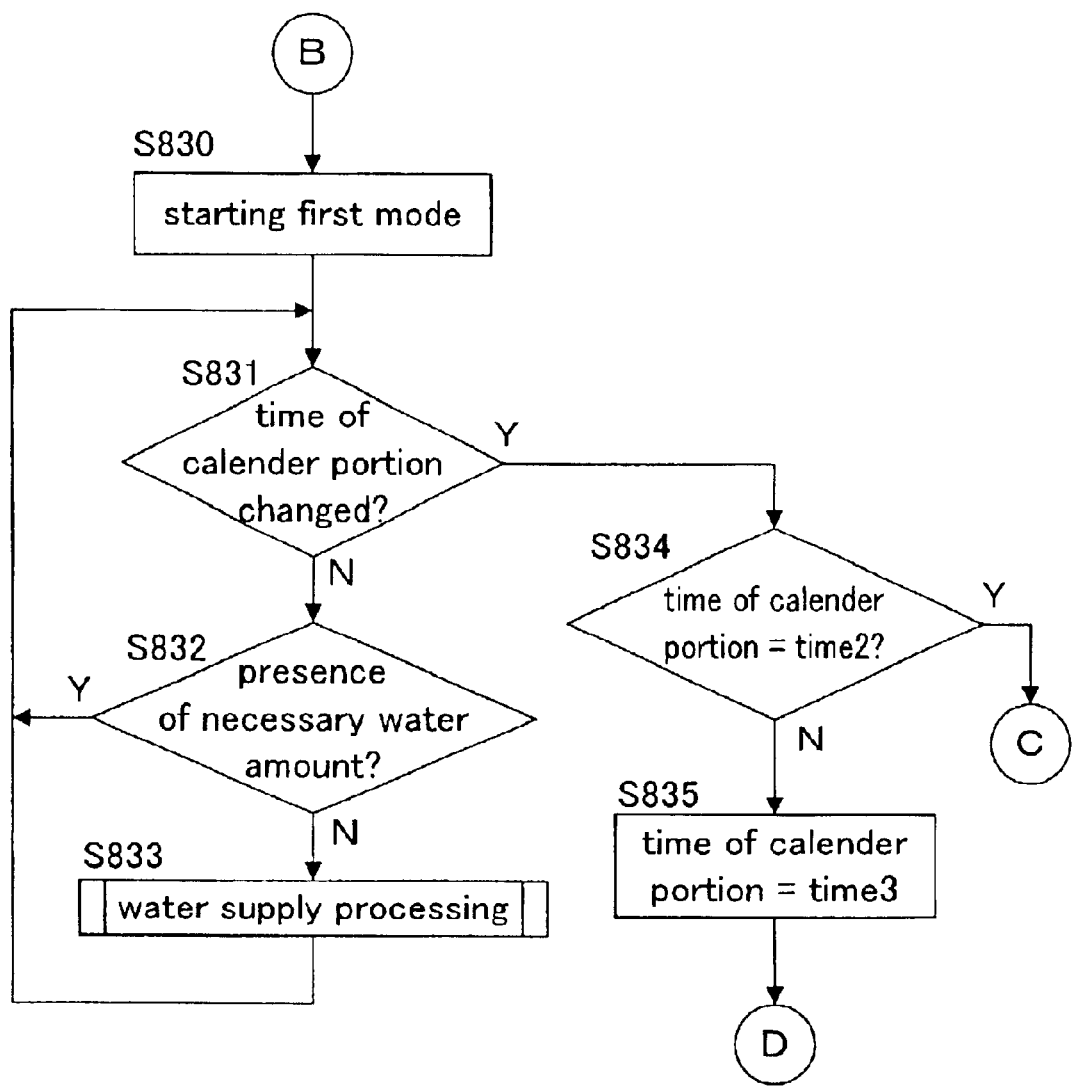
FIG. 36 is a flow chart showing processings in the case of time=1 of a calendar portion in the control means of the ninth embodiment.
Figure 37:
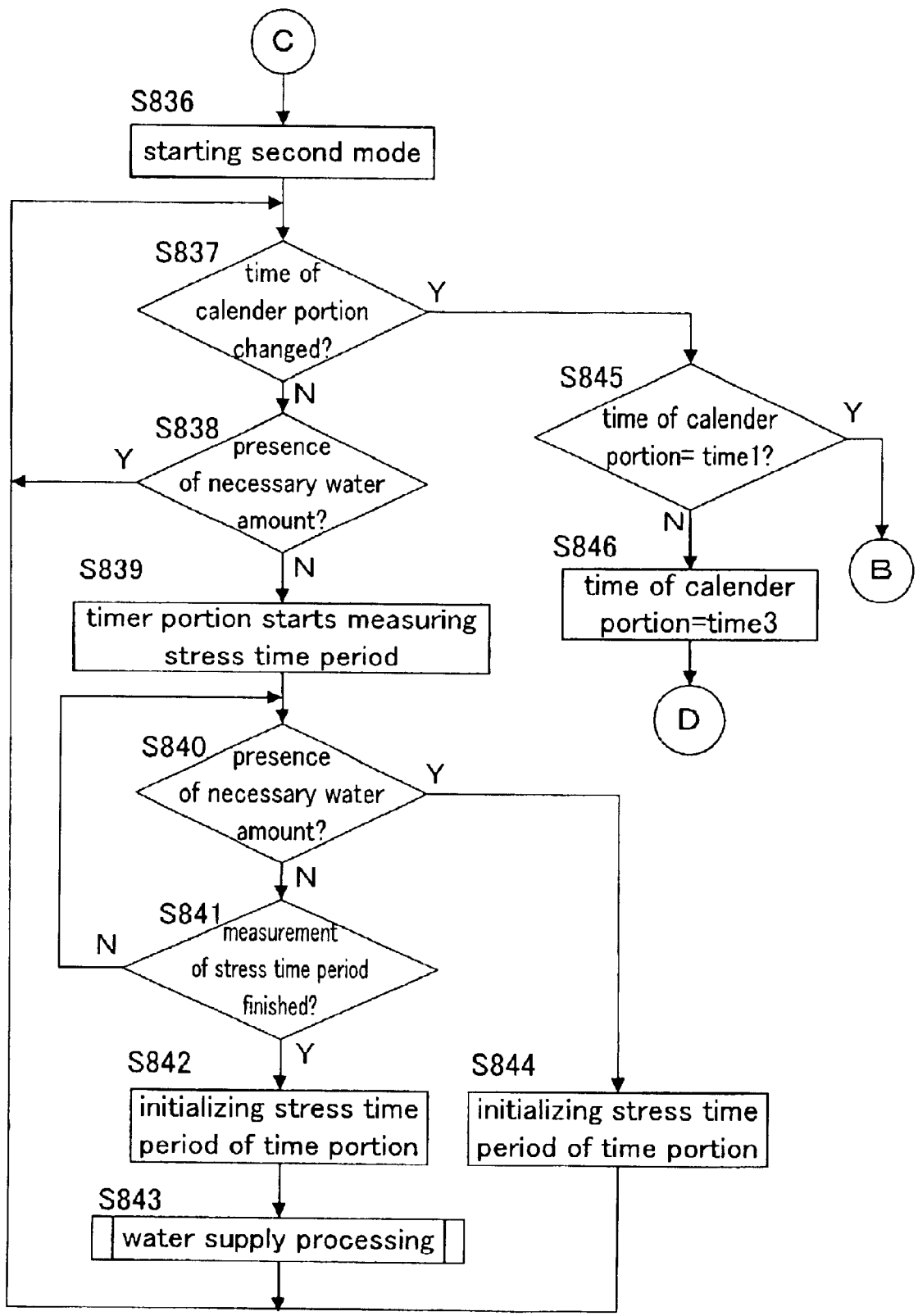
FIG. 37 is a flow chart showing processings in the case of time=2 of the calendar portion in the control means of the ninth embodiment.
Figure 38:
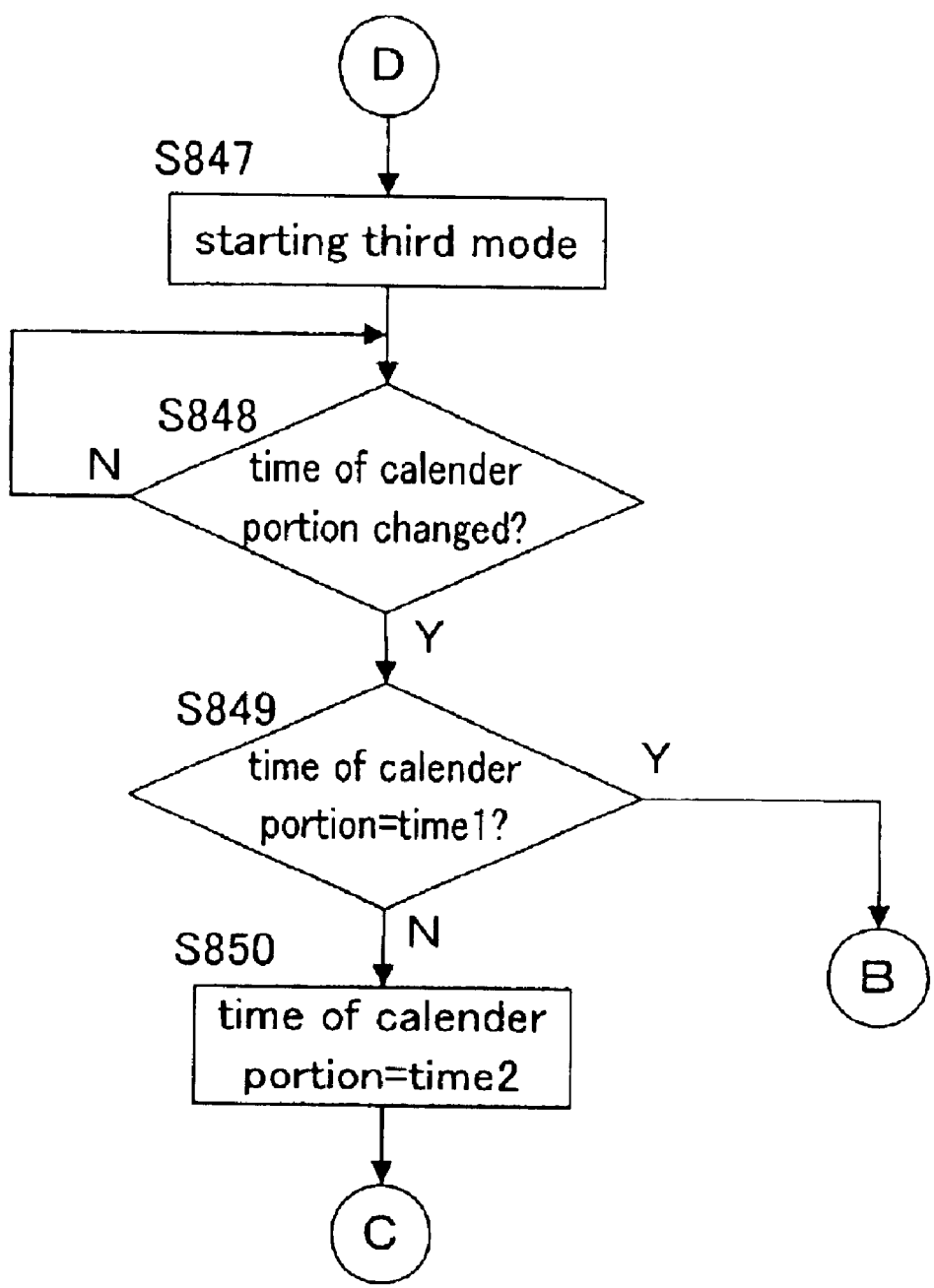
FIG. 38 is a flow chart showing processings in the case of time=3 of the calendar portion in the control means of the ninth embodiment.

Next, an explanation will be given of a ninth embodiment in an automatic water supply system of the plant cultivating unit centering on a portion different from those of the above-described embodiments. FIG. 34 through FIG. 38 show the ninth embodiment of the invention, FIG. 34 is a flow chart showing a total flow of a water supply control processing, FIG. 35 is a flow chart showing a processing when the switching mode is not selected yet and FIG. 36, FIG. 37 and FIG. 38 are flow charts showing processings in respective cases of time of the calendar portion=1, 2, 3. Further, the ninth embodiment is an embodiment on the premise of a case of installing, for example, the plant cultivating unit or the like outdoors in consideration of maintaining life of the turf during the period of dormancy by natural rainfall, there is set a third mode of no water supply in which water is not supplied at all in accordance with time and a water supply interval time period is constituted by a time period of finishing so-to-speak third mode as a whole and a mode of use thereof is pertinent.

According to the embodiment, there is constructed a constitution in which control means 42 is provided with the calendar portion, current date and time (at least month) can be confirmed by the calendar portion, the mode is switched in accordance with date and time of the calendar portion and there is constructed a constitution in which when the switching mode is selected by the switching mode selecting portion, the first mode is carried out. That is, there is constructed a constitution in which a mode switched after carrying out the first mode is determined by the calendar portion and immediately after starting, the first mode is carried out and thereafter, there is constructed a constitution in which the mode is switched in accordance with time of season or the like.

As shown by FIG. 34, the mode is selected by the switching mode selecting portion by making the power source of the control means 42 ON (S801, S802), it is determined which of the switching mode or the nonswitching mode is selected (S803). When the nonswitching mode is selected, the operation proceeds to A, when the switching mode is selected, the first mode is started (S804), measurement of the predetermined switching time period is started by the timer portion 42c (S805). During a time period until finishing to measure the switching time period, based on detection of the water content sensor 41, determination of presence or absence of the necessary water amount is repeatedly carried out continuously or at predetermined intervals (S806, S807), the water supply processing is carried out only when absence of the necessary water content is determined (S808). When measurement of the switching time period is finished, the switching time period measured by the timer portion 42c is initialized (S806, S809).

After initializing the switching time period, CPU 42a determines time of the calendar portion and determines the mode based on a result of the determination. For example, in FIG. 34, when time=time 1 is determined based on the calendar portion, the operation proceeds to B (S827), when time=time 2 is determined, the operation proceeds to C (S828) and when time=time 3 is determined, the operation proceeds to D (S829). Further, in any mode of the respective embodiments, when the nonswitching mode is selected by the switching mode selecting portion, there can be constructed a constitution in which the control means 42 proceeds to the nonswitching mode processing in the predetermined processing.

When the operation proceeds to A, as shown by FIG. 35, the second mode is started (S810), when the second mode is started, based on detection of the water content sensor 41, determination of presence or absence of the necessary water amount is carried out continuously or at predetermined intervals (S811), when absence of the necessary water amount is detected, measurement of the predetermined stress time period is started by the timer portion 42c (S812). Even in measuring the stress time period, determination of presence or absence of the necessary water amount is carried out continuously or at predetermined intervals (S813), when presence of the predetermined water amount is determined, the stress time period which is being measured by the timer portion 42c is initialized (S814), and the operation returns again to determination of presence or absence of the necessary water amount (S811). When absence of the necessary water amount is maintained during the stress time period (S815), the stress time period measured by the timer portion 42c is initialized (S816), and the water supply processing is carried out (S817). The water supply processing is carried out until elapse of, for example, predetermined water supply time period or until the summed-up flow rate by measurement of the flow rate meter reaches a predetermined upper limit value and after finishing the water supply processing, the operation returns again to determination of presence or absence of the necessary water amount (S811).

After the operation proceeds to B, there is started the first mode modified as shown by FIG. 36 (S830), it is confirmed from time to time whether time is changed by the calendar portion (S831), when the time is not changed, based on detection of the water content sensor 41, presence or absence of the necessary water amount is determined (S832), and only when a result of determining absence of the necessary water amount is provided, the water supply processing is carried out (S833). On the other hand, when the time is changed by the calendar portion, in the case of time=time 2 of the calendar portion, the operation proceeds to C (S834) and in the case of time=time 3, the operation proceeds to D (S835).

After the operation proceeds to C, there is started the second mode modified as shown by FIG. 38 (S836), it is confirmed from time to time whether the time is changed by the calendar portion (S837), when the time is not changed, based on detection of the water content sensor 41, presence or absence of the necessary water amount is determined (S838), only when a result of determining absence of the necessary water amount is provided, measurement of the predetermined stress time period is started (S839), only when the state of absence of the necessary water amount is maintained during the stress time period (S840, S841), the stress time period is initialized and the water supply processing is carried out (S842, S843), when the state of absence of the necessary water amount is not maintained, measurement of the stress time period of the timer portion 42c is initialized (S844) and the operation returns again to determination of whether the time of the calendar portion is changed (S837). When the time of the calendar portion is changed, in the case of time=time 1 of the calendar portion, the operation proceeds to B (S845) and in the case of time=time 3, the operation proceeds to D (S846).

After the operation proceeds to D, as shown by FIG. 38, the third mode is started (S847), confirmation of whether of the time is changed by the calendar portion is repeatedly carried out until time is changed (S848), when the time is changed, in the case of time=time 1 of the calendar portion, the operation proceeds to B (S849) and in the case of time=time 2, the operation proceeds to C (S850).

By using the ninth embodiment of the invention, the water control all around the year can be carried out by the automatic water supply system, for example, when the turf grows in March or the like, the system is carried out by the first mode, with respect to the turf from April to October or the like, by carrying out the second mode, the turf is cultivated in a state more proximate to be natural and in the period of dormancy of the turf from November to February, by executing the third mode, life of the turf can be maintained only by natural rainfall and water stored in the water storage tray 10 or in the soil to some degree, and by necessary minimum water, control of growing the plant such as excellent turf control or the like can be carried out. Further, according to the above-described example, the time 1 signifies March, the time signifies from April to October and time 3 signifies from November to February.

Further, as pertinent modified examples of the respective embodiments of the automatic water supply system according to the invention, for example, there is a case of forming a planting area and using a plurality of the water content sensors 41, there is constructed a constitution of installing the water content sensors 41 in all of the water storage trays 20 or in arbitrary ones of the water storage trays 20, further, for example, there is a case of determining absence of the necessary water amount when absence of the necessary water amount is detected based on at least one of the water content sensor 41 in a plurality of the water content sensors 41, there is a case of determining absence of the necessary water amount when absence of the necessary water amount is detected based on an arbitrary number of the water content sensors 41 in a plurality thereof and so on.

Further, the third mode of the ninth embodiment is not limited to the constitution of not supplying water but, for example, there may be constructed a constitution of carrying out control by measuring a third stress time period which is a time period longer than the stress time period in the second mode of the eighth embodiment, or, for example, a constitution of carrying out control by measuring third water supply interval time period which is a time period longer than the water supply interval time period in the second mode and in this case, water to some degree can be ensured even at indoors in the third mode.

As such a modified example, for example, in the case of the ninth embodiment on the premise of the seventh embodiment, there can be constructed a constitution in which water supply start is controlled by the water content sensor 41 in the first mode, water supply start is controlled by the first stress time period in the second mode and water supply start is controlled by the third stress time period in the third mode. Further, as other modified example of the ninth embodiment, there can be constructed a constitution in which water supply start is controlled by the water supply interval time period in the first mode, water supply start is controlled by the stress time period in the second mode and water supply start is controlled by the third water supply interval time period or the third stress time period in the third mode.

Further, as other modified example of the ninth embodiment, there can be constructed a constitution in which water supply start is controlled by a first water supply interval time period in the first mode, water supply start is controlled by a second water supply interval time period in the second mode and water supply is controlled by a third water supply interval time period in the third mode. Further, in the case of the ninth embodiment on the premise of the eighth embodiment, there can be constructed a constitution in which water supply start is controlled by a first stress time period in the first mode, the water supply is controlled by a second stress time period in the second mode and water supply is controlled by a third stress time period in the third mode.

Further, although content of the seventh embodiment is adopted for main control content of the ninth embodiment, particularly for control content of the first mode or the second mode, the invention is not limited thereto but there can be constructed a constitution in which, for example, water supply start is controlled by water supply interval time period in the first mode, water supply start is controlled by stress time period in the second mode and water is not supplied in the third mode. Further, for example, there can be constructed a constitution in which water supply start is controlled by the first water supply interval time period in the first mode, water supply start is controlled by the second water supply interval time period in the second mode and water is not supplied in the third mode. Further, for example, when the eighth embodiment is adopted, there can be constructed a constitution in which water supply start is controlled by the first stress time period in the first mode, water supply start is controlled by the second stress time period in the second mode and water is not supplied in the third mode.

Further, the water supply interval time period or the stress time period in the above-described respective embodiments is arbitrary, it is possible to set these time periods to be short at times in which water supply is needed and to set these time periods to be long in times in which water supply is not needed so much. Further, even times of the calendar portion can similarly be set pertinently.

Further, when the seventh or the eighth or the like is used completely outdoors, basically, the period of dormancy of the turf can be dealt with by cutting the power source of the automatic water supply system. Further, in that case, it is also possible to make the second mode stay as it is without cutting the power source. Further, it is possible to accelerate to grow the turf by carrying out maintenance on first ten days of March, making the power source of the control means 42 ON again and bringing about a state of carrying out the switching mode. Further, it is natural that the turf immediately after construction can be accelerated to take root by the seventh through the ninth embodiments.

Further, the plant 14 constituting the object of the automatic water supply system according to the invention is not limited to the turf but the object is constituted by various ones of the plants 14 and various ones of the plants 14 can be dealt with by carrying out various settings therefor.

Further, although according to the above-described respective embodiments, an explanation has been given of the constitution of carrying out the second mode when the nonswitching mode of the switching mode selecting portion is selected, the invention is not limited thereto but there can be constructed a constitution of carrying out only the first mode by setting. Further, the second mode is carried out when the nonswitching mode is selected, in order to deal with the plant which is not provided immediately after construction, for example, when the object is constituted by the plant which takes root without using the automatic water supply system, or when the automatic water supply system is used for the plant which has been supplied with water artificially, the plant 14 has already adapted sufficiently to the soil and taken root deep in the soil and therefore, it is not necessary to carry out the first mode and the respective embodiments are described by conceiving such cases.

Further, although according to the above-described respective embodiments, switching of the mode is carried out by finishing to measure the switching time period in the seventh and the eighth embodiments, and by times in the ninth embodiment, the invention is not limited thereto but the mode maybe switched by providing a sensor for detecting weak acidity in the soil and detecting a state of the turf of taking root, or the mode may be switched by providing a pressure sensor between the soil and the cut turf when the cut turf is mounted and detecting the state of the turf of taking root by the pressure sensor and the sensor of the invention is not limited to the water content sensor. Further, by adopting a system of switching the mode by detecting the state of the turf of taking root, further accurate time of switching the mode can be recognized, further, in the case of using the third mode in which water is not supplied or the water supply amount is small as in the ninth embodiment, it is preferable to switch the mode by times.

Further, as water supply means used in the invention, a water supply pipe of a porous pipe may be used, or a mere water supply pipe may be used, or a sprinkler or the like may be used.

Further, although an explanation has been given up to the third mode according to the ninth embodiment, the invention is not limited up to the third mode but there may be constructed a constitution in which a fourth or higher mode is prepared in accordance with the kind of the plant and these modes may be switched as necessary.

Further, although according to the above-described embodiments, the control means 42 is constructed by the constitution in which the power source is made ON and the switching mode or the nonswitching mode is selected by the switching mode selecting portion, the invention is not limited thereto but there can be constructed a constitution in which the switching mode is carried out by setting to initialize the mode automatically by making the power source ON other than the case in which the nonswitching mode is particularly selected by the switching mode selecting portion, or a constitution of carrying out the nonswitching mode by setting to initialize the mode automatically by making the power source ON other than the case in which the switching mode is conversely carried out by the switching mode selecting portion. Further, for example, when the switching time period is set to 2 weeks as initial setting, there may be constructed a constitution in which it is determined that the nonswitching mode is selected, for example, by setting to change the switching time period to "0".

Figure 39:
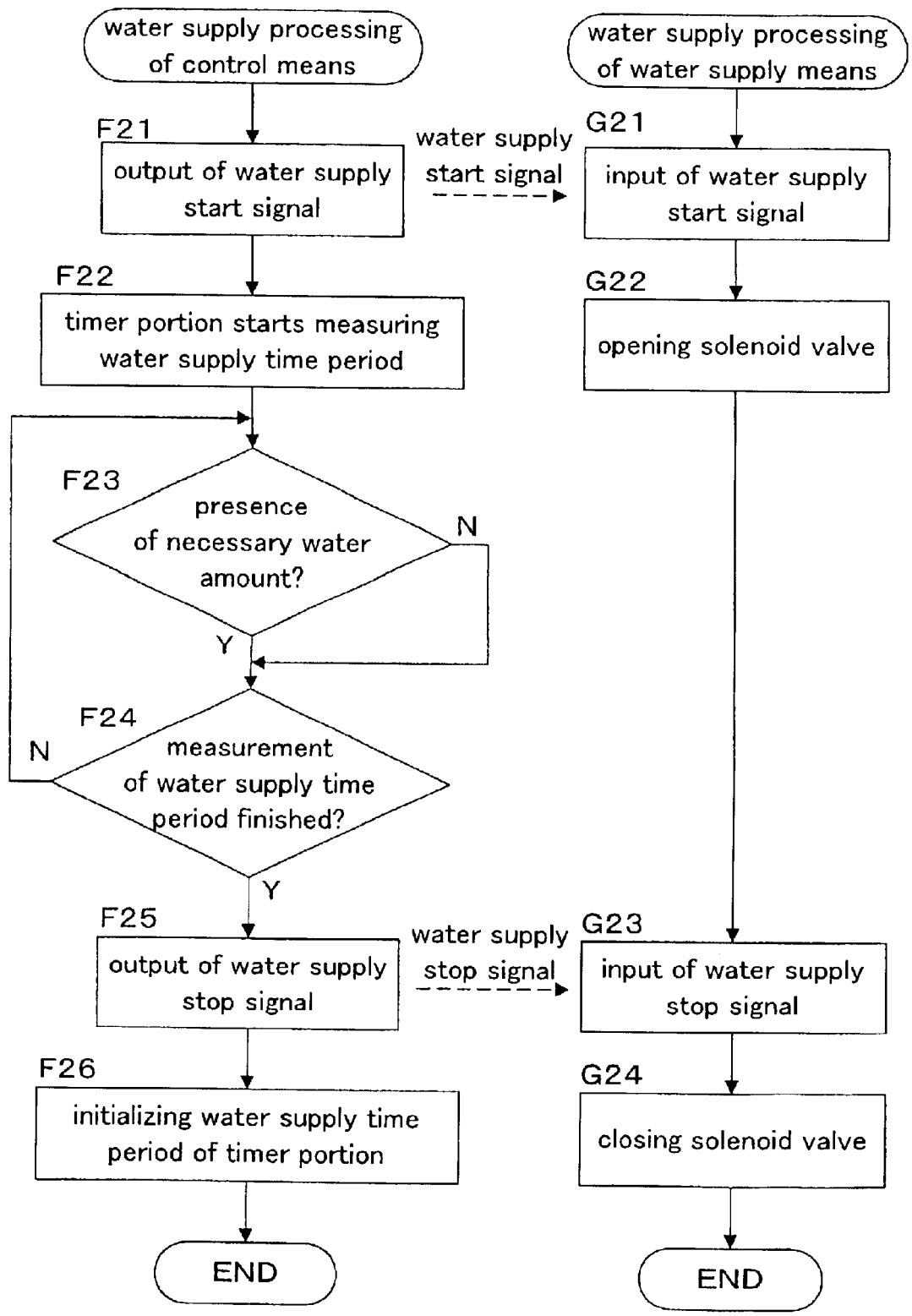
FIG. 39 is a flow chart showing water supply processings of control means and water supply means in the case of carrying out water supply control by a timer portion with regard to other embodiment of the invention.
Figure 40:
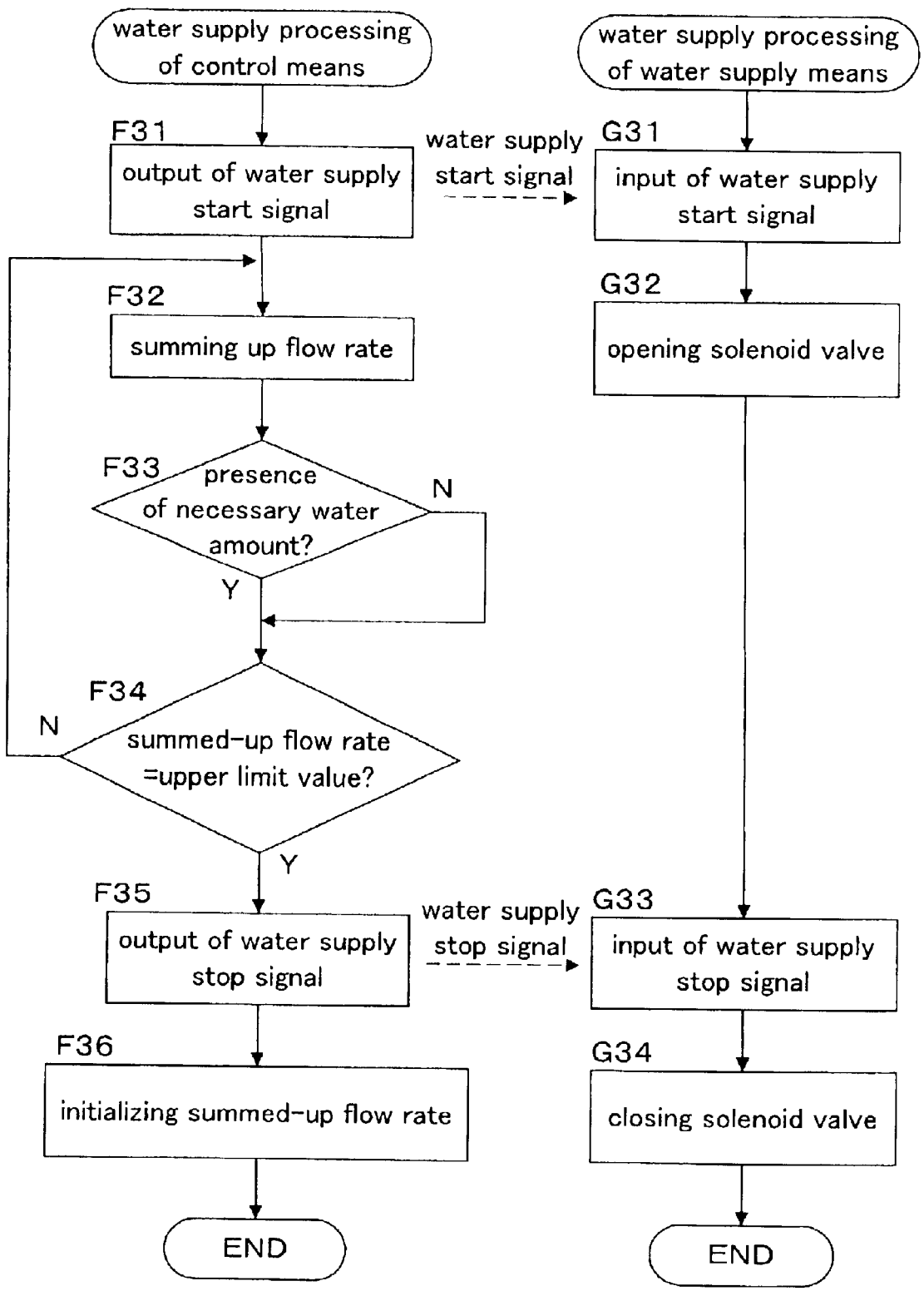
FIG. 40 is a flow chart showing water supply processings of the control means and the water supply means in the case of carrying out water supply control by a flow rate meter with regard to other embodiment of the invention.

Further, although according to the seventh and the eighth embodiments, an explanation has been given of the constitution in which there is not carried out determination of presence or absence of the necessary water amount based on detection of the water content sensor 41 during a time period until water supply is finished, the invention is not limited to the embodiments but there may be constructed a constitution of carrying out determination of presence or absence of the necessary water amount by the water content sensor 41 even in the water supply processing. In this case, for example, there are carried out processings F21 through F26 and G21 through G24 in a flow chart shown in FIG. 39 or processings F31 through F36 and G31 through G34 of a flow chart shown in FIG. 40 in the water supply processing. Although a result of determining presence or absence of the necessary water amount does not influence on the water supply processing, by constructing the constitution, there can be omitted a program with regard to a time period of carrying out determination of presence or absence of the necessary water amount by the water content sensor 41 (setting a time period of not carrying out detection of the necessary water amount by the water content sensor 41) and the inexpensive and highly safe automatic water supply system can be provided.

What is claimed is:

1. An automatic water supply system characterized in that at least deficiency of water of an object of water supply is determined by a water content sensor, in accordance with the determination, a timer portion starts measurement of a stress time period of giving a water deficiency stress by a state of deficiency of water to a plant, water is supplied by water supply means after elapse of the stress time period when sufficiency of water is not determined during the measurement of the stress time period, and the measurement of the stress time period by the timer portion is initialized when sufficiency of water is determined during the measurement of the stress time period.

2. The automatic water supply system according to claim 1, characterized in that determination of the water content state of the object of water supply by the water content sensor is maintained during the stress time period.

3. The automatic water supply system according to claim 1, characterized in that a plurality of the water content sensors are installed at necessary portions of the object of water supply, deficiency of water of the object of water supply is determined in accordance with that a number of pieces of the water content sensors of detecting deficiency of water exceeds or becomes equal to or larger than a predetermined number of pieces and sufficiency of water of the object of the water supply is determined in accordance with that the number of pieces of the water content sensors of detecting deficiency of water becomes equal to or less than or less than the predetermined number of pieces.

4. The automatic water supply system according to claim 1, characterized in further comprising switching means for switching to a test mode, wherein the test mode measures a stress time period shorter than the stress time period and a cycle from starting to supply water to stopping to supply water is set to be shorter than a normal cycle.

5. An automatic water supply system characterized in an automatic water supply system comprising water supply means capable of supplying water to an object of water supply and control means set with a plurality of kinds of modes at least having different water supply start conditions for controlling to carry out to supply water and stop to supply water by the water supply means in accordance with the modes, wherein the modes are automatically switched in accordance with a predetermined switching condition, and wherein the plurality of kinds of modes include a first mode of determining deficiency/sufficiency of water based on a detected value at a portion of detecting a water content state by a water content sensor and carrying out to supply water when deficiency of water is determined, and a second mode of determining deficiency/sufficiency of water based on the detected value at the portion of detecting the water content state by the water content sensor, starting measurement of a predetermined stress time period of giving a water deficiency stress by a state of deficiency of water to a plant by a timer portion when deficiency of water is determined, supplying water by the water supply means after elapse of the stress time period when sufficiency of water is not determined during the measurement of the stress time period, and initializing the measurement of the stress time period by the timer portion when sufficiency of water is determined during the measurement of the stress time period.

6. The automatic water supply system according to claim 5, characterized in that determination of the water content state of the object of water supply by the water content sensor is maintained during the stress time period.

7. The automatic water supply system according to claim 5, characterized in that a plurality of the water content sensors are installed at necessary portions of the object of water supply, deficiency of water of the object of water supply is determined in accordance with that a number of pieces of the water content sensors of detecting deficiency of water exceeds or becomes equal to or larger than a predetermined number of pieces and sufficiency of water of the object of the water supply is determined in accordance with that the number of pieces of the water content sensors of detecting deficiency of water becomes equal to or less than or less than the predetermined number of pieces.

8. The automatic water supply system according to claim 5, characterized in that the first mode is carried out for a predetermined switching time period and is switched to the second mode after elapse of the switching time period.

9. The automatic water supply system according to claim 5, characterized in that the modes include a no water supply mode of not supplying water.

10. The automatic water supply system according to claim 5, characterized in that the control means includes a calendar portion of updating set time and at least one of the switching conditions is based on time updated by the calendar portion.

11. The automatic water supply system according to claim 5, characterized in further comprising switching means for switching to a test mode, wherein the test mode measures a stress time period shorter than the stress time period and a cycle from starting to supply water to stopping to supply water is set to be shorter than a normal cycle.

12. An automatic water supply system characterized in an automatic water supply system comprising water supply means capable of supplying water to an object of water supply and control means set with a plurality of kinds of modes at least having different water supply start conditions for controlling to carry out to supply water and stop to supply water by the water supply means in accordance with the modes, wherein the modes are automatically switched in accordance with a predetermined switching condition, and wherein the plurality of kinds of modes include a first mode and a second mode of determining deficiency of water/sufficiency of water based on a detected value at a portion of detecting a water content state by a water content sensor, starting measurement of a predetermined stress time period of giving a water deficiency stress by a state of deficiency of water to a plant by a timer portion when deficiency of water is determined, supplying water by the water supply means after elapse of the stress time period when sufficiency of water is not determined during the measurement of the stress time period, and initializing the measurement of the stress time period by the timer portion when sufficiency of water is determined during the measurement of the stress time period, and wherein a length of the stress time period of the second mode is longer than a length of the stress time period of the first mode.

13. The automatic water supply system according to claim 12, characterized in that determination of the water content state of the object of water supply by the water content sensor is maintained during the stress time period.

14. The automatic water supply system according to claim 12, characterized in that a plurality of the water content sensors are installed at necessary portions of the object of water supply, deficiency of water of the object of water supply is determined in accordance with that a number of pieces of the water content sensors of detecting deficiency of water exceeds or becomes equal to or larger than a predetermined number of pieces and sufficiency of water of the object of the water supply is determined in accordance with that the number of pieces of the water content sensors of detecting deficiency of water becomes equal to or less than or less than the predetermined number of pieces.

15. The automatic water supply system according to claim 12, characterized in that the first mode is carried out for a predetermined switching time period and is switched to the second mode after elapse of the switching time period.

16. The automatic water supply system according to claim 12, characterized in that the modes include a no water supply mode of not supplying water.

17. The automatic water supply system according to claim 12, characterized in that the control means includes a calendar portion of updating set time and at least one of the switching conditions is based on time updated by the calendar portion.

18. The automatic water supply system according to claim 13, characterized in further comprising switching means for switching to a test mode, wherein the test mode measures a stress time period shorter than the stress time period and a cycle from starting to supply water to stopping to supply water is set to be shorter than a normal cycle.

\* \* \* \* \*